US012018526B2

(12) United States Patent
Whitehead et al.

(10) Patent No.: US 12,018,526 B2
(45) Date of Patent: Jun. 25, 2024

(54) VARIABLE THERMAL INSULATION ASSEMBLY

(71) Applicant: The University of British Columbia, Vancouver (CA)

(72) Inventors: Lorne Whitehead, Vancouver (CA); Michele Mossman, Vancouver (CA); Jon Scott, Salt Spring Island (CA); Namamrta Musterer, Vancouver (CA); Wesley Bowley, Victoria (CA); Debbie Eeltink, Vancouver (CA); Laura Megan Ogilvie, Campbell River (CA)

(73) Assignee: The University of British Columbia, Vancouver (CA)

( * ) Notice: Subject to any disclaimer, the term of this patent is extended or adjusted under 35 U.S.C. 154(b) by 481 days.

(21) Appl. No.: 17/337,260

(22) Filed: Jun. 2, 2021

(65) Prior Publication Data
US 2021/0285282 A1 Sep. 16, 2021

Related U.S. Application Data

(63) Continuation of application No. 15/758,690, filed as application No. PCT/CA2016/051072 on Sep. 9, 2016, now abandoned.
(Continued)

(51) Int. Cl.
E06B 9/24 (2006.01)
A01G 9/14 (2006.01)
(Continued)

(52) U.S. Cl.
CPC ............ E06B 9/264 (2013.01); A01G 9/1415 (2013.01); A01G 9/222 (2013.01); A01G 9/225 (2013.01);
(Continued)

(58) Field of Classification Search
CPC .. E06B 9/264; E06B 9/262; E06B 2009/2464; E06B 2009/2627;
(Continued)

(56) References Cited

U.S. PATENT DOCUMENTS 2,276,425 A    3/1942  Clement et al.
3,594,989 A *  7/1971  Bastiaans ................. B03C 3/45
                                                     428/116
(Continued)

FOREIGN PATENT DOCUMENTS

CA    2131694 A1    7/1994
CA    2282998 A1    3/2001
GB     833113 A     4/1960

OTHER PUBLICATIONS

Canadian Patent Application No. 2,997,841, Office Action dated Oct. 27, 2022.
(Continued)

Primary Examiner — Johnnie A. Shablack
Assistant Examiner — Jeremy C Ramsey
(74) Attorney, Agent, or Firm — Borden Ladner Gervais LLP; Todd Keeler

(57) ABSTRACT

A variable thermal insulation assembly includes a plurality of sheets of film, wherein each sheet is bonded to an adjacent sheet along a plurality of longitudinally extending regions to form a plurality of longitudinally extending cavities, wherein the plurality of flexible sheets of each of the thermal cell arrays are formed of an electrically insulative material that is coated on one side with an electrically conductive material, a controller electrically coupled to the plurality of flexible sheets and configured to apply an electric potential difference between electrically conductive material of each pair of flexible sheets such that the electrically conductive coatings of the pair of flexible sheets attract each other to
(Continued)

cause the thermal cell array to transition from an expanded state to a compressed state.

19 Claims, 35 Drawing Sheets

Related U.S. Application Data

(60) Provisional application No. 62/218,949, filed on Sep. 15, 2015, provisional application No. 62/216,614, filed on Sep. 10, 2015.

(51) Int. Cl.
| | | |
|---|---|---|
| *A01G 9/22* | (2006.01) | |
| *E04B 1/80* | (2006.01) | |
| *E04D 13/00* | (2006.01) | |
| *E06B 9/262* | (2006.01) | |
| *E06B 9/264* | (2006.01) | |
| *E04B 1/74* | (2006.01) | |

(52) U.S. Cl.
CPC .............. *E04B 1/806* (2013.01); *E04D 13/00* (2013.01); *E06B 9/262* (2013.01); *E04B 1/74* (2013.01); *E06B 2009/2464* (2013.01); *E06B 2009/2627* (2013.01); *E06B 2009/2643* (2013.01); *Y02A 40/25* (2018.01)

(58) Field of Classification Search
CPC . E06B 2009/2643; A01G 9/222; A01G 9/225; A01G 9/1415; Y02A 40/25; E04D 13/00
See application file for complete search history.

(56) References Cited

U.S. PATENT DOCUMENTS

| | | | |
|---|---|---|---|
| 4,091,592 A | | 5/1978 | Berlad et al. |
| 4,307,768 A | | 12/1981 | Anderson |
| 4,388,354 A | | 6/1983 | Suominen |
| 4,508,154 A | | 4/1985 | Wheeler |
| 4,664,169 A | * | 5/1987 | Osaka ................... E06B 9/307 |
| | | | 160/2 |
| 4,672,888 A | | 6/1987 | Crombie et al. |
| 4,694,144 A | * | 9/1987 | Delaroche .............. E06B 9/262 |
| | | | 160/84.01 |
| 5,141,041 A | | 8/1992 | Katz et al. |
| 5,850,861 A | * | 12/1998 | Silverberg ............. E06B 9/264 |
| | | | 49/74.1 |
| 6,345,486 B1 | | 2/2002 | Colson et al. |
| 6,684,469 B2 | * | 2/2004 | Horning ................ H02N 1/006 |
| | | | 29/841 |
| 8,652,282 B2 | | 2/2014 | Milburn |
| 11,039,579 B2 | * | 6/2021 | Divigalpitiya ....... A01G 9/1415 |
| 2005/0048231 A1 | | 3/2005 | Morphet |
| 2005/0136198 A1 | | 6/2005 | Bourlier et al. |

OTHER PUBLICATIONS

Canadian Patent Application No. 2,997,841, Office Action dated Mar. 15, 2023.
International Patent Application No. PCT/CA2016/051072, International Preliminary Report on Patentability dated Mar. 22, 2018.
International Patent Application No. PCT/CA2016/051072, International Search Report and Written Opinion dated Oct. 24, 2016.
U.S. Appl. No. 15/758,690, Final Office Action dated Mar. 3, 2021.
U.S. Appl. No. 15/758,690, Non-Final Office Action dated Oct. 5, 2020.
U.S. Appl. No. 15/758,690, Restriction Requirement dated Mar. 27, 2020.

* cited by examiner

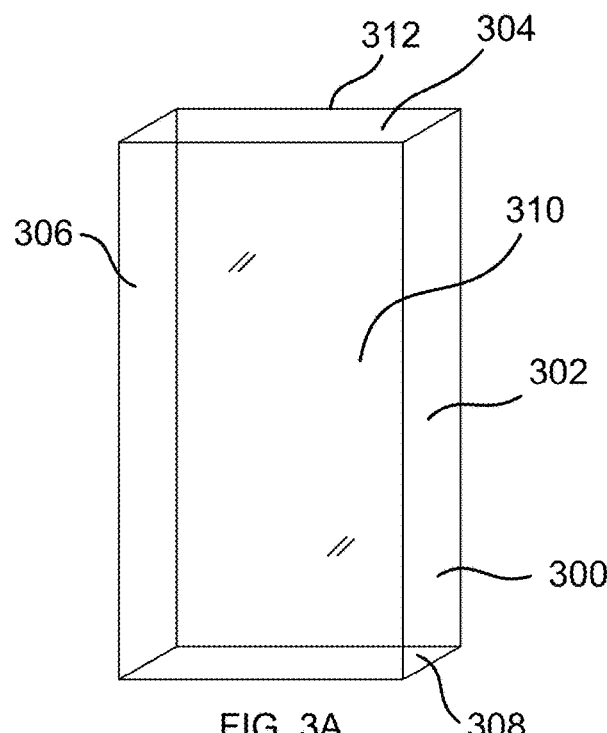
FIG. 3A
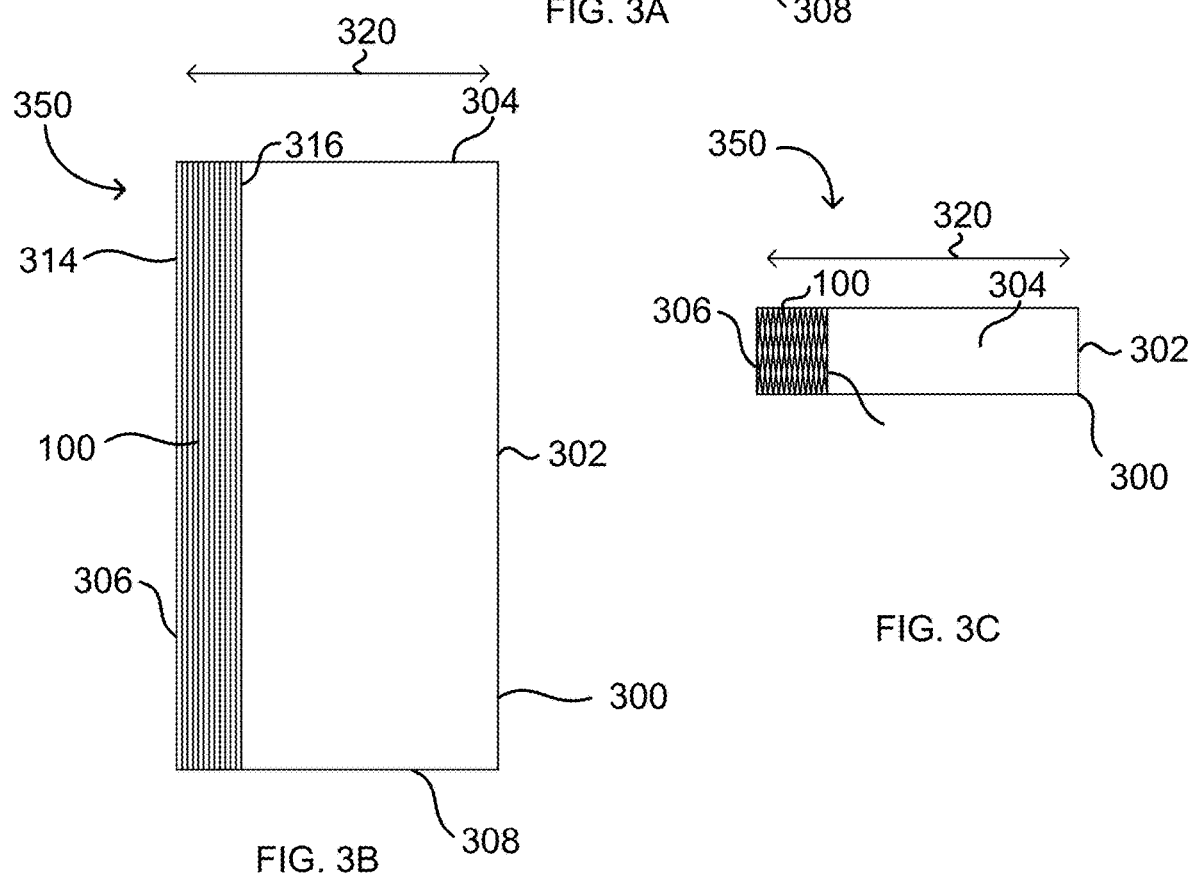
FIG. 3B
FIG. 3C

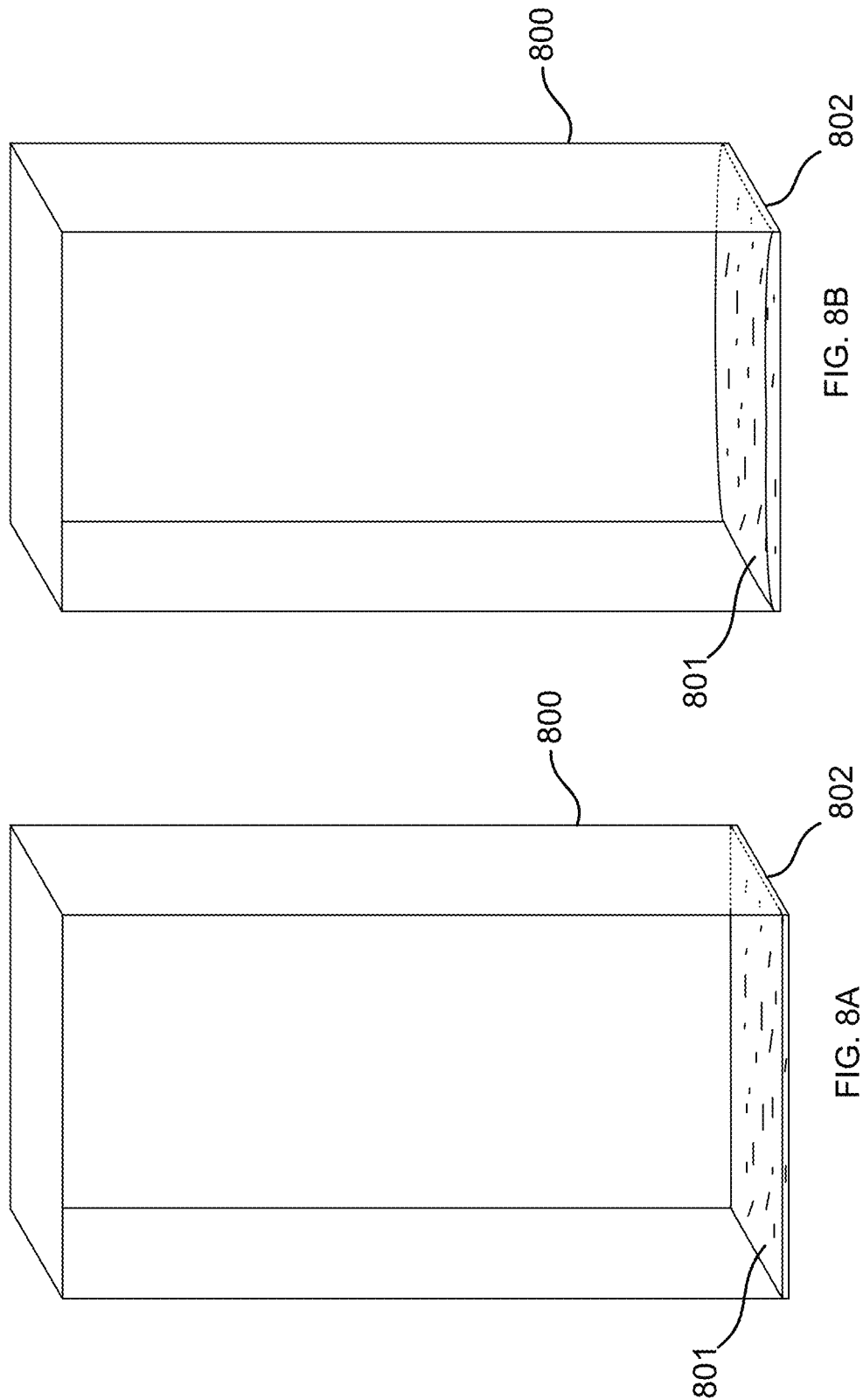

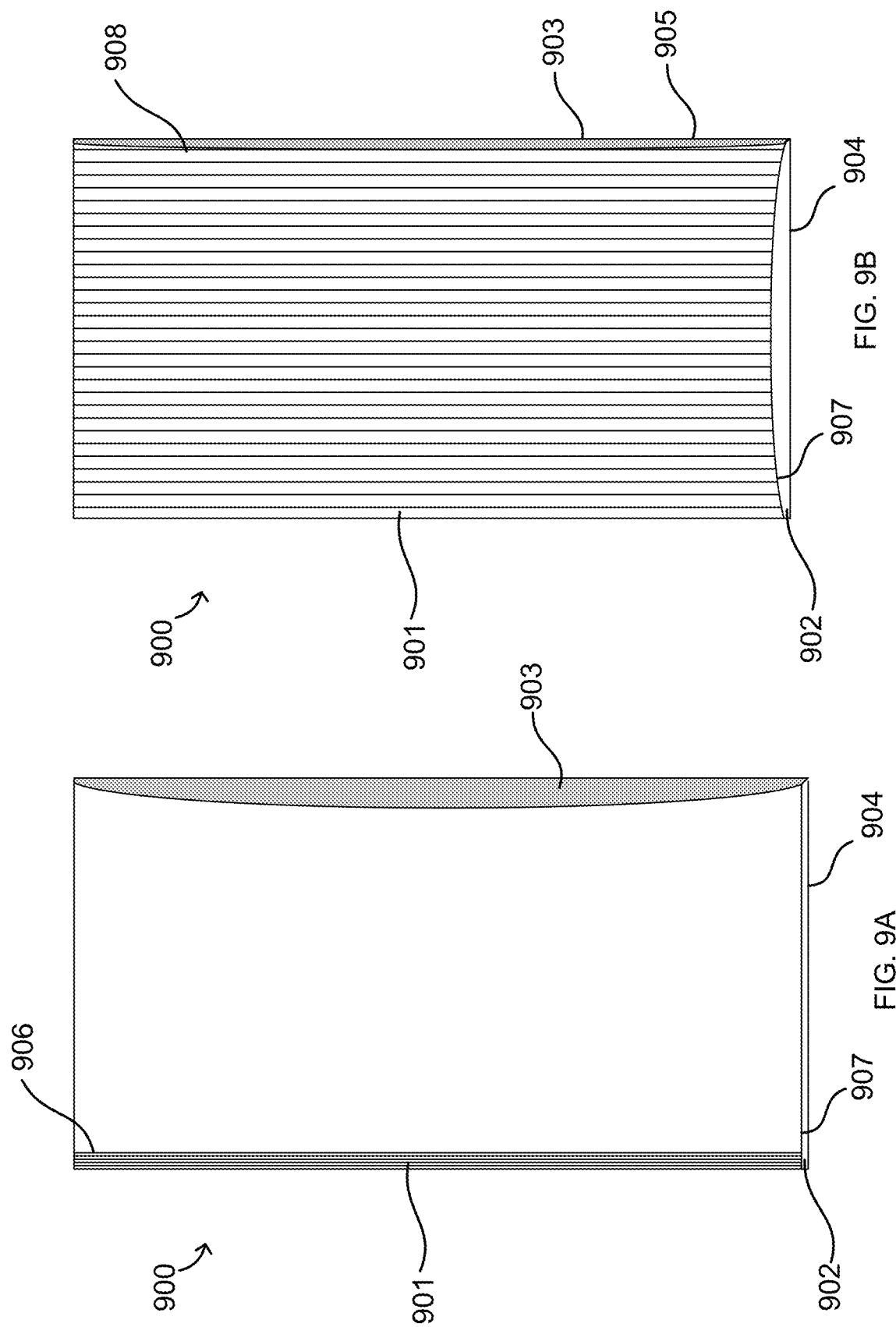

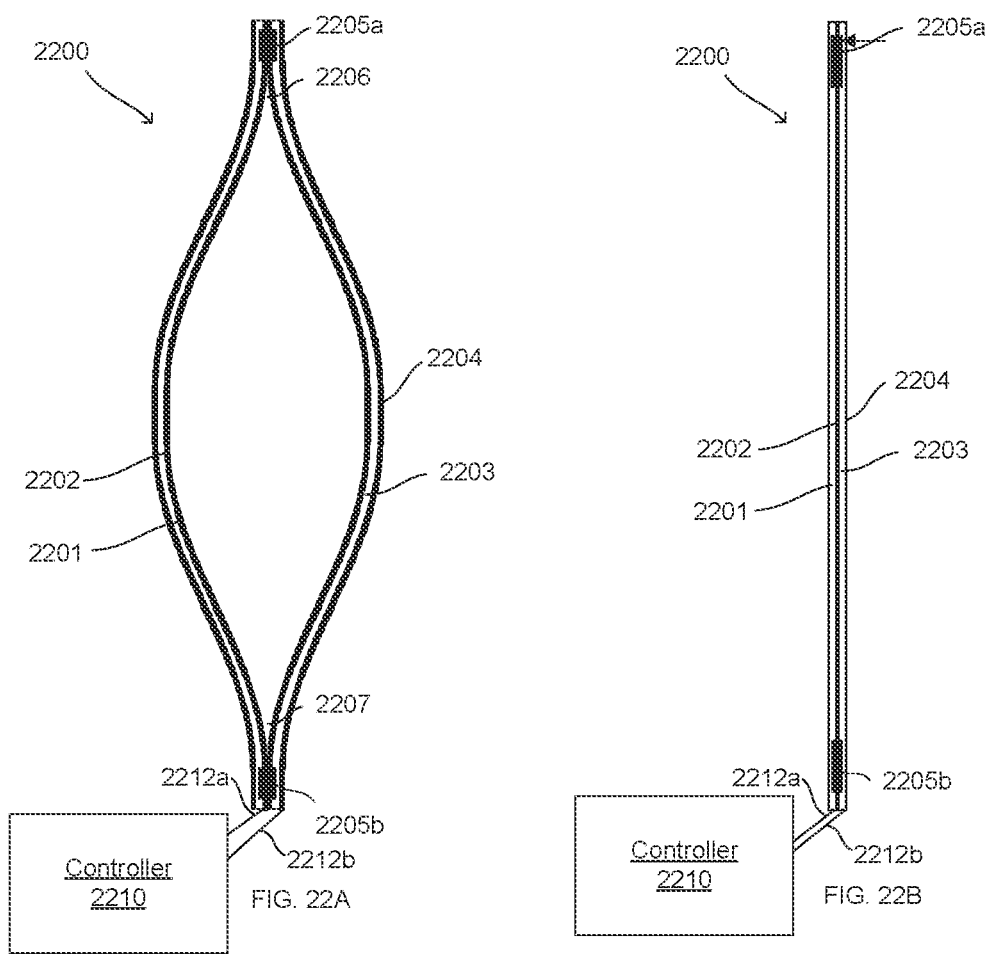

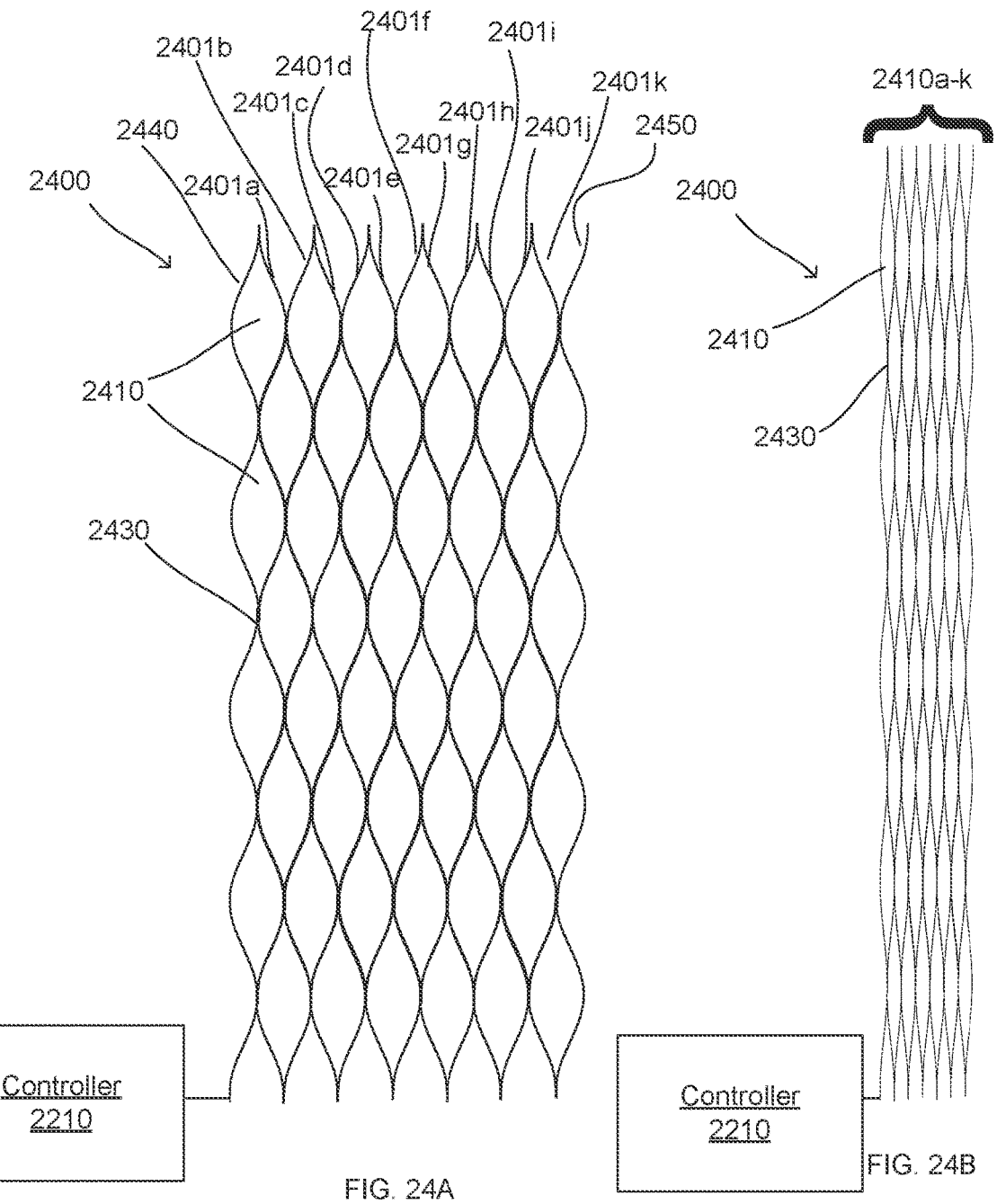

VARIABLE THERMAL INSULATION ASSEMBLY

This application is a continuation of U.S. application Ser. No. 15/758,690, filed Mar. 8, 2018, which is a National Stage Entry of International Application No. PCT/CA2016/051072, filed Sep. 9, 2016, which is a non-provisional application of U.S. Application Ser. No. 62/216,614, filed Sep. 10, 2015 and U.S. Application Ser. No. 62/218,949, filed Sep. 15, 2015. U.S. application Ser. No. 15/758,690; International Application No. PCT/CA2016/051072, U.S. Application Ser. No. 62/216,614 and U.S. Application Ser. No. 62/218,949 are incorporated by reference.

TECHNICAL FIELD

The present disclosure relates to a variable thermal insulation assembly that includes a plurality of thermal cell arrays that are adjustable between an expanded state and a compressed state.

BACKGROUND

During sunny weather conditions it is often desirable to maximize the transmission of sunlight into a building to assist with both lighting and heating of the interior of the building. By contrast, during dark, cloudy, or cold weather conditions it is often desirable to maximize the thermal insulation of a building to minimize heat loss from the building. Windows are typically employed in buildings to facilitate the transmission of sunlight into the building while also providing a sealed barrier against the entry of wind, rain, snow and other undesirable elements. While windows typically provide a relatively high degree of optical transmission which may be advantageous for sunny weather conditions, they also typically provide a relatively low degree of thermal insulation which may be undesirable for dark, cloudy, or cold weather conditions.

Attempts have been made to develop solutions that provide both a high degree of optical transmission and a high degree of thermal insulation. However, many of these solutions have failed to provide sufficient sunlight transmission or thermal insulation, require frequent adjustment throughout the day, are costly, or are overly complex.

SUMMARY OF THE INVENTION

The disclosure provides a variable thermal insulation assembly that includes an array of air-enclosing cavities or pockets, referred to herein as thermal cells, that is adjustable between an expanded state and a compressed state. In the expanded state, the variable thermal insulation assembly provides a thermally insulating layer, whereas in the compressed state, the variable thermal insulation assembly retracts such that the thermal insulation provided is reduced relative to the expanded state. In some embodiments, the variable thermal insulation assembly may be installed in association with a window such that, in the expanded state, light transmission through the window may be reduced relative to the compressed state, in which light is transmitted through the window. The array of thermal cells is referred to herein as a thermal cell array.

One aspect of the disclosure provides a variable thermal insulation assembly that includes a frame that circumscribes a thermal actuation region having a gas, one or more thermal cell array units positioned within the thermal actuation region, each thermal cell array unit including a first surface sheet and a second surface sheet, wherein the first and second surface sheets are similarly shaped and define a thermal cell array region therebetween, a thermal cell array positioned within each thermal cell array region and coupled to the first and second surface sheets such that the thermal cell array substantially fills the thermal cell array region, wherein each thermal cell array comprises a plurality of sheets and at least two of the sheets in each thermal cell array are flexible sheets, wherein adjacent pairs of said flexible sheets are bonded together along at least one pair of bonding regions that extend substantially parallel to each other such that each pair of flexible sheets defines at least one substantially longitudinally symmetrical cavity between each pair of bonding regions, each longitudinally symmetrical cavity being one of a plurality of thermal cells, wherein a distance between each pair of bonding regions is sufficiently small that the total heat loss arising from convective gas flow within the thermal cells is less than total heat loss arising from thermal conduction of the gas present within the thermal actuation region, wherein the distance between each pair of bonding regions is sufficiently large, and the thermal conductivity of the sheets is sufficiently low, such that heat transfer due to thermal conduction within the sheets is less than the heat loss due to thermal conduction of the gas of the thermal actuation region, wherein each of the plurality of thermal cells is bonded to another thermal cell or a sheet in order to form a connected thermal cell array unit, a position controller coupled to at least one of the first and second surface sheets for applying a control force on at least one of the first and second surface sheets to expand the thermal cell array into an expanded state and compress the thermal cell array into a compressed state within the thermal actuation region to vary a volume of the thermal actuation region that is occupied by the thermal cell array units, wherein the plurality of sheets are sufficiently thin and formed of one or more materials that are sufficiently compliant such that, for each first and second sheet, when the thermal cell arrays are in the expanded state by the applied control force, a gap between each surface sheet and the adjacent frame surface or surface sheet, is made sufficiently small that the total heat loss that is attributable to gas flow through the gap is less than the total of the heat loss due to thermal conduction through the thermal cells.

In a further aspect, the position controller is coupled to the one of the first and second sheets such that, when the control force is applied, the at least one of the first and the second surface sheets move in a direction that is normal to the one of the first and second surface sheet such that, during the moving the first and second surface sheets are maintained substantially parallel to each other.

In a further aspect, the position controller is coupled to the one of the first and second surface sheets such that, when the control force is applied, the one of the first and second surface sheets pivots whereby a first end of the one of the first and second surface sheet is substantially fixed relative to a corresponding first end of the other of the first and second surface sheets, and a second end of the one of the first and second surface sheets, opposite the first end, moves relative to the second end of the other of the first and second surface sheets.

In a further aspect, at least some of the plurality of sheets comprising the thermal array are coated on at least a first side by a layer of material having a thermal emissivity of less than 0.2.

In a further aspect, the material is aluminum.

In a further aspect, each of the plurality of sheets comprising the thermal array has a curved shape, and the plurality longitudinally extending regions follow the curved shaped such that the formed longitudinally extending cavities have the curved shape.

In a further aspect, the support frame further comprises a front panel and a back panel coupled to the edge elements to form an enclosed panel that encloses the array.

In a further aspect, the front panel and back panel are light-transmitting window elements fabricated that are fabricated from one of glass, mylar, acrylic, polycarbonate, polyethylene, or ethylene tetrafluoroethylene.

In a further aspect, light-transmitting window elements are diffusely light-transmitting elements.

In a further aspect, the front panel and the back panel are each formed from a thin, light-transmitting material, wherein the front panel and the back panel are bonded together in a periphery region to define a pillow-shaped cavity within the enclosed panel.

In a further aspect, the thin, light transmitting material is one of polyethylene, polycarbonate, or ethylene tetrafluoroethylene.

In a further aspect, the enclosed panel further includes a vent utilized for increasing a pressure within the enclosed panel for increasing a structural rigidity of the enclosed panel.

In a further aspect, a volume defined by the enclosed panel is filled with an inert gas.

In a further aspect, the inert gas is argon gas.

In a further aspect, an inner surface of at least one edge element has a reflectivity of at least 80%.

In a further aspect, the inner surface of the at least one edge element has a convex profile.

In a further aspect, edge elements comprise a first end element at the first end, a second end element at the second end, and a pair of side elements that connect the first and second end elements, wherein at least one of the side elements includes a seal element for inhibiting airflow through an opening of the plurality of longitudinally extending cavities adjacent to the side element when the array is in the expanded state.

In a further aspect, the seal element is a first inflatable bladder.

In a further aspect, one of the first end element and the second end element includes a second inflatable bladder coupled to the first inflatable bladder by an air-transfer connection to transfer air between the first inflatable bladder and the second inflatable bladder, wherein the air-transfer connection is configured to inflate the first inflatable bladder and deflate the second inflatable bladder when the array is in the expanded state, and inflate the second inflatable bladder and deflate the first inflatable bladder when the array in the compressed state.

In a further aspect, the variable thermal insulation assembly includes a position controller for transitioning the array between the expanded state and the compressed state.

In a further aspect, the position controller is an electrostatic system wherein the plurality of sheets of the thermal cell array are formed of an electronically insulative material that is coated on one side with an electrically conductive material such that, for each pair of sheets, the electrically conductive material coating of each flexible sheet of the pair are separate by at least one layer of the electrically insulative material, the variable thermal insulation assembly further including a controller to apply an electric potential difference between each adjacent pairs of sheets such that the electrically conductive coatings of the adjacent pair of sheets attract each other to cause the array to be in the compressed state, and a plurality of biasing elements located with the plurality of longitudinally extending cavities to bias adjacent pairs of sheets away from each other to cause the array to be in the expanded state in the absence the controller applying an electrical charge.

In a further aspect, the plurality of biasing elements are provided by forming the plurality of flexible sheets from an elastomeric material, wherein the elastomeric material is deformed such that the plurality of flexible sheets are biased into the expanded state.

In a further aspect, the light-transmitting window elements have a first portion that is diffusely light transmitting and a second portion that is non-diffusely light transmitting such that the diffusion characteristics of the transmitted light can be controlled.

In a further aspect, each thermal cell consists of two flexible film elements, each flexible film element having two edge-bond zones that comprise less than 20% of a surface area of the flexible film element, each edge-bond zone extending in a direction parallel to the longitudinal direction of the flexible film element, and a central bond zone comprising less than 20% of the surface area and extending parallel to the longitudinal direction along the center of the flexible film element, each thermal cell is formed by bonding two flexible film elements along the edge bond zones, thermal cells are oriented into stacks for which each thermal cell is bonded to an adjacent thermal cell along the central bond zone, and a plurality of said stacks are oriented within the thermal cell region such that the stacks do not make contact with one another even when thermal cell array unit is in the compressed state.

In a further aspect, additional thin sheets similar in size and shape to the first and second surface sheets, are positioned within said stacks and bonded there along the film element central bond zones, in order to stabilize the stacks against lateral motion within the stack during controlled movement of the first and/or second sheets.

In a further aspect, the plurality of sheets are sufficiently thin and formed of one or more materials that are sufficiently compliant such that an average size of the gap, when the thermal cell array is in the expanded state, is less than 5 mm.

In a further aspect, the plurality of sheets are sufficiently thin and formed of one or more materials that are sufficiently compliant such that the average size of the gap, when the thermal cell array is in the expanded state, is less than 0.5 mm.

Another aspect of the present disclosure provides a variable thermal insulation assembly that includes at least one array comprising a plurality of sheets of film, wherein the plurality of sheets are in a stacked arrangement and each sheet is bonded to an adjacent sheet along a plurality of longitudinally extending regions such that each pair of adjacent sheets form a plurality of longitudinally extending cavities between adjacent regions of the adjacent sheets, a support frame comprising end elements, wherein the support frame frames the plurality of sheets, wherein support frame is coupled to the array to support the array such that the array may transition between an expanded state in which the array is expanded by extending a front side of the array within a plane of the supporting frame in a direction from a first end of the support frame to a second end of the support frame, the direction being perpendicular to a longitudinal axis of the longitudinally extending regions, such that the longitudinally extending cavities are expanded to provide thermal insulation over the support frame, and a compressed state in which the array is compressed within the plane of the frame along the direction perpendicular to the longitudinal axis such that the longitudinally extending cavities are compressed, wherein in the expanded state, the front edge conforms to one of the second end of the support frame or a second front edge of a second array to form a seal that inhibits air flow between the front edge and the one of the second end of the support frame or the second front edge of the second array.

In a further aspect, one end of the plurality of longitudinally extending cavities are fixed in a closed position such that a transition between the compressed state and the expanded state is a pivoting motion.

In a further aspect, each of the plurality of sheets comprise a plurality of separate portions such that adjacent portions of a sheet are bonded together at the longitudinally extending region.

In a further aspect, wherein the thickness of the array in the compressed state is less than 20% of the thickness of the array in the expanded state.

In a further aspect, the thickness of the array in the compressed state in less than 5% of the thickness of the array in the expanded state.

In a further aspect, the front side of the array is sufficiently compliant such that the front edge conforms to form a seal between the array and adjacent elements at low pressure.

BRIEF DESCRIPTION OF THE DRAWINGS

Embodiments of the present disclosure will now be described, by way of example only, with reference to the attached figures, in which:

FIG. 3A is a diametric view of an enclosed panel, labeling the top, bottom, side and front elements according to an embodiment;

FIGS. 3B and 3C show front and top views of the enclosed panel, and labels the direction of expansion and compression of the thermal cell array unit according to the embodiment shown in FIG. 3A;

FIGS. 8A and 8B depict 30° oblique views of an enclosed panel incorporating an inflatable bladder according to an embodiment, wherein the bladder is shown in a deflated state and an inflated state, respectively;

FIGS. 9A and 9B depict front elevation cross-sectional views of an enclosed panel incorporating a two-part inflatable bladder system according to an embodiment;

FIGS. 22A and 22B are top cross-sectional views of one cavity of a thermal cell array unit that includes an electrostatic position controller according to an embodiment;

FIGS. 24A and 24B are top cross-sectional views of a thermal cell array unit according to the embodiment shown in FIGS. 22A and 22B.

DETAILED DESCRIPTION

The embodiments described in the present disclosure relate to a variable thermal insulation assembly that includes an adjustable thermal cell array unit. In some embodiments the variable thermal insulation assembly is configured such that the thermal cell array unit may be adjustable between a thermally insulative expanded state and an optically transmissive compressed state.

Figure 1A:
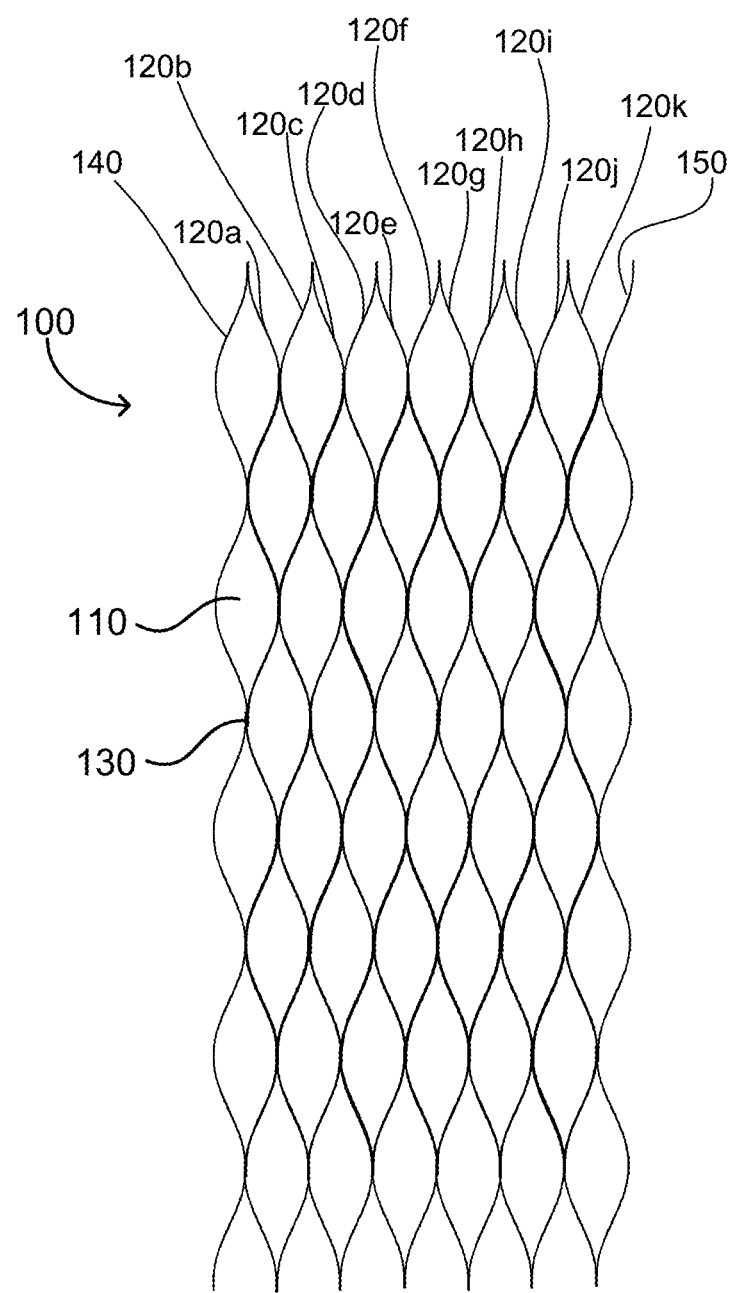
FIGS. 1A and 1B are top cross-sectional views of a thermal cell array unit configured in an expanded state and a compressed state, respectively, according to an embodiment.
Figure 1B:
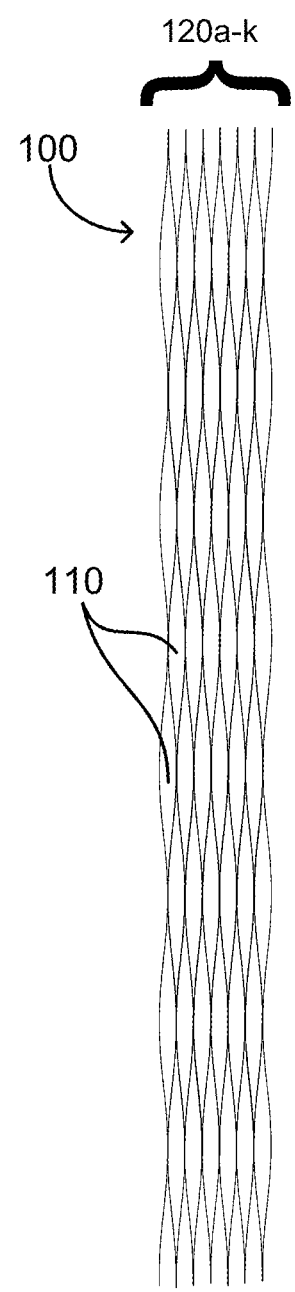

Referring to FIGS. 1A and 1B, top cross-sectional views of a first embodiment of a thermal cell array unit 100 are shown. The thermal cell array unit, alternatively referred to herein as an "array unit", generally comprises the thermal cell array, alternatively referred to herein as an "array", and the first and second surface sheets. The array unit 100 generally comprises a first surface sheet 140, a second surface sheet 150 and a thermal cell array 115 that is comprised of a plurality of flexible sheets 120a-k that are generally arranged in a stacked arrangement. Although the example shown in FIGS. 1A through 1D includes eleven flexible sheets 120a-k in the thermal cell array, the thermal cell array may include more or less than eleven flexible sheets 120a-k.

The thermal cell array 115 is positioned in a region 145 between the first and second surface sheets 140 and 150, which may be described herein as the "thermal cell array region 145". As described in more detail below, the thermal cell array unit 100 is generally positioned in a thermal actuation region in order to provide variable thermal insulation within that thermal actuation region. Generally speaking, the thermal actuation region will contain air or other gases or gas mixtures.

Surface sheets 140 and 150 are similarly shaped such that when surface sheets 140 and 150 are positioned as close as possible to one another in the maximally compressed state, both the gaps between sheets 140 and 150 and the distances between adjacent edges of surface sheets 140 and 150 are small relative to the overall size of surface sheets 140 and 150. When surface sheets 140 and 150 are aligned as such, gaps between surface sheets 140 and 150 and the distances between adjacent edges of surface sheets 140 and 150 are preferably less than $1/10$ of the overall dimension of the sheet. As an example, for a rectangular sheet with a length and width dimension, where the width is smaller than the length, surface sheets 140 and 150 are considered similarly sized if gaps between surface sheets 140 and 150 and the distances between adjacent edges of surface sheets 140 and 150 are preferably less than $1/10$ of the sheet width dimension. As described in more detail below with reference to FIG. 7, the surface sheets 140 and 150 may each have, for example, a convex shape.

The flexible sheets 120a-k, which may alternatively be referred to herein simply as sheets, may be formed of layers of thin, flexible reflective film. The sheets 120a-k may be any suitable thin, flexible film material including, for example a metallic film, aluminized polyester film, aluminized Mylar, or any low thermal conductivity or low cost reflective films. Sheets 120a-k may be coated on one or both sides by a thin metallic coating or other low emissivity coating. It may be desirable that the thermal emissivity of the material coating the sheets 120a-k is less than 0.2, and more desirably less than 0.05, recognizing that investments made in reducing this ratio will have diminishing economic terms because of the very minimally changing loss associated with thermal conduction of the gas.

Surface sheets 140 and 150 may be formed of the same material and coated in the same manner as sheets 120a-k, or they may be formed from a different flexible film material. Each sheet 120a-k is bonded to an adjacent sheet 120a-k along a plurality of longitudinally extending bonding regions 130. For example, sheet 120a is bonded to sheet 120b, as shown in FIG. 1A. The bonding regions 130 of pairs of adjacent sheets form a plurality of parallel longitudinally extending thermal cells 110. As such, each pair of flexible sheets 120a-k define at least one substantially longitudinally symmetrical thermal cell 110 between each pair of bonding regions 130. The term longitudinal symmetry refers to a structure that has a longitudinal direction and has the characteristic that the cross sectional shape of the structure in planes that are orthogonal to the structure's longitudinal direction, is substantially uniform. The bonding regions 130 may be generally linear regions that are directed into the page in the views shown in FIGS. 1A and 1B. The bonding utilized to form bonding regions 130 may be provided by any suitable means including adhesive that is deposited as a liquid and subsequently cured, adhesive strips or films, ultrasonic bonding, thermal bonding, and chemical bonding such as solvent welding.

In the example shown in FIGS. 1A through 1D, the surface sheets 140 and 150 are bonded to the thermal array formed by sheets 120a-k along longitudinally extending bonding regions 130 in a similar manner as sheets 120a-k are bonded to one another. Alternatively, other methods of bonding the surface sheets 140 and 150 may be utilized such as, for example, bonding the surface sheets 140 and 150 in a bonding region that extends over substantially all of the area of the surface sheets 140 and 150, or in bonding regions that are not longitudinally extending.

Adjacent thermal cells 110 formed from the same pair of sheets 120a-k are sealed from adjacent thermal cells 110 along the longitudinal edge by the bonding in bonding regions 130. Each thermal cell 110 is bonded either to at least one other thermal cell 110 or is bonded to an adjacent sheet 120a-k that is also bonded to at least one other adjacent thermal cell to form a connected thermal cell array.

The sealing between adjacent thermal cell 110 need not be hermetically sealed. Additionally, the ends of the thermal cell 110, along the edges of the sheets 120a-k extending perpendicular to the longitudinal axis of the bonding regions 130, may also be sealed closed. The width of each air-enclosing thermal cell 110, i.e., the spacing between bonding regions 130, may be less than 5 cm, and more desirably less than 1 cm such that an insignificant amount of thermally-induced convective flow occurs within each thermal cell 110.

Figure 1C:
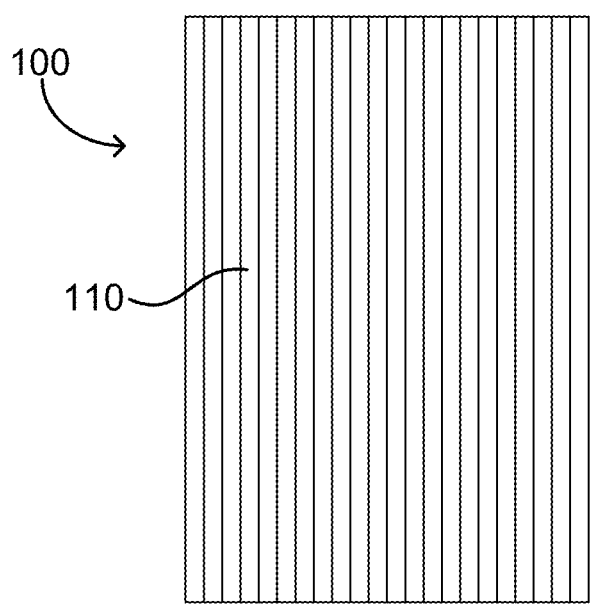
FIGS. 1C and 1D are front elevation cross-sectional views of the thermal cell array unit according to the embodiment shown in FIG. 1A with the array in an expanded state and a compressed state, respectively.
Figure 1D:
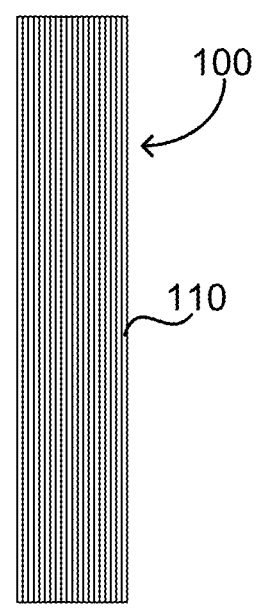

The thermal cell array 115 is attached to surface sheets 140 and 150 in such a manner that as the distance between surface sheets 140 and 150 is increased by means of an applied control force applied by a position controller (not shown) coupled to at least one of the surface sheets 140 and 150, the shape of the thermal cells 110 expand so that the thermal cell array 115 substantially fills the thermal cell array region 145 between the surface sheets 140 and 150. In this expanded state of the array, the array fully occupies the thermal actuation region. FIGS. 1A through 1D show an example in which the thermal cell array unit 100 is expanded along a direction perpendicular to the longitudinal axis defined by the longitudinally extending bonding regions 130 or compressed by compressing the array in the opposite direction. FIGS. 1C and 1D show front-elevation cross-sectional views of array unit 100 that correspond to FIGS. 1A and 1B, respectively. In the views shown in FIGS. 1A and 1B, the sheets 120a-k extend in the direction into the page, and the longitudinally extending regions that are bonded extend in the direction into the page.

Expanding the array unit 100 causes the thermal cells 110 to expand, as shown in FIGS. 1A and 1s described herein as the expanded state, and compressing the array unit 100 causes the thermal cells 110 to compress, as shown in FIGS. 1B and 1s described herein as the compressed state. Air flows into the thermal cells 110 when the array unit 100 is expanded and air is forced out of the thermal cells 110 when the array unit 100 is compressed. In the expanded state, the array unit 100 may act as a thermal insulator due to the air-enclosing pockets.

The size of the thermal cells is determined by the distance between each pair of bonding regions 130 comprising the thermal cell array 115. This distance between bonding regions 130 is sufficiently small that the total heat loss arising from convective gas flow within the thermal cells 110 is less than total heat loss arising from thermal conduction of the gas present within the thermal actuation region. Furthermore, the distance between each pair of bonding regions 130 is sufficiently large, and the thermal conduction of the sheets is sufficiently low, that heat transfer due to thermal conduction within the sheets is less than the heat loss due to thermal conduction of the gas. Accordingly, the procedure for determining the acceptable range for the distance between each pair of bonding regions 130 is either by experimental testing and thermal loss measurements, or by thermal modeling software. In either case, it will be found that if this distance is too large, thermal convection will be enabled within the thermal cells and will contribute excessively to thermal loss, and in contrast, if the distance is too small, the conductivity of the sheets will contribute excessively to thermal loss, because the distance along the sheet that heat must flow becomes smaller and this allows greater heat loss. Ideally, it will be possible to ensure that the heat loss from thermal convection and from thermal conduction of the sheets will be less than 25% of the intrinsic heat loss associated with thermal conduction of the gas present in the thermal cells. In typical applications, the ideal range for the distance between the bond regions is greater than 10 mm and less than 50 mm.

As described in more detail below, the array unit 100 in the expanded state may be expanded to cover a window, for example, to provide insulation when desired, and may be compressed into the compressed state when insulation is not desired, such that the array is compressed so that it no longer covers the window, allowing light to enter a building.

When compressed, the array unit 100 generally possesses a thickness that is significantly less than when the array unit is in the expanded state. In many applications, the overall thickness of the array unit in the compressed state is about 25% or less, and desirably less than 5%, of the thickness of the array unit 100 in the fully expanded state.

Figures 2A, 2B:
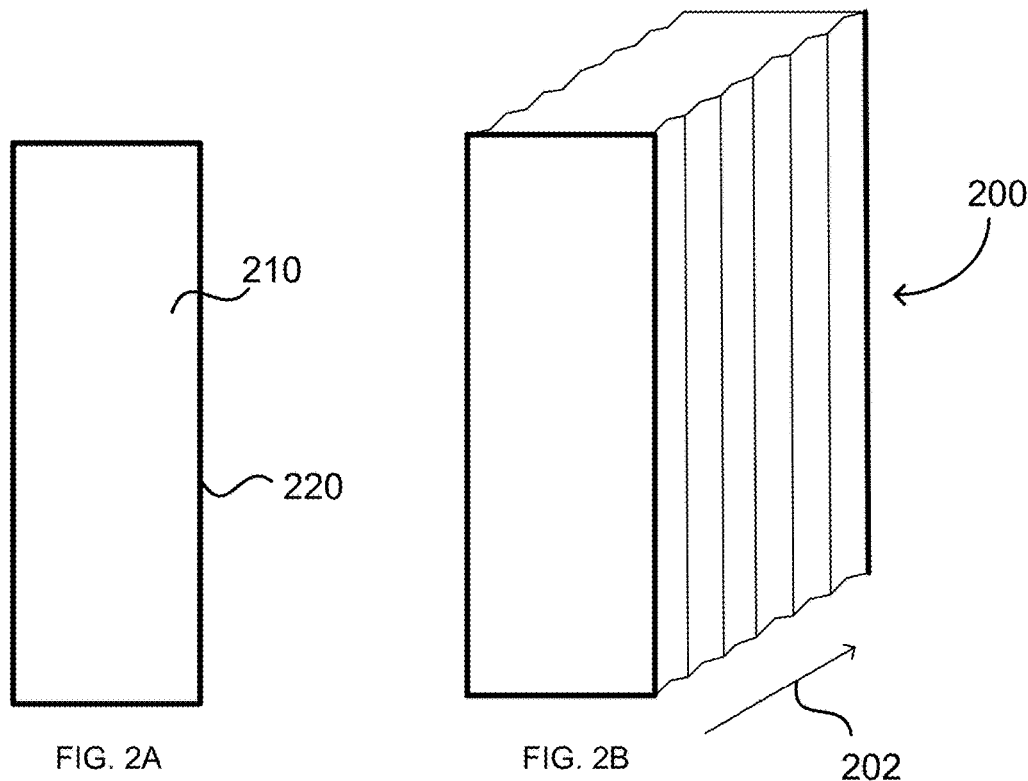
FIG. 2A depicts a side elevation view of a rectangular thermal cell array unit.
FIG. 2B depicts a schematic 30° oblique view of a rectangular thermal cell array unit configured in an insulative state according to the embodiment shown in FIG. 2A.

FIGS. 2A and 2B depict the shape of a rectangular thermal cell array unit 200. Array unit 200 can be expanded and compressed along a direction (shown as arrow 202 in FIG. 2B) perpendicular to the longitudinally extending regions to transition between the expanded and compressed states as shown in FIGS. 1A and 1B, respectively. In some applications, rectangular profile 210, with the longitudinally extending regions running parallel to the edge 220 is desirable. For example, rectangular profile 210 may be desirable in a structure formed using steel or aluminum frame elements that support flat rectangular panels or windows, as is common in some types of greenhouse construction.

Figures 2C, 2D:
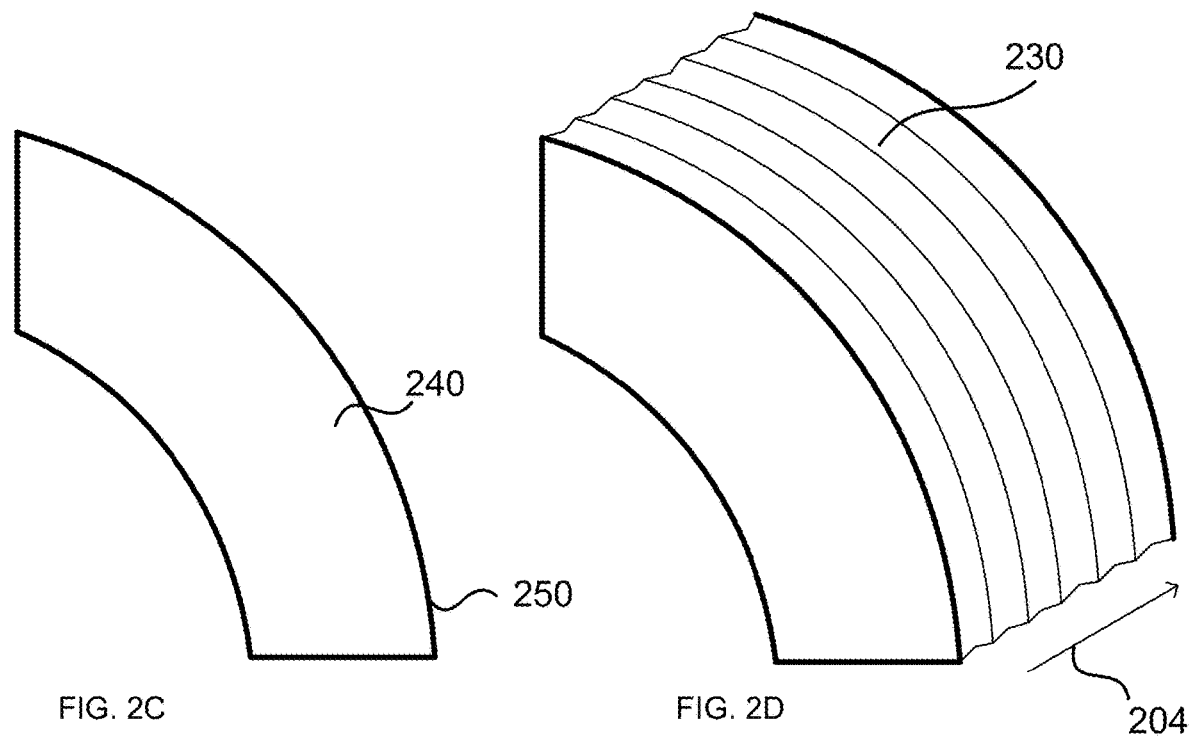
FIG. 2C depicts a side elevation view of a curved thermal cell array unit side elevation view.
FIG. 2D depicts a schematic 30° oblique view of a curved thermal cell array unit configured in an insulative state according to the embodiment shown in FIG. 2C.

FIGS. 2C and 2D depict the shape of a curved thermal cell array unit. Array unit 230 can be expanded and compressed along a direction (shown by arrow 204) perpendicular to longitudinally extending regions to transition between the expanded and compressed states as shown in FIGS. 1A and 1B, respectively. In some applications, curved profile 240, with longitudinally extending regions extending in a direction parallel to curved sides 250 is desirable. For example, curved profile 240 may be desirable in a structure formed using curved steel or aluminum frame elements that support curved rectangular panels, windows, or sheet material, as is typical for construction of greenhouses often described as hoop houses or Quonset hut greenhouses. Curved segment 250 may comprise an arc of a circle but need not be restricted to an arc of a circle. The preferred shape of the curved segments may be determined by the shape of the structure into which the curved elements are incorporated.

Generally, the array unit 100 is supported within a support frame 300 to form a variable thermal insulation assembly 350. Support frame 300 circumscribes a thermal actuation region in which the array unit 100 is positioned. Referring to FIG. 3A, an example support frame 300 is shown. The support frame 300 provides a means of supporting or otherwise orienting the array unit 100 appropriately for its given application. One or more thermal cell array units 100 may be positioned within the thermal actuation region circumscribed by support frame 300 and these one or more thermal cell array units 100 may be supported by one support frame 300.

The support frame 300 includes edge elements 302, 304, 306, and 308. Elements 302 and 306 may be referred to as side elements, element 304 may be referred to as a top element, and element 308 may be referred to as a bottom element. The support frame 300 may optionally include a front window 310 and a back window 312 to form an enclosed panel that fully enclose the thermal actuation region, as described in more detail below. The enclosed panel may be suitable for providing, for example, a multi-paned window or a skylight structure. The terms side, top, bottom, front, and back are utilized herein to refer to the orientation shown in the particular figures referred to, and are not intended to be otherwise limiting.

FIGS. 3B and 3C show front and top views, respectively, of a variable thermal insulation assembly 350 that includes an array unit 100 coupled to and within a support frame 300. The array unit 100 may be expanded and compressed within the support frame in the direction illustrated by arrow 320 to transition between the expanded and compressed states. In this embodiment, a position controller (not shown) is coupled to the first of the two surface sheets (not shown). When the control force is applied to the thermal unit by the position controller, the first surface sheet moves in a direction that is normal to the first surface sheet such that, during the motion, the first and second surface sheets are maintained substantially perpendicular to one another. This desired motion may be ensured by inclusion of a variety of structural linear constraint elements, including low friction bearings, rollers, tracks, support wires and guides. The array unit 100 shown in FIGS. 3B and 3C is in a partially compressed state for illustrative purposes.

The array unit 100 shown in FIGS. 3B and 3C may be coupled at one end 314 to the array unit 100 to the side element 306 such that the end 316 that is opposite the end that is coupled to the side element 306 may be, for example, pulled or pushed to transition the array unit between the expanded state and the contracted state. The end 314 of the array unit 100 that is coupled to the side element 306 may be either end that runs parallel to the longitudinally extending bonding regions 130 to facilitate expanding the cavities 110 to expand the array unit 100 along the direction 320. In the arrangement shown in FIGS. 3B and 3C, the outermost surface sheet at the end 314 of the array unit 100 remains in a substantially fixed position relative to the support frame 300 during expansion and compression of the array unit 100.

When the array unit 100 is expanded, it may press against any of the edge elements 302, 304, 306, and 308, or against adjacent similarly expanded array units 100 in the case that multiple array units are provided within the support frame 300, such that the array unit and the support frame or adjacent array unit against which it expands forms an air flow attenuation structure that that sufficiently reduces air flow through the gap, thus sufficiently reducing heat loss caused by air exfiltration and/or convective air flow. The plurality of sheets are sufficiently thin and formed of one or more materials that are sufficiently compliant that no additional pressure is required to achieve the desired air flow attenuation than that which is already needed to reliably expand the array unit. This air flow attenuation structure achieved by the sufficiently compliant array is required to achieve the desired insulation targets using practical methods for controlling the expansion and compression of the array unit. The desired airflow attenuation structure is achieved when the average, or effective, physical size of the gap between the expanded array unit and the adjacent support frame element or array unit has a dimension less than 5 mm and ideally less than 0.5 mm. The force per unit area of the surface sheets of the thermal cell array units that is required to reliably expand the array unit depends on the dimensions (in particular the thickness of sheets 120*a-k* and the dimensions of air-enclosed pockets 110) and material composition (in particular the Young's modulus of sheets 120*a-k*) of the array. Typically, the value of this desired pressure per unit area will be in the range 1,000 to 10,000 Pa.

Figure 4A:
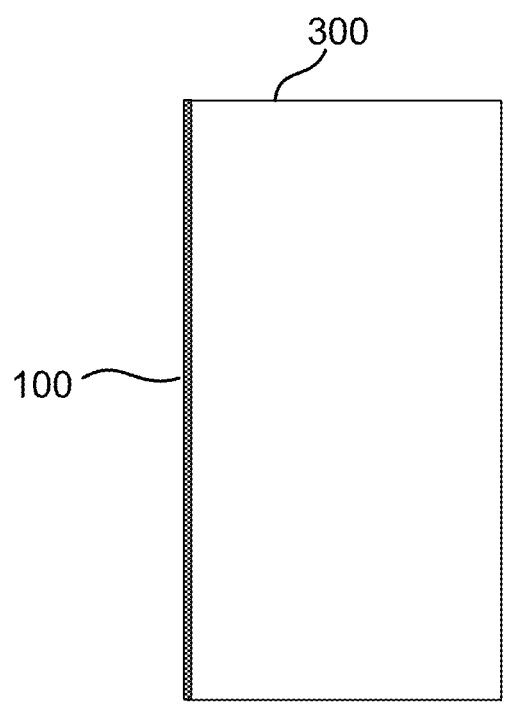
FIGS. 4A and 4B show the front and side views of an enclosed panel according to an embodiment with the thermal cell array unit fully compressed and depicts that the sunlight is transmitted through the panel.
Figure 4B:
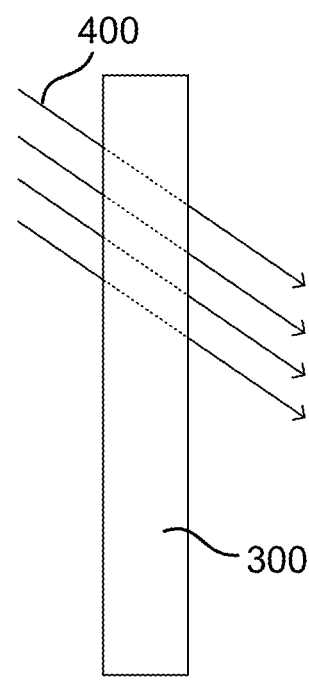
Figure 4C:
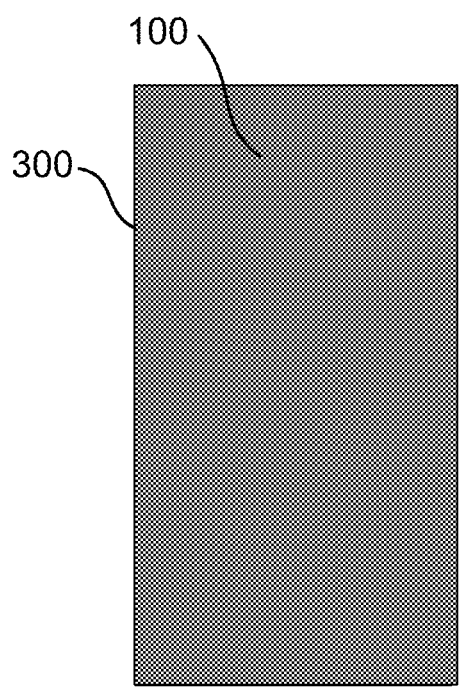
FIGS. 4C and 4D show the front and side views of an enclosed panel according to the embodiment shown in FIG. 4A with the thermal cell array unit fully expanded and depicts that the sunlight is not transmitted through the panel.
Figure 4D:
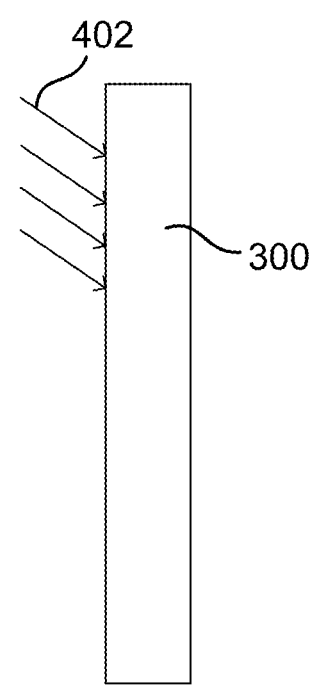

FIGS. 4A and 4B show a front and a side view of an array unit 100 within a support frame 300, with the array unit 100 in a fully compressed state. The support frame 300 may be an enclosed panel that includes front and back windows, as described in more detail below. As shown in FIGS. 4A and 4B, when the array unit 100 is in the fully compressed state, the support frame 300 is substantially open and sunlight, represented by arrows 400 may be transmitted through the support frame 300. FIGS. 4C and 4D show the array unit 100 and support frame 300 from FIGS. 4A and 4B with the array unit 100 in a fully expanded state. As shown in FIGS. 4C and 4D, when the array unit 100 is in the fully expanded state, the support frame 300 is substantially closed by the array unit 100 and sunlight, represented by arrows 402, is substantially inhibited from passing through the support frame 300.

Figure 5A:
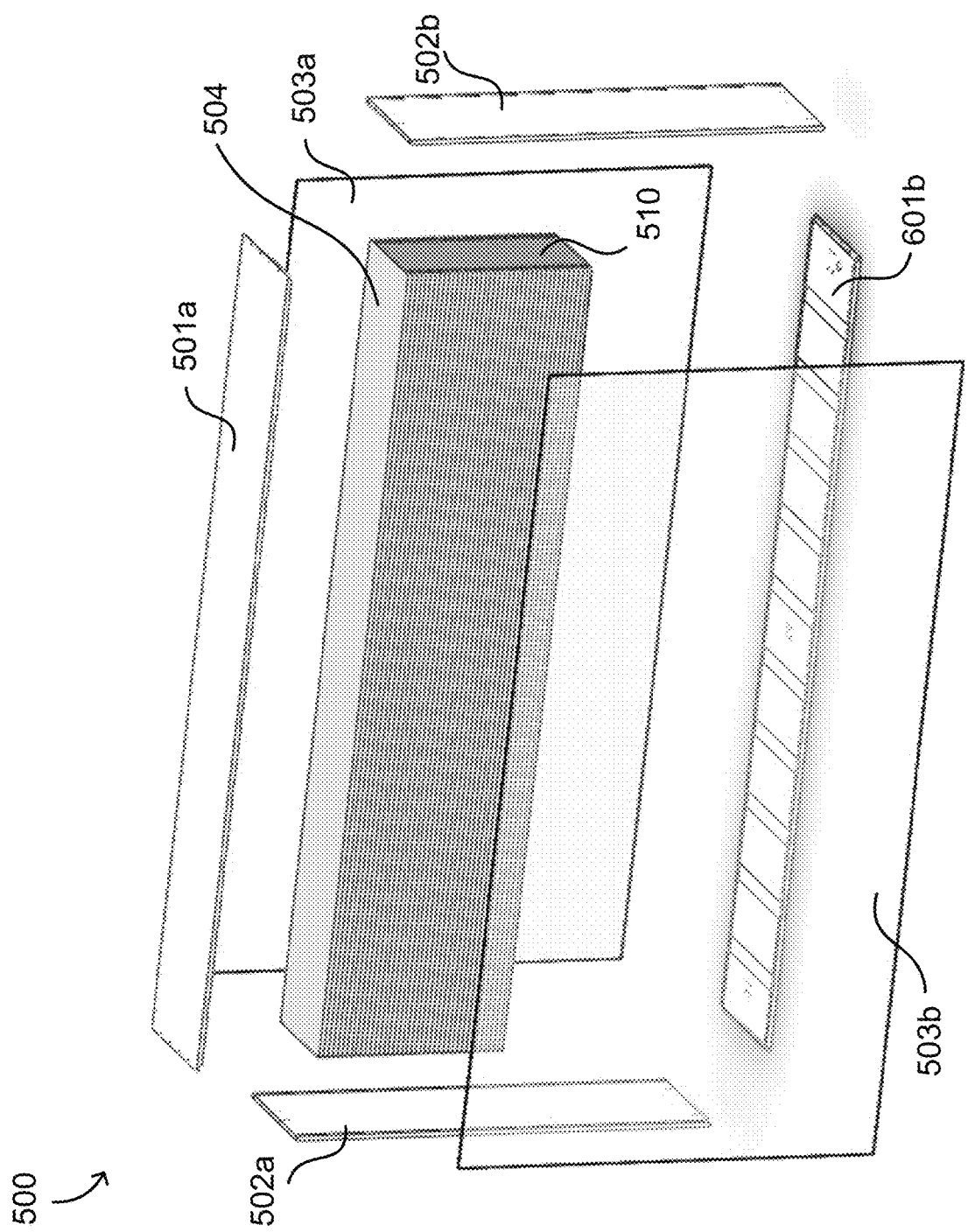
FIG. 5A is an exploded view showing the components of an enclosed panel containing a thermal cell array unit according to an embodiment.
Figure 5B:
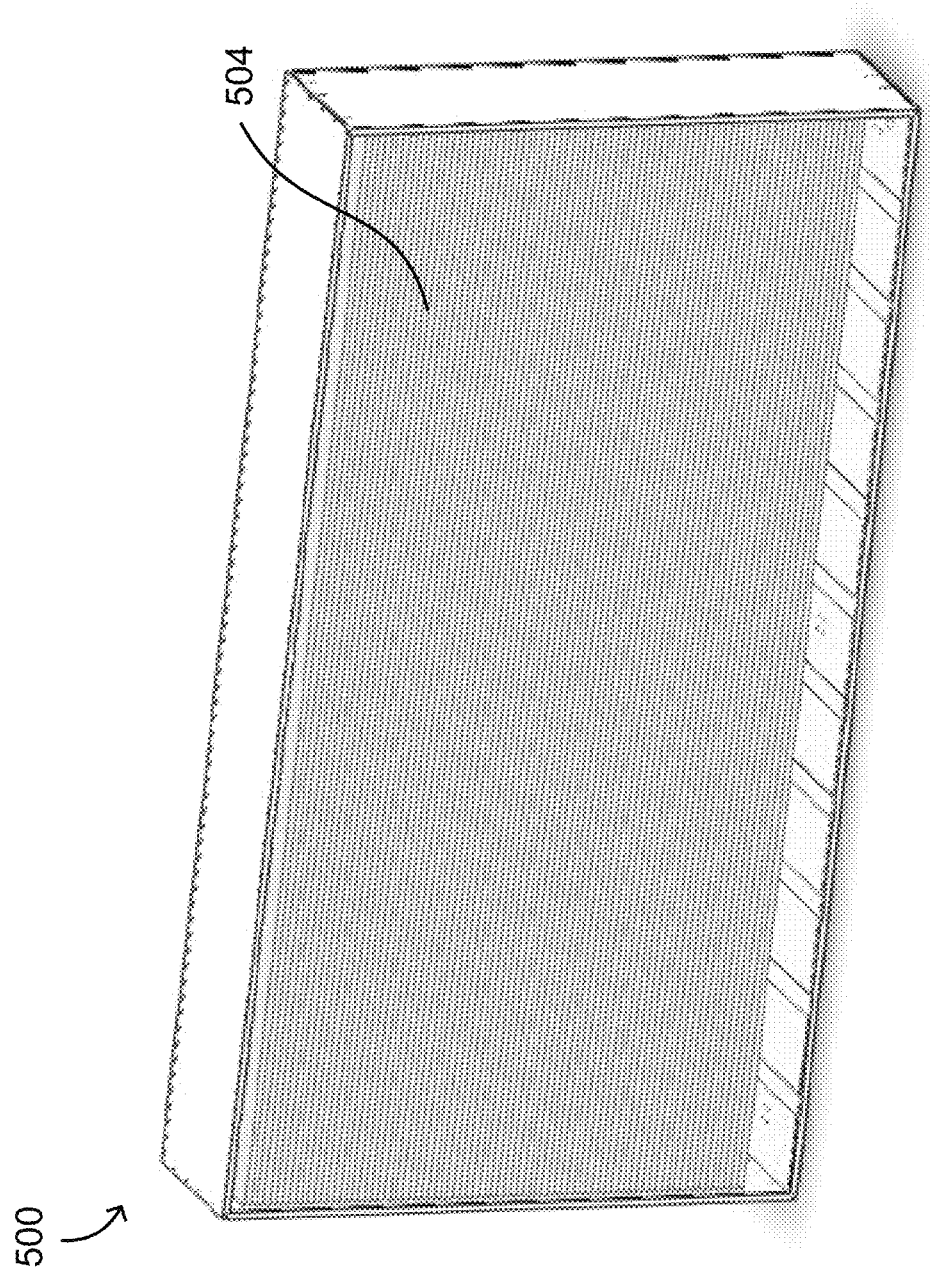
FIGS. 5B and 5C are diametric views of an enclosed panel according to the embodiment of FIG. 5A with the thermal cell array unit in the insulative state and the transmissive state, respectively.

An example of an enclosed panel 500 utilized to form a variable thermal insulation assembly 501 is shown in FIGS. 5A and 5B. FIG. 5A shows an exploded view of the components of the enclosed panel 500. Support frame elements 501*a*, 501*b*, 502*a*, and 502*b* form a rectangular support frame, similar to support frame 300 described above. Window elements 503*a* and 503*b* are supported by frame elements 501*a*, 501*b*, 502*a*, and 502*b* by an adhesive layer (not shown), a retaining edge groove (not shown), or any other suitable method for attaching the window elements 503*a* and 503*b* to the support frame. Window elements 503*a* and 503*b* may be fabricated from a material with high light transmission such as, for example, as glass, acrylic plastic, ethylene tetrafluoroethylene sheet, or polycarbonate plastic sheeting. The material utilized for windows 503*a* and 503*b* may desirably be a material that can be cleaned periodically to remove dust and dirt that may collect on the exterior surfaces of window elements 503*a* and 503*b*. In other embodiments, the material for window elements 503*a* and 504*b* may not have high light transmission properties such as, for example translucent material that diffuse transmitted light. Alternatively the window elements 503*a* and 503*b* may be an opaque material such that the enclosed panel 500 may be utilized as a wall panel rather than as a window.

The diffusion characteristics of the transmitted light are determined by the degree of diffusion caused by the light-transmitting panes as the light passes through the pane. A diffusing pane, for example one made from glass or plastic having a milky-white appearance, causes substantially collimated light to become substantially un-collimated as it passes through the pane. A non-diffusing pane, for example one made from highly transparent glass or plastic, causes substantially collimated light to maintain its collimation as it passes through the pane. The desired diffusion characteristics of the transmitted light can be achieved by selecting appropriate optical characteristics for the light-transmitting panes of the panel housing the thermal cell array unit, and appropriately expanding and compressing selected array units within the overall variable thermal insulation assembly. For example, for a greenhouse structure incorporating multiple panels, a portion of the light-transmitting panels may incorporate diffusing panes and another portion of the light-transmitting panels may incorporate non-diffusing panes. In this example, if it is desirable for the transmitted light to be diffused, the array units adjacent the diffusing panes can be compressed and the array units adjacent the non-diffusing panes can be expanded. This will cause light to enter predominately through the diffusing panes only. Similarly, if it is desirable for the transmitted light to be non-diffused, the array units adjacent the diffusing panes can be expanded and the array units adjacent the non-diffusing panes can be compressed. This will cause light to enter predominately through the non-diffusing panes only.

Figure 5C:
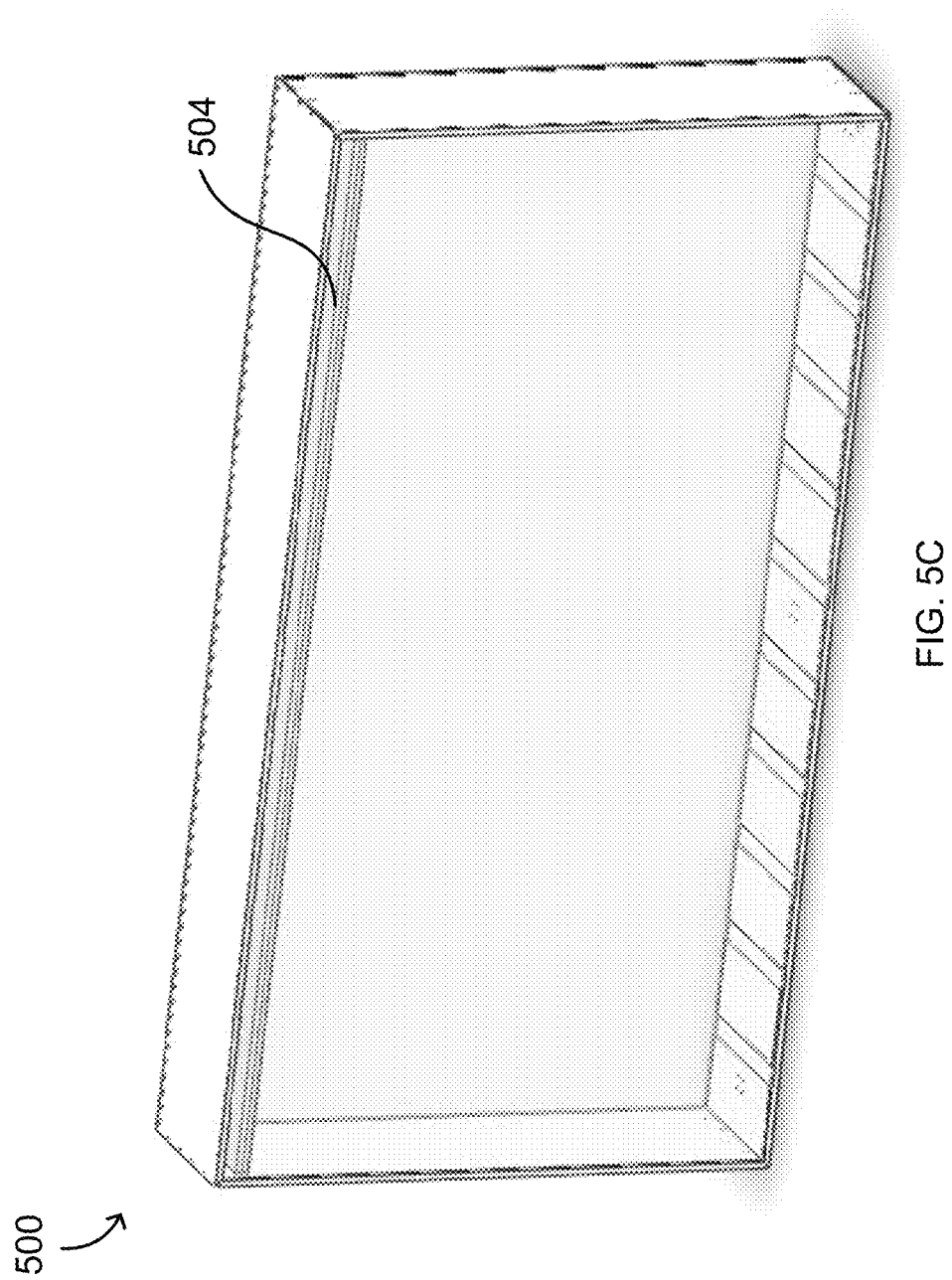

Frame elements 501*a*, 501*b*, 502*a*, and 502*b* need not be optically transparent and may desirably be fabricated using materials with low thermal conductance. The frame elements 501*a*, 501*b*, 502*a*, 502*b*, which may be substantially similar to elements 306, 302, 308, and 304, respectively, of support frame 300 described previously, and the window elements 503*a* and 503*b* of the enclosed panel 500 define a thermal actuation region, that houses a thermal cell array unit 504, such as the array unit 100 described above. As shown in FIG. 5B, the thermal cell array unit 504 may be expanded into an expanded state that fills the enclosed cavity to facilitate the enclosed cavity 500 providing thermal insulation. FIG. 5C shows enclosed panel 500 with thermal cell array unit 504 compressed into a compressed state to reduce the area of the window elements 503a and 503b that are blocked to increase the amount of incident light transmitted through the enclosed panel 500. The specific size and shape of enclosed panel 500 will depend on the application. The enclosed panel 500 may be, for example, 60 cm wide, 200 cm tall and 15 cm thick. These example dimensions have been specified here because they are consistent with the size of rectangular frame elements in typical steel or aluminum frame greenhouse construction. In this example panel, the perimeter to area ratio is sufficiently small that heat loss along the edges of the panel would be minimal. The example panel is not so large, however, as to be difficult or inconvenient for handling during manufacturing, assembly or installation. It is anticipated that a wide range of panel dimensions could be appropriate for different applications.

For a given application, the desired thermal insulation value of the array unit 100 or the enclosed panel 500 can be achieved by adjusting a number of parameters, including, for example, the number of layers of thin, flexible film used to fabricate the thermal cell array unit, choice of whether the thin, flexible film is coated on one side or on both sides with a thin layer of low thermal emissivity material, by enclosing an appropriate gaseous medium (such as argon) within the thermal cells of the array unit 504, and by adjusting the degree to which the 504 array unit forms a barrier or air flow attenuation structure with the adjacent frame elements 501a, 501b, 502a, and 502b in the enclosed panel 500 at all points along the array unit's 504 periphery to prevent transfer of heat through either exfiltration of air or gas or convective flow. Air flow is attenuated by sufficiently reducing the size of the gap between the surface sheet and the adjacent frame surface or surface sheet of an adjacent thermal cell array unit. The gap is reduced to a sufficiently small amount such that the amount of heat loss caused by air flow through the gap around the edges of the thermal cell array unit 504 is less than, and ideally much less than, the heat loss due to thermal conduction through the thermal cell array unit 504.

In the case where a gaseous medium is used, the air inside the enclosed panel 500 would be replaced with this gaseous medium. The enclosed panel 500 may or may not be pressurized. In some applications it may be appropriate for the panel 500 to be pressurized and in other applications it may be necessary to incorporate a pressure release valve (not shown) in such a way that the heat transfer associated with the pressure adaptation is reduced.

When the array unit is in an expanded state, the insulation value achieved is greater than when the array unit is in the compressed state. In many applications, in the expanded state it is desirable that the insulation value is at least R-5 (RSI 0.88) and preferably at least R-15 (RSI 2.64).

In some applications, it may be desirable to increase the transmission of light through the enclosed panel 500. In many applications, it is desirable that in the compressed state preferably at least 70%, and ideally at least 90%, of the incident light is transmitted through the panel 500. There are a number of features which can be incorporated into an enclosed panel 500 in order to increase light transmission through the enclosed panel 500 when the array unit 504 is in the compressed state. Referring to FIG. 5A, light transmission may be increased by decreasing the thickness of the frame elements 501a, 501b, 502a, and 502b of the enclosed panel 500, thereby increasing the fraction of the total panel face area occupied by transparent window elements 503a and 503b. Light transmission may also be increased by causing the interior or inward-facing surfaces of frame elements 501a, 501b, 502a, and 502b to have highly light-reflective characteristic. This can be achieved, for example, by adhering or otherwise applying a thin layer of highly reflective material and preferably highly specularly reflective material to the interior or inward-facing surfaces of frame elements 501a, 501b, 502a, and 502b. The reflectance of the highly reflective material may desirably be at least 80%, which is a typical reflectance value for inexpensive vapour-deposited aluminum coatings. A skilled person would understand that other modifications to the enclosed panel 500 may be possible, in addition to, or alternative to, the above described features.

In some applications, it may be desirable to minimize the length of edge 510 of the thermal cell array unit 504. Referring to the embodiment depicted in FIG. 5A, the enclosed panel 500 side frame elements 501a and 501b that are substantially longer than end frame elements 502a and 502b, and further if thermal cell array unit 504 expands and compresses by moving between side frame elements 501a and 501b. Because it may be more difficult to reliably achieve adequate air flow attenuation along the sliding edge of the thermal cell array unit, i.e., the sides adjacent to end frame elements 502a and 502b in FIG. 5A, having the sliding edge of thermal cell array unit 504 moves along the shorter dimension of enclosed panel 500 as shown in FIG. 5A may be desirable to provide greater air flow attenuation compared to an arrangement in which the thermal cell array unit 504 moves between end frame elements 502a and 502b.

Figure 6:
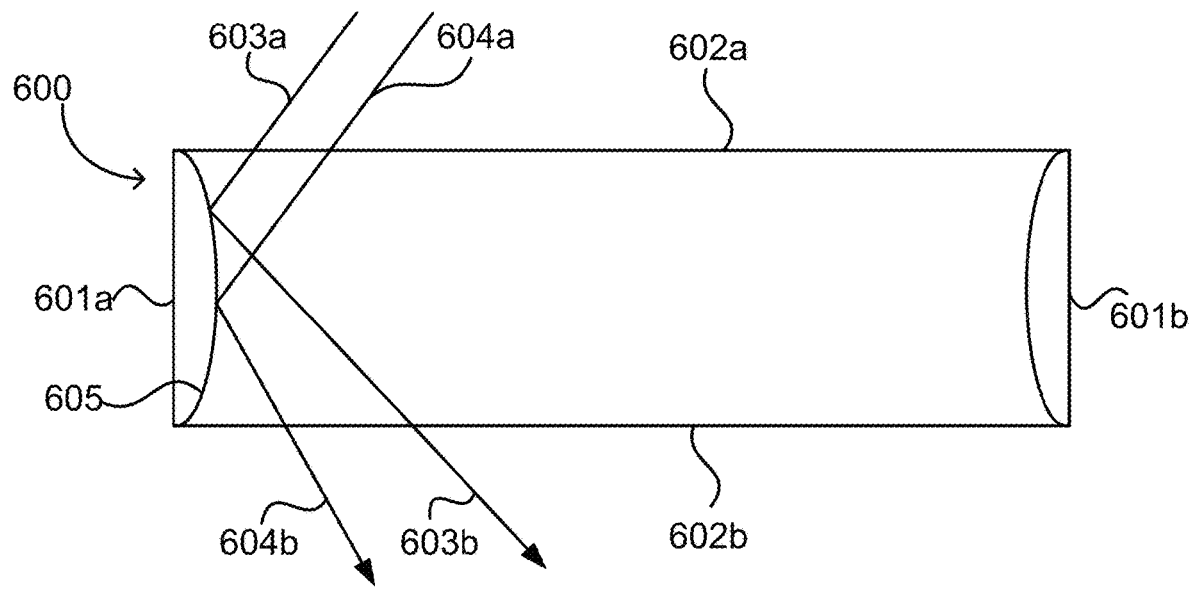
FIG. 6 depicts a cross-sectional view of an enclosed panel having curved interior surfaces according to an embodiment.

Light transmission may also be increased by causing interior frame elements 502a and 502b to have a curved profile in order to cause the light reflected by frame elements 502a and 502b to transmit through window element 503b within a desirable angular range. FIG. 6 depicts a cross-sectional view of an enclosed panel 600, which may be similar to enclosed panel 500 described above, as a means of illustrating this method of increasing light transmission. Note that FIG. 6 is not shown to scale, but rather the vertical dimension is somewhat exaggerated relative to the horizontal dimension, in order to more easily illustrate the key feature described below.

The enclosed panel 600 shown in FIG. 6 includes frame elements 601a and 601b and window elements 602a and 602b. A curved, reflective element 605 is adhered or otherwise attached to frame element 601a. FIG. 6 depicts enclosed panel 600 operating in the transmissive state, i.e., the thermal cell array unit (not shown) in a compressed state. In the compressed state, most light rays incident on window element 602a pass through window element 602a, travel without encountering an optical obstruction through the air cavity between window elements 602a and 602b, and transmit through window element 602b into the building structure. A fraction of the light rays incident on window element 602a encounter curved reflective element 605 after passing through window element 602a.

FIG. 6 depicts two example light rays encountering curved reflective element 605. Incident light ray 603a encounters curved reflective element 605, and reflects such that it follows the path indicated by transmitted light ray 603b. Incident light ray 604a encounters curved reflective element 605, and reflects such that it follows the path indicated by transmitted light ray 604b. Light rays 603a and 604a followed the same angular path when they transmit through window element 602a, but after reflecting from curved reflective element 605, they followed different angular paths when they transmit through window element 602b. The range of angles of transmitted light may at least partially be adjusted by altering the shape of curved reflective element 605.

It may be desirable for the variable thermal insulation assembly to achieve high thermal insulation characteristics, and high thermal insulation characteristics are achieved by reducing heat transfer across the thermal cell array unit. When the thermal cell array unit is arranged in the expanded state, it is preferable that there be minimal air gaps between the edges of the thermal cell array unit and the support frame elements of the enclosing panel, in order to reduce heat loss by air exfiltration through these gaps. The degree of required air flow attenuation depends in part on the desired application and characteristics of the enclosed panels. For example, the enclosed panels may or may not be well sealed, and a building structure itself may or may not be well sealed. Note that it may not be necessary to minimize air gaps at all edges of the thermal cell array unit. Depending on the physical orientation of the array unit (that is, whether it is oriented with the window elements parallel to the horizon, perpendicular to the horizon, or at some intermediate angle in between parallel and perpendicular to the horizon) it may be preferable to reduce air gaps at, for example, three of four edges of the thermal cell array unit. For example, a larger air gap along one edge of the array unit 504 would allow for differential thermal expansion of components comprising an enclosed panel according to, for example, the example enclosed panel 500 shown in FIGS. 5A through 5C, while also reducing heat loss via air exfiltration through gaps between the thermal cell array unit and the components of the enclosing panel.

Figure 7:
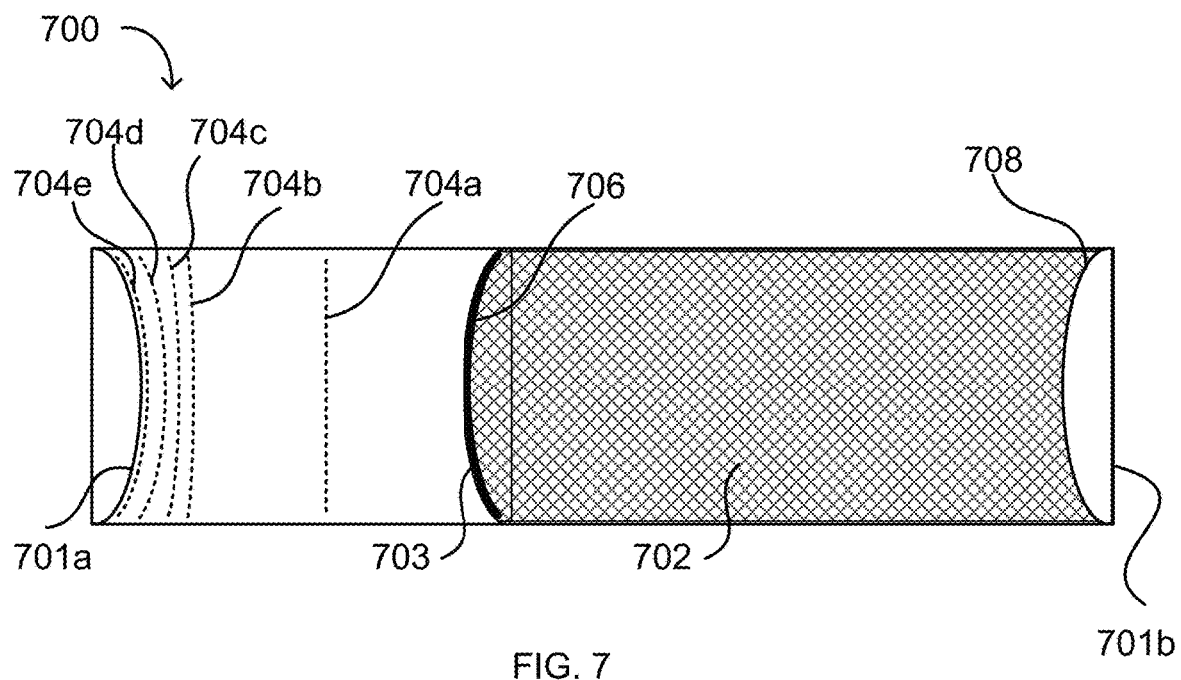
FIG. 7 depicts a cross-sectional view of an enclosed panel wherein the thermal cell array unit surface sheet conforms to a curved frame element according to an embodiment.

An example for reducing the air gap between the thermal cell array unit and the enclosing panel elements is shown in in FIG. 7. Note that FIG. 7 is not shown to scale, but rather the vertical dimension is somewhat exaggerated relative to the horizontal dimension, in order to more easily illustrate the key feature described here. FIG. 7 depicts enclosed panel 700 that includes frame elements 701a and 701b. A thermal cell array unit 702, which may be substantially similar to array unit 100 described above, is contained within the interior cavity of enclosed panel 700 and is shown in FIG. 7 in a partially expanded state. A first surface sheet 703 is attached to a front edge 706 of the thermal cell array unit 702, and a second surface sheet 708, forming a back edge of the thermal cell array unit 702, is coupled to frame element 701b. In the example shown in FIG. 7, the surface sheet 704.

Surface sheet 703 may be fabricated from a thin and/or flexible sheet material such as mylar, polycarbonate, acrylic, or polyethylene. In the compressed state, surface sheet 703 conforms to the shape of frame element 701b. Note that while FIG. 7 depicts frame element 701b as having a curved shape, frame element 701b need not be curved. Surface sheet 703 may have light-reflecting characteristics, so that when thermal cell array unit 702 is compressed against frame element 701b to achieve the transmissive state, incoming light rays that encounter surface sheet 703 will reflect from surface sheet 703 and transmit into the building structure. Surface sheet 703 may have specularly reflective light-reflecting characteristics or diffusely reflective light-reflecting characteristics.

Dotted lines 704a, 704b, 704c, 704d, and 704e depict the different profile and position of surface sheet 703 over time, as thermal cell array unit 702 is expanded to fill the cavity within enclosed panel 700. When thermal cell array unit 702 is fully expanded, and therefore in the expanded state, the flexible surface sheet 703 may substantially conform to the curved shape of frame element 701a, reducing the air gap between the thermal cell array unit 702 and the frame element 1001a, forming an air flow attenuation structure.

As described earlier, the array unit is sufficiently compliant that no additional pressure is required to achieve the desired air flow attenuation than is already needed to expand the array unit. This air flow attenuation structure achieved by the sufficiently compliant array unit is required to achieve the desired insulation targets using practical methods for controlling the expansion and compression of the array unit. The desired airflow attenuation structure is achieved when the average or effective physical gap between the expanded array unit and the adjacent support frame element or array unit has a dimension less than 5 mm and ideally less than 0.5 mm. The pressure required to expand the array depends on the dimensions (in particular the thickness of the sheets comprising the array and the dimensions of air-enclosed pockets) and material composition (in particular the Young's modulus of sheets comprising the array) of the array. As mentioned previously, well known techniques for experimentally measuring heat loss for modelling heat loss using available software make it readily possibly to determine the acceptable values for the sheet parameters in order to comply with the requirements stated.

In another example, an air gap between the thermal cell array unit and the frame components may be reduced using a seal element. This seal element may be an inflatable bladder located on an inner surface of a support frame element and that expands when the array unit is in the expanded state. FIGS. 8A and 8B show an example enclosed panel 800 that includes an inflatable bladder 801. The thermal cell array unit is not shown in FIGS. 8A and 8B for simplicity. When the array unit is in the compressed state, the inflatable bladder 801 is deflated, as shown in FIG. 8A, to inhibit obstruction of light passing through the enclosed panel 800 by the bladder 801. When the array unit is in the expanded state, the inflatable bladder 801 may be inflated to reduce a gap between the edges of the array unit and the edge element 802, providing a seal that inhibits air flow between the edges of the array unit and the edge element 802 of the enclosed panel 800. The inflatable bladder 801 may be included, for example, on an edge element 802 that is adjacent to an edge of the array unit that includes the open ends of the longitudinal air pockets such that inflating the bladder 801 provides a seal at these open ends.

In this example, the array unit, such as array unit 100 shown in FIGS. 1A through 1C, would have longitudinally extending regions oriented vertically such that the bladder would provide a seal along a lower edge that includes openings of the horizontally extending air-pockets. In other examples, more than one inflatable bladder 801 may be provided, each bladder on a respective edge element of the enclosed panel 800 to provide a seal along more than one edge. Inflatable bladder 801 may be inflated by an air pump or other pneumatic pressure-generating device (not shown), contained partly or fully inside enclosed panel 800, or fully outside enclosed panel 800.

Referring to FIGS. 9A and 9B, another example is shown in which air gaps between the thermal cell array unit and the frame components may be reduced using a two-part inflatable bladder system. FIGS. 9A and 9B show an enclosed panel 900 that includes a thermal cell array unit 901 contained within the cavity of enclosed panel 900, a first inflatable bladder 902 coupled to an inner surface of a first edge element 904 and a second inflatable bladder 903 coupled to a second edge element 905 that is perpendicular to the first edge element. The thermal cell array unit 901 may be substantially similar to array unit 100 described above. FIGS. 9A and 9B are not shown to scale, and in particular the size of the second inflatable bladder 903 is exaggerated relative to the first inflatable bladder 902 for illustrative purposes.)

Inflatable bladders 902 and 903 may share an air-transfer connection (not shown) such that air can transfer between the two bladders. When the array unit 901 is in the compressed state as shown in FIG. 9A, the first inflatable bladder 902 is deflated to inhibit obstruction of incoming light, and the second inflatable bladder 903 is inflated. When the array unit is in the expanded state as shown in FIG. 9B, the first inflatable bladder 902 is inflated and the second inflatable bladder 903 is partially deflated. In operation, when the thermal cell array unit 901 reaches a fully expanded state, a front edge 906 of the thermal cell array unit 901 presses against the second inflatable bladder 903, which causes air from the second inflatable bladder to be pushed through the air-transfer connection into the first inflatable bladder 902, and causing the first inflatable bladder 902 to inflate. The first inflatable bladder 902 in its inflated state provides a seal to reduce the gap between the edge 907 of the thermal cell array unit 901, which includes the open ends of the longitudinally extending air-pockets of the array unit 901, and the edge element 904 of the enclosed panel 900, inhibiting air flow through the gap between edge 907 and edge element 904 and through the open ends along edge 907 of the thermal cell array unit 901.

Figure 10A:
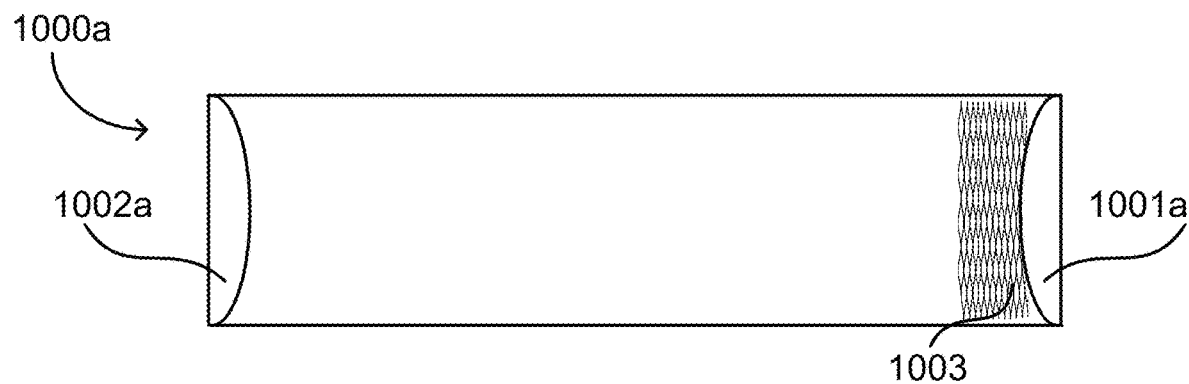
FIGS. 10A through 10C depict different configurations of thermal cell array units within an enclosed panel according to various embodiments.
Figure 10B:
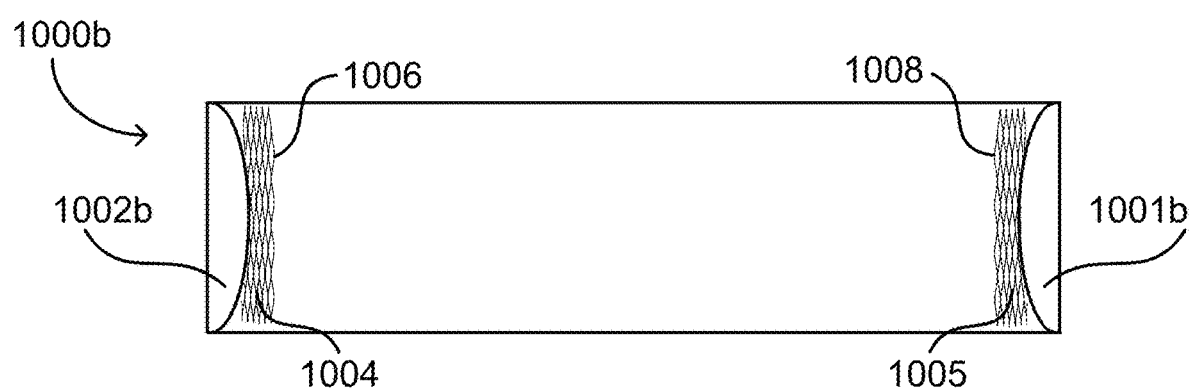
Figure 10C:
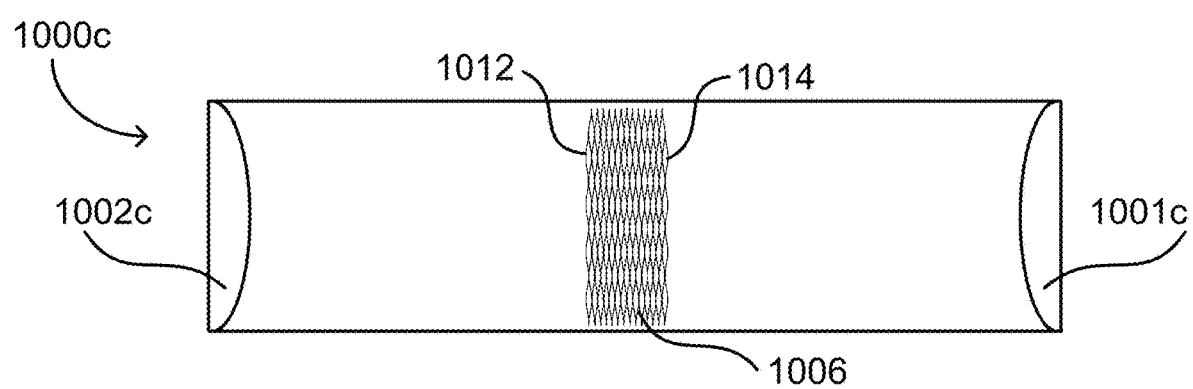

In some applications, it may be desirable to have a particular configuration of one or more thermal cell array units contained within an enclosed panel. FIGS. 10A through 10C depict different configurations of thermal cell array units within an enclosed panel. In the example shown in FIG. 10A, enclosed panel 1000a contains one thermal cell array unit 1003 as described above. In the example enclosed panel 1000a, thermal cell array unit 1003 is compressed toward frame element 1001a to transition to the compressed state. In the expanded state, the thermal cell array unit 1003 is expanded in the direction from frame element 1001a to frame element 1002a such that thermal cell array unit 1003 fills the enclosed panel 1000a.

In another example, shown in FIG. 10B, enclosed panel 1000b contains a first thermal cell array unit 1004 and a second thermal cell array unit 1005. In this example, in the compressed state, thermal cell array unit 1004 is compressed toward frame element 1002b and thermal cell array unit 1005 is compressed toward frame element 1001b such that the thermal cell array units 1004 and 1005 are located at opposing ends of the enclosed panel 1000b. In the expanded state, thermal cell array unit 1004 is expanded toward frame element 1001b, and thermal cell array unit 1005 is expanded toward frame element 1002b such that the expanded thermal cell array units 1004 and 1005 meet in a center region of the enclosed panel 1000b. Thermal cell array units 1004 and 1005 in the expanded state may press against each other along respective front edges 1006 and 1008, forming an air flow attenuation structure. One or both of the front edges 1006 and 1008 may include surface sheets (not shown) substantially similar to surface sheet 703 that conforms when the thermal cell array units 1004 and 1005 meet in order to form an air flow attenuation structure.

In another example, shown in FIG. 10C, enclosed panel 1000c contains one thermal cell array unit 1010 that is arranged in a center region of the enclosed panel 1000c. In this example, thermal cell array unit 1010 is compressed from both the front edge 1012 and the back edge 1014 toward the center of the region of the enclosed panel 1000c to transition into the compressed state. To transition to the expanded state (not shown), the thermal cell array unit 1006 is expanded such that the front edge 1012 moves toward frame element 1002c and the back edge 1014 moves toward frame element 1001c. In other examples, the enclosed panel may contain more than two thermal cell array units, and the arrangement of the thermal cell array units may include any combination of the above described example arrangements.

Figure 11:
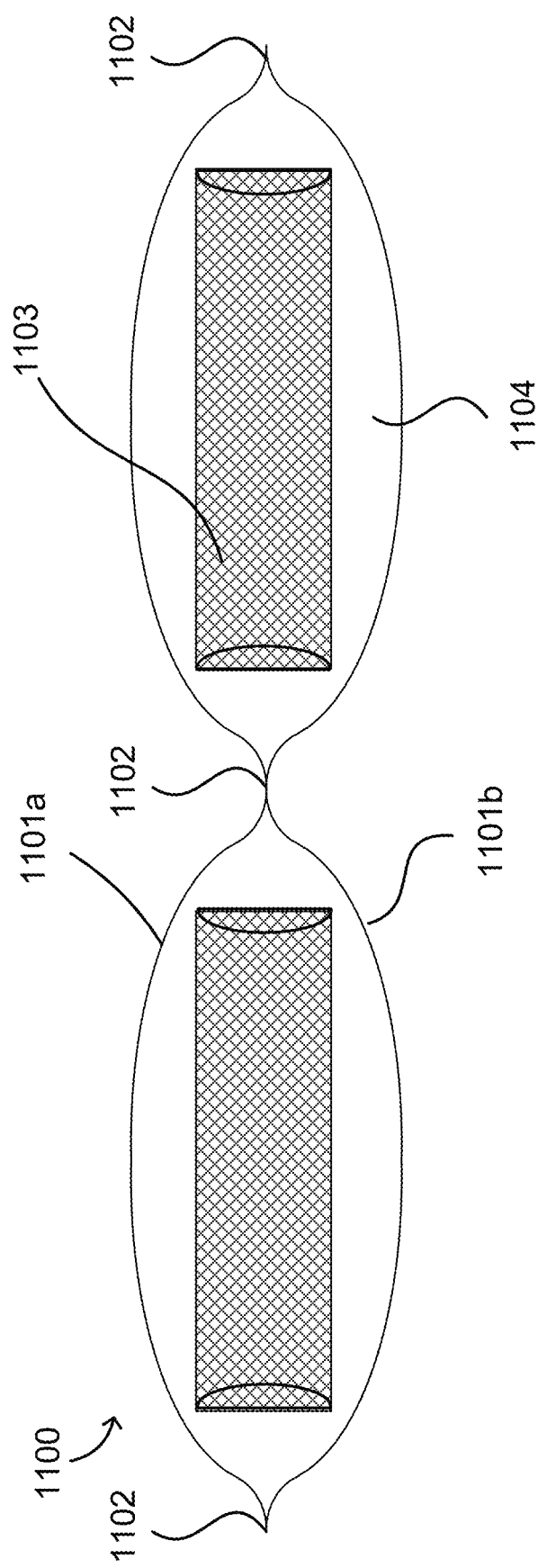
FIG. 11 depicts a cross-sectional view of a thermal cell array unit enclosed within a pillow-like enclosure according to an embodiment.

Referring now to FIG. 11, an example enclosed panel 1100 is shown that is formed by appropriately shaping a thin optically-transparent film material. The example enclosed panel 1100 shown in FIG. 11 is formed by bonding a pair of thin optically-transparent films 1101a and 1101b at bond regions 1102 to form pillow-shaped air cavity 1104 that encloses a thermal cell array unit 1103. The view shown in FIG. 11 is a cross-sectional view and, in practice, each bond region 1102 encloses one or more thermal cell array units 1103. In this embodiment, the bond regions 1102 and the films 1101a and 1102b form the elements of the enclosed panel, analogous to, for example, the elements 501a, 501b, 502a, 502b, 503a, and 503b of the enclosed panel 500 described above with reference to FIG. 5.

Films 1101a and 1101b may be formed from any suitable material including, for example, polyethylene, polycarbonate, and ethylene tetrafluoroethylene. Films 1101a and 1101b are bonded in bond region 1102 by any suitable means including, for example, adhesive tape, epoxy, ultrasonic bonding, and thermal bonding. Thermal cell array unit 1103 may be substantially similar to the array unit 100 described above. The pillow-shaped air cavity 1104 may be formed by using air pressure to inflate enclosure 1100 after the films 1101a and 1101b are bonded together. The enclosure 1100 may include, for example, a vent (not shown) to facilitate adjusting the amount of pressure within the cavity 1104, and thereby adjusting the corresponding degree of inflation of enclosure 1100. For example, in an embodiment where enclosure 1100 forms the exterior structure of the building structure, rather than being supported by the exterior structure of the greenhouse, it may be desirable to increase the degree of inflation of enclosure 1100 to provide more structural rigidity in the event of inclement weather. For example, the pressure within the enclosure 1100 may in increased by pumping air into a vent (not shown) in advance of inclement weather to provide greater rigidity, and may be decreased, by removing air through the vent, to reduce rigidity once the inclement weather has passed.

In order for the assembly to transition between the compressed state and the expanded state, it is necessary to have a means of causing the thermal cell array unit to expand and compress. While particular methods of expanding and compressing the thermal cell array unit are described here, other methods may be apparent to a person skilled in the art.

One example of a position controller for expanding and compressing the thermal cell array unit is a mechanical system using drive wires that are attached to either the thermal cell array unit or attached to a surface sheet which is further attached to the thermal cell array unit. These drive wires are subsequently attached to a mechanical drive assembly such that the drive wires can be moved in one direction to cause the thermal cell array unit to expand and the drive wires can be moved in a second, opposite direction to cause the thermal cell array unit to compress.

Figure 12:
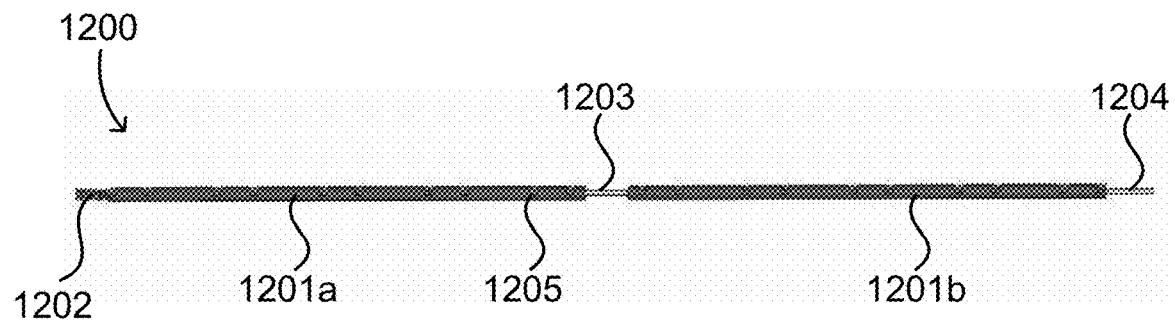
FIG. 12 depicts a threaded rod component for expanding and compressing a thermal cell array unit according to an embodiment.

The mechanical drive assembly may include a rotating drive rod, preferably having a circular cross-section, upon which the drive wires can be wound and unwound. FIG. 12 depicts an example of one such rotating drive rod. Example drive rod 1200 comprises two sections 1201a and 1201b. In the example shown in FIG. 12, grooved sections 1201a and 1201b have spiral grooves or threads machined into the outside perimeter of the rod, to facilitate winding and unwinding of the drive wires (not shown). The grooves in grooved sections 1201a and 1201b are not easily visible in FIG. 12, but are shown in detail in FIG. 13. Drive rod 1200 further comprises mounting sections 1202 and 1203, which slide into low friction mounting brackets (not shown) that attach drive rod 1200 to the frame elements forming the enclosed panel (not shown). Mounting sections 1202 and 1203 may have a smaller diameter than grooved sections 1201a and 1201b to facilitate low frictional movement within the mounting brackets. Drive rod 1200 further comprises end mount section 1204, which attaches to an end mounting bracket (not shown). End mount section 1204 may have spiral grooves or threads machined into the outside perimeter of the section, to facilitate rotation of drive rod 1200. Drive rod 1200 is rotated by connecting it to the rotating shaft of a motor (not shown). Drive wires (not shown) are attached to drive rod 1200 by connection screws 1205. The diameter of end mount section 1204 may be smaller than the diameter of grooved sections 1201a and 1201b.

Figure 13:
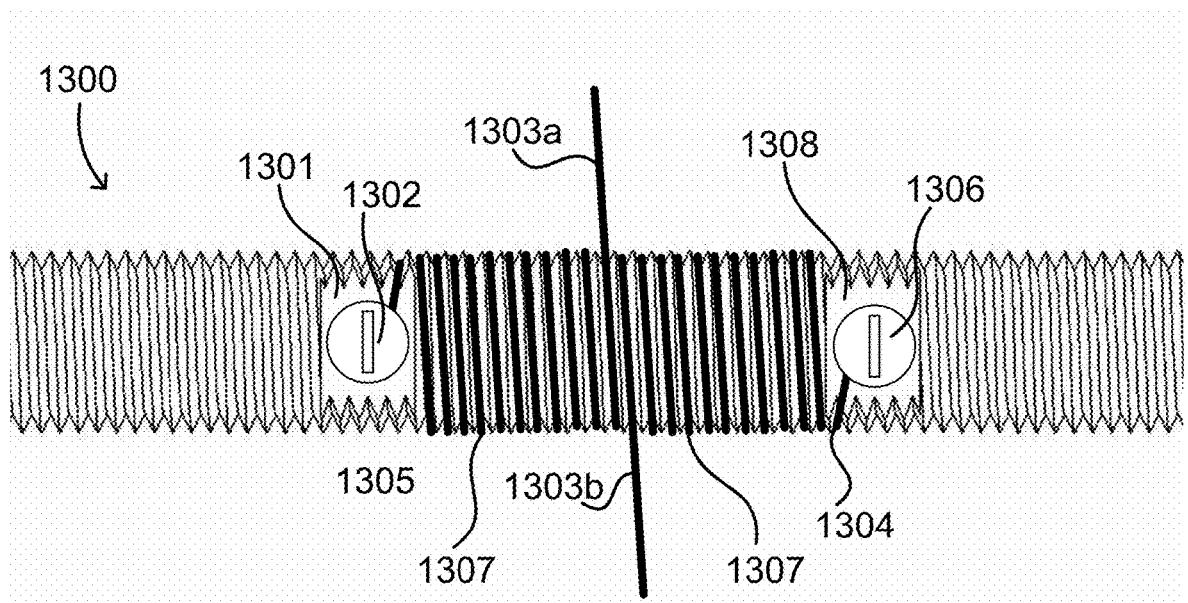
FIG. 13 shows a detailed view of a drive wire wrapped around a threaded rod component for expanding and compressing a thermal cell array unit according to an embodiment.

A detailed view of connection screws 1205 are shown on FIG. 13, where they are labeled 1305 and 1306. FIG. 13 shows a portion of grooved section 1300 (labeled 1201a in the depiction shown in FIG. 12). Referring to FIG. 13, the left end 1302 of drive wire 1307 is connected to grooved section 1300 by pressing it between connection screw 1305 and flat area 1301 machined into grooved section 1300. Drive wire 1307 is then wrapped around grooved section 1300 such that the wire is contained within the surface grooves. Drive wire 1307 is then pulled away from grooved section 1300 along the path labeled as 1303a in order to connect it to other components within the mechanical position controller, which may also be referred to as an actuation system for the thermal cell array unit (not shown). Drive wire 1307 then returns to the grooved section along the path labeled as 1303b. (Although it is not shown, paths 1303a and 1303b form a continuous loop of drive wire 1307.) Drive wire 1307 is then again wrapped around grooved section 1300 such that the wire is contained within the surface grooves. The right end 1304 of drive wire 1307 is connected to grooved section 1300 by pressing it between connection screw 1306 and flat area 1308 machined into grooved section 1300.

Figure 14:
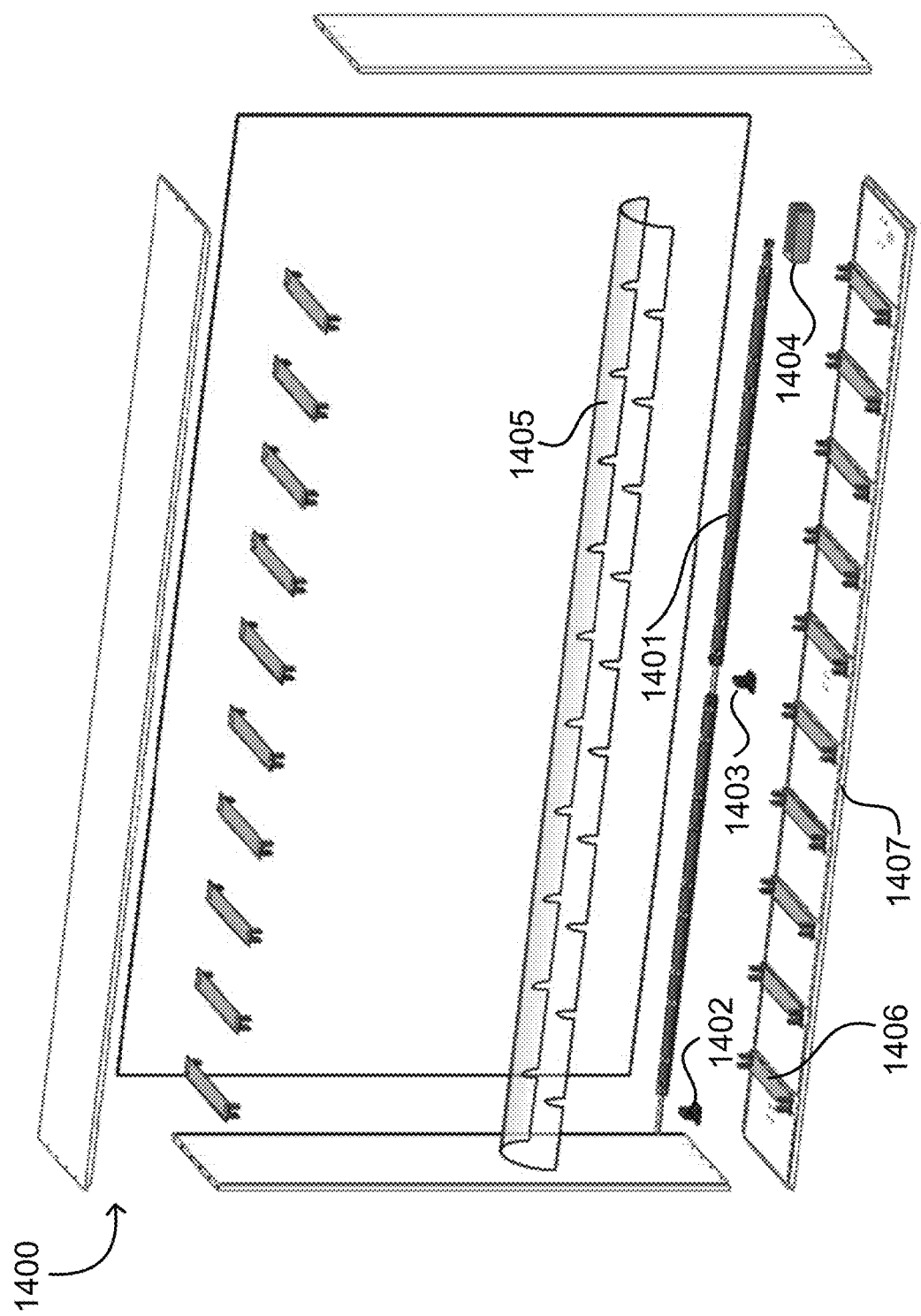
FIG. 14 is an exploded view showing the components of an enclosed panel containing a thermal cell array unit and various position control components according to an embodiment.

FIG. 14 is an exploded view of an enclosed panel 1400 containing various components of a position controller. Low friction mounting brackets 1402 and 1403 and end mounting bracket 1404 are attached to frame element 1407. Drive rod 1401 is attached to frame element 1407 by mounting brackets 1402 and 1403 and end mounting bracket 1404. Low friction wire guide elements 1406 are attached to frame element 1407. Low friction wire guide elements 1406 may be, for example, pulleys or other low friction elements. Drive wires (not shown) wind around drive rod 1401 as described with reference to FIG. 13, and loop through wire guide elements 1406. Protective dome 1405 surrounds drive rod 1401. The thermal cell array unit contained within the enclosed panel is not shown in FIG. 14.

Figure 15:
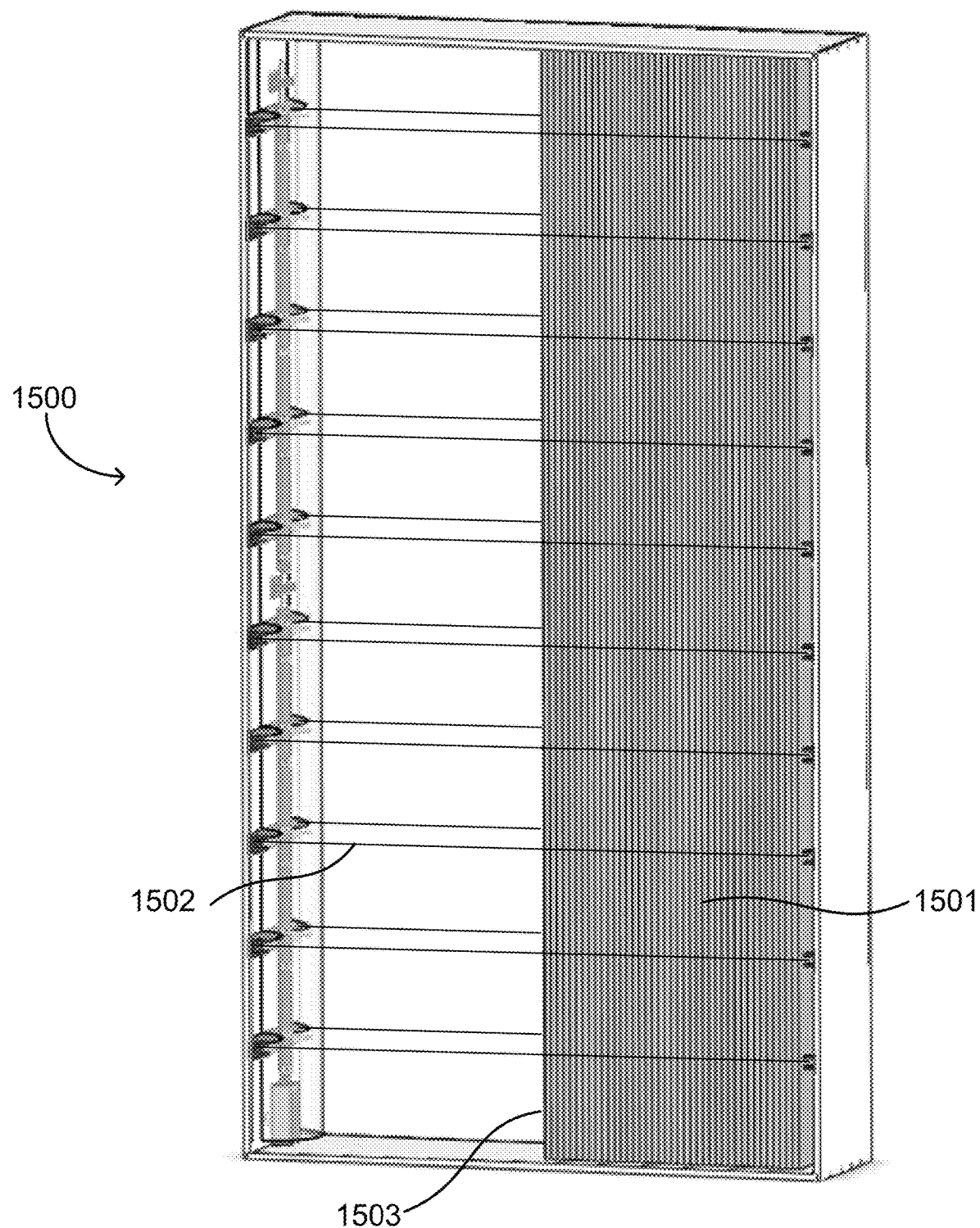
FIG. 15 is an isometric view of a thermal cell array unit supported by wires according to the embodiment shown in FIG. 14.

FIG. 15 shows a view of the fully assembled enclosed panel, according to FIG. 14. Thermal cell array unit 1501 is contained within enclosed panel 1500. Drive wires 1502 are attached to thermal cell array unit 1501 by connecting drive wires 1502 to surface sheet 1503. Surface sheet 1503 shown in FIG. 15 may also be referred to as front plate 1503. Thermal cell array unit is depicted in FIG. 15 in the partially expanded state. FIG. 15 depicts ten separate drive wires, spaced at approximately regular intervals. The number and relative position of the drive wires depicted in FIG. 15 is intended as an example only. The appropriate number and relative position of the drive wires may be different than as shown in FIG. 15, depending on a number of factors, including but not limited to: the size and shape of the enclosed panel, the orientation of the enclosed panel within a building structure, the intended purpose of the panel, and the desired operational characteristics of the panel.

Figure 16:
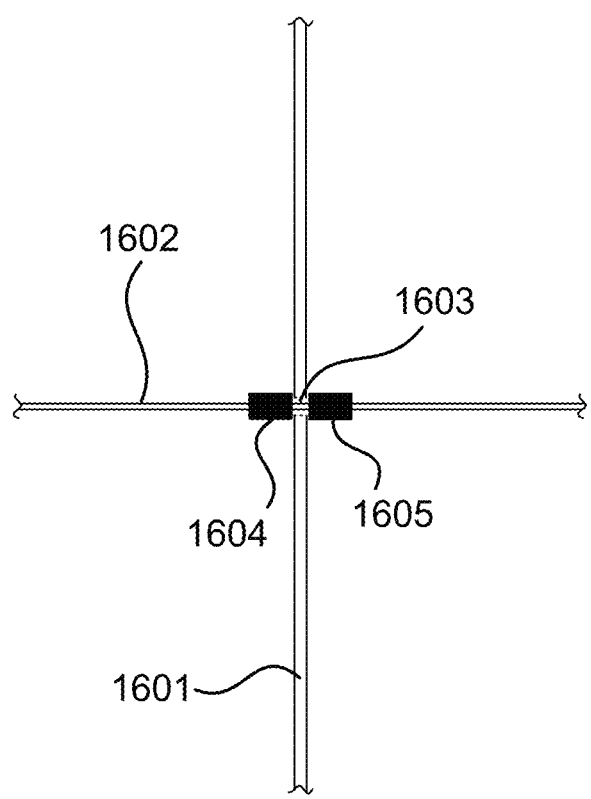
FIG. 16 depicts a method of attaching a thermal cell array unit surface sheet to a drive wire according to an embodiment.

FIG. 16 depicts a detailed view of one example of a method of attaching the thermal cell array unit front plate to a drive wire, so that the drive wire can vary the spatial location of the front plate and thereby cause the thermal cell array unit to which the front plate is connected to expand or compress as desired. In the example shown in FIG. 16, drive wire 1602 passes through hole 1603 in front plate 1601. Hole 1603 has a diameter slightly larger than drive wire 1602. Hole 1603 is spatially positioned near the edge of front plate 1601. Drive wire 1602 is secured in position within hole 1603 by mechanical positioning elements 1604 and 1605. Mechanical positioning elements may be a crimp, bead, cured adhesive droplet, or other means of mechanically locking drive wire 1602 in positon within hole 1603.

Figure 17A:
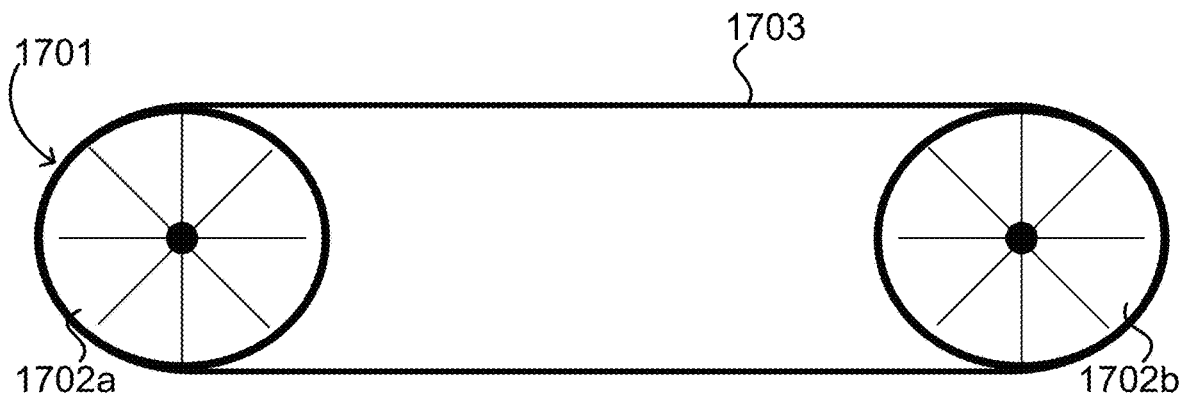
FIGS. 17A through 17D depict alternate methods for expanding and compressing a thermal cell array unit according to various embodiments.

A rotating drive rod as described above is one example of a mechanical method of expanding and compressing the thermal cell array unit. FIGS. 17A-17D depict components related to alternate mechanical methods for expanding and compressing a thermal cell array unit. FIG. 17A depicts a top-down view of pulley system 1701. Pulley system 1701 comprises a first pulley 1702a and a second pulley 1702b. First pulley 1702a and second pulley 1702b are co-planar. Drive wire 1703 forms a continuous loop, following a path defined by the position of pulleys 1702a and 1702b. A first pulley assembly as shown in FIG. 17A may be positioned above the thermal cell array unit (not shown) and a second pulley assembly as shown in FIG. 17A may be positioned below the thermal cell array unit (not shown). The top of the front plate (not shown) of the thermal cell array unit (not shown) may be connected at one location to drive wire 1703 for the pulley assembly positioned above the thermal cell array unit. The bottom of the front plate (not shown) of the thermal cell array unit (not shown) may be connected at another different location to drive wire 1703 for the pulley assembly positioned below the thermal cell array unit. A motor or other mechanical driving mechanism (not shown) connected to either of pulley 1702a or 1702b causes the front plate to move in a desired direction, thereby causing the thermal cell array unit to expand or compress.

Figure 17B:
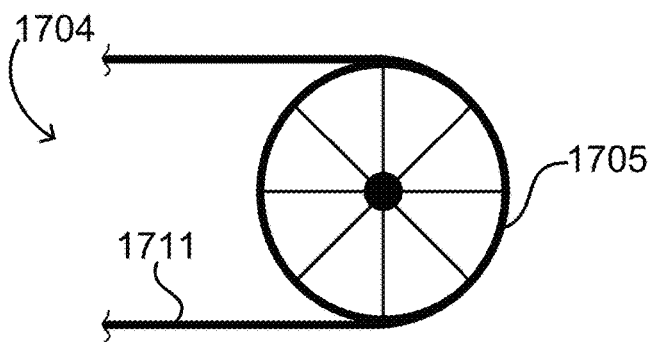

FIG. 17B depicts a top-down view of pulley system 1704. Pulley system 1704 comprises pulley 1705 and drive wire 1711. Drive wire 1711 forms a continuous loop, following a path defined by the position of pulley 1705 and an appropriate assembly of low-friction wire guides or pulleys (not shown). The front plate (not shown) of the thermal cell array unit (not shown) may be connected in one location to drive wire 1711. A motor or other mechanical driving mechanism (not shown) connected to pulley 1705 causes the front plate to move in a desired direction, thereby causing the thermal cell array unit to expand or compress.

Figures 17C, 17D:
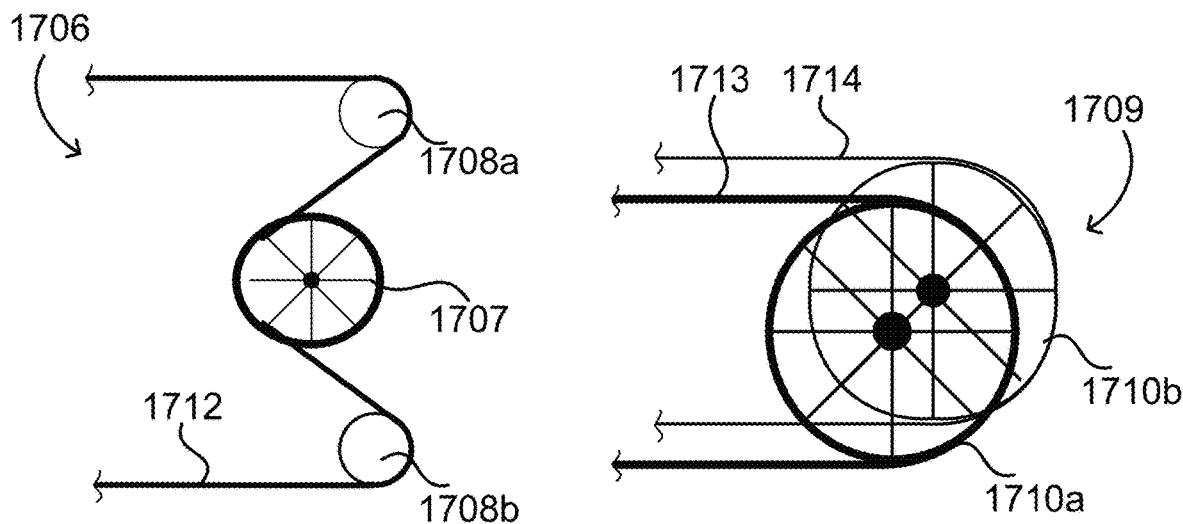

FIG. 17C depicts a top-down view of pulley system 1706. Pulley system 1706 comprises pulley 1707, low-friction wire guides 1708a and 1708b and drive wire 1712. Wire guides 1708a and 1708b may be stationary elements or may be rotating elements such as idler pulleys. Drive wire 1712 forms a continuous loop, following a path defined by the position of pulley 1707, wire guides 1708a and 1708b, and an appropriate assembly of low-friction wire guides or pulleys (not shown). The front plate (not shown) of the thermal cell array unit (not shown) may be connected in one location to drive wire 1712. A motor or other mechanical driving mechanism (not shown) connected to pulley 1707 causes the front plate to move in a desired direction, thereby causing the thermal cell array unit to expand or compress.

FIG. 17D depicts a top view of pulley system 1709. Pulley system 1709 comprises a first pulley 1710a, a second pulley 1710b, a first drive wire 1713 and a second drive wire 1714. Drive wire 1713 forms a continuous loop, following a path defined by the position of pulley 1710a and an appropriate assembly of low-friction wire guides or pulleys (not shown). Drive wire 1714 forms a continuous loop, following a path defined by the position of pulley 1710b and an appropriate assembly of low-friction wire guides or pulleys (not shown). The front plate (not shown) of the thermal cell array unit (not shown) may be connected in one location to drive wire 1713 and in another, different, location to drive wire 1714. A first assembly of pulley system 1709 may be positioned above the thermal cell array unit (not shown) and a second assembly of pulley system 1709 may be positioned below the thermal cell array unit. Using this approach, drive wires 1714 may be connected appropriately to all four corners of the thermal cell array unit front plate (not shown) to cause smoother or more controlled motion. A motor or other mechanical driving mechanism (not shown) connected to both of first pulley 1710a and second pulley 1710b causes the front plate to move in a desired direction, thereby causing the thermal cell array unit to expand or compress.

The appropriate method of causing the thermal cell array unit to expand and compress may be different than as described in the preceding examples, depending on a number of factors, including but not limited to: the size and shape of the enclosed panel, the orientation of the enclosed panel within a building structure, the intended purpose of the panel, and the desired operational characteristics of the panel.

In some applications, it may be preferred for the expansion and compression of the thermal cell array unit to occur with a smooth, predictable and repeatable motion. There are a number of methods by which the thermal cell array unit can be physically positioned and/or supported in order to result in the desired smooth, predictable and repeatable motion. While particular methods of physically positioning and/or supporting the thermal cell array unit have been described here, it is to be understood that other methods of physically positioning and/or supporting the thermal cell array unit are possible and are intended to be included herein.

In a first example, FIG. 15 depicts thermal cell array unit 1501 contained within enclosed panel 1500. Drive wires 1502 are attached to thermal cell array unit 1501 by connecting drive wires 1502 to front plate 1503. Drive wires 1502 may be installed with sufficient tension to adequately support thermal cell array unit 1501, thereby resulting in the desired smooth, predictable and repeatable motion. The tension of drive wires 1502 may be controlled by incorporation of an appropriate spring or other tension-controlling element.

Figure 18:
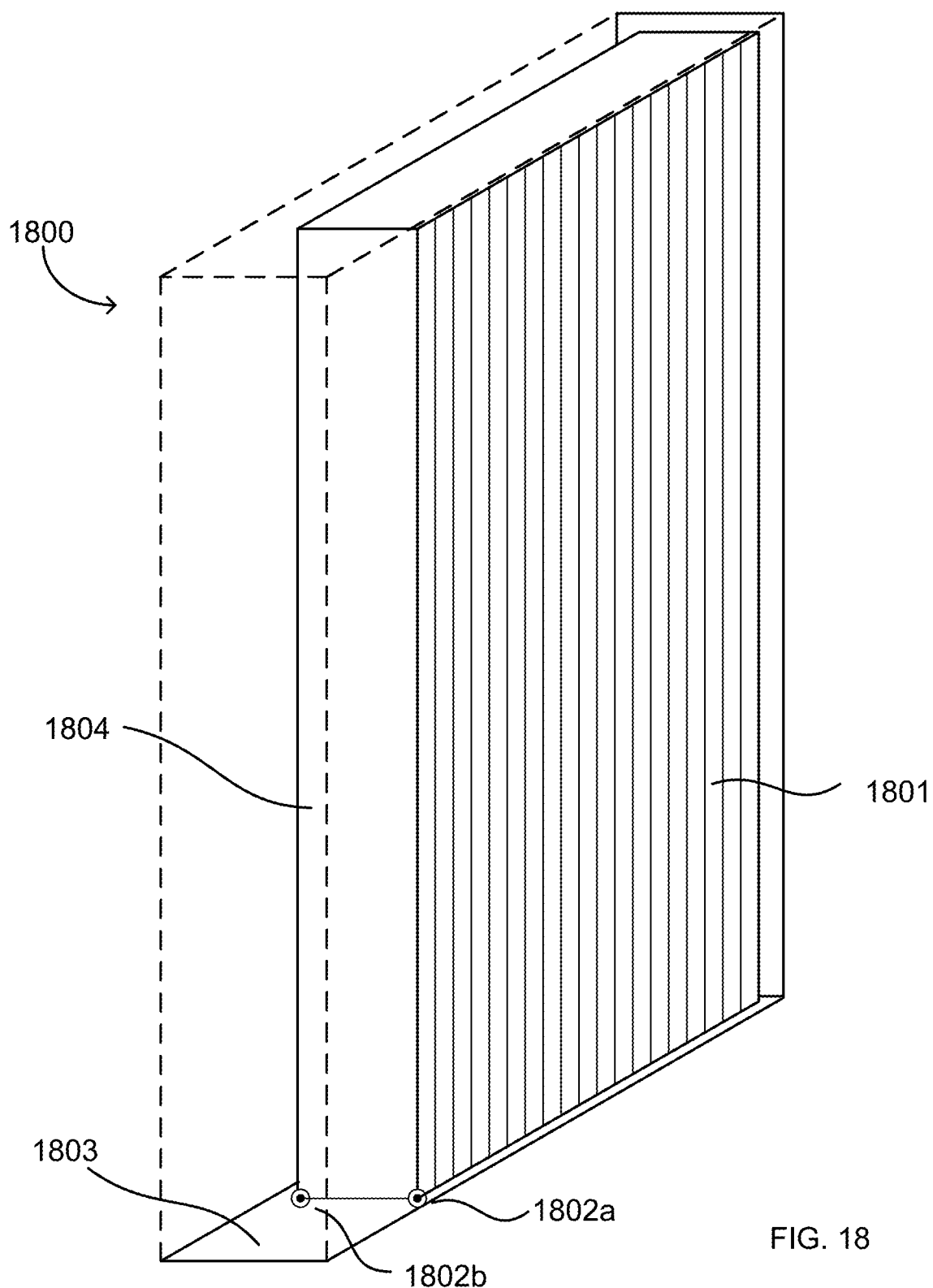
FIG. 18 depicts a method of supporting a thermal cell array unit using rollers according to an embodiment.

In another example, FIG. 18 depicts a method of supporting a thermal cell array unit using low-friction sliding or rolling elements 1802a and 1802b. In this example depicted in FIG. 18, thermal cell array unit 1801 is contained within enclosed panel 1800. Low-friction elements 1802a and 1802b are adhered or otherwise attached at or near the bottom of front plate 1804. Low friction elements 1802a and 1802b make physical contact with frame element 1803 and ensure that thermal cell array unit is appropriately positioned against or near frame element 1803 and further ensure smooth, predictable, and repeatable motion of thermal cell array unit 1801. Low friction elements 1802a and 1802b may be sliding or rolling elements.

Figure 19:
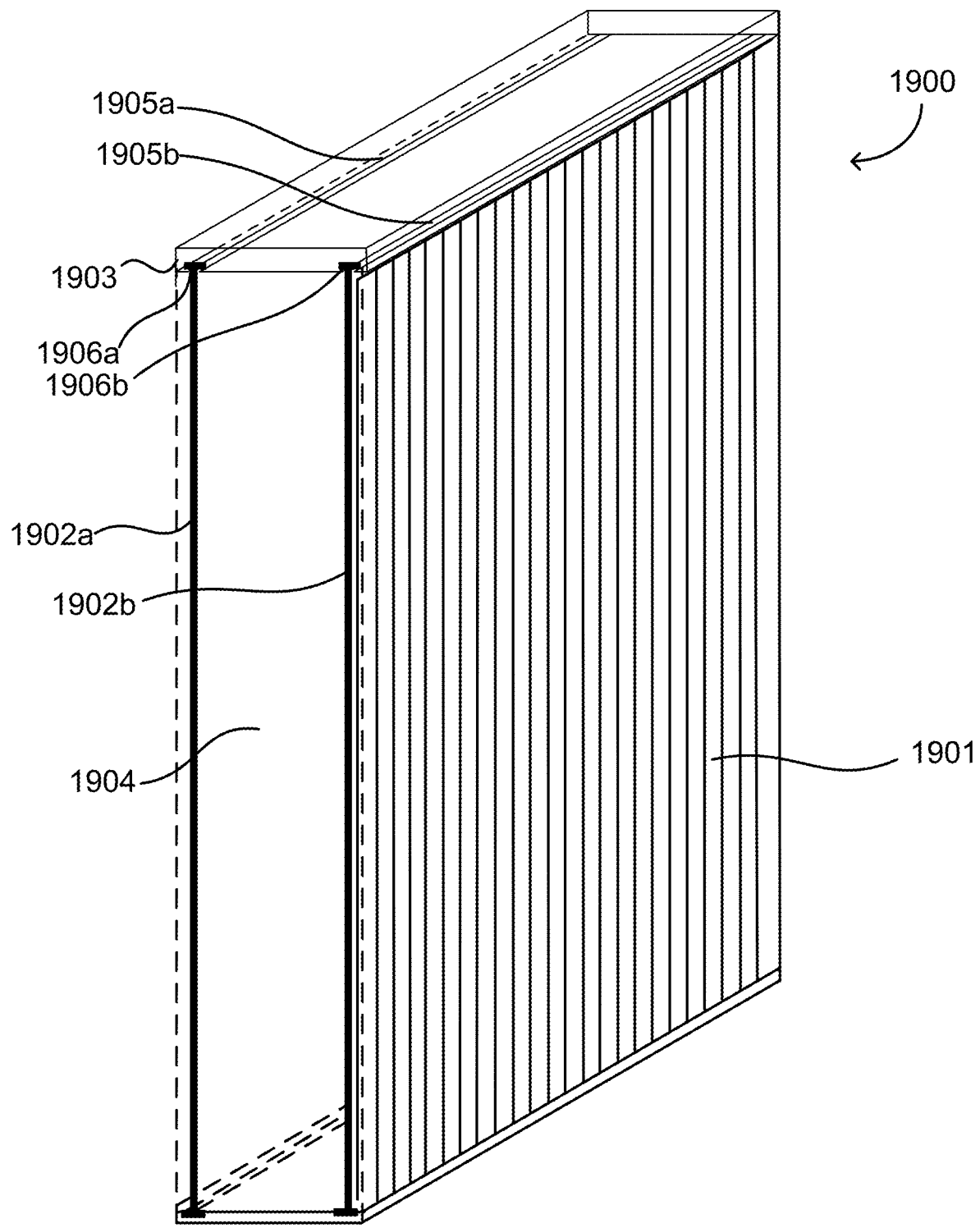
FIG. 19 depicts a method of supporting a thermal cell array unit using hanging supports according to an embodiment.

In another example, FIG. 19 depicts a method of supporting a thermal cell array unit using hanging supports. In this example depicted in FIG. 19, thermal cell array unit 1901 is contained within enclosed panel 1900. Hanging support elements 1902a and 1902b are adhered or otherwise attached at or near the top of front plate 1904. Frame element 1903 comprises linear grooves 1905a and 1905b. Hanging support elements 1902a and 1902b contain end features 1906a and 1906b, respectively. End features 1906a and 1906b slide, with low friction, within grooves 1905a and 1905b respectively. Low friction sliding of end features 1906a and 1906b within grooves 1905a and 1905b ensure that the thermal cell array unit is appropriately positioned against or near frame element 1903 and further ensure smooth, predictable and repeatable motion of thermal cell array unit 1901. Hanging support elements 1902a and 1902b guide the motion of thermal cell array unit 1901. Motion may be caused by one of the position control approaches described earlier, or other suitable position controller. The thermal cell array unit may have additional support elements (not shown) positioned at or near the bottom of front plate 1904.

Figure 20:
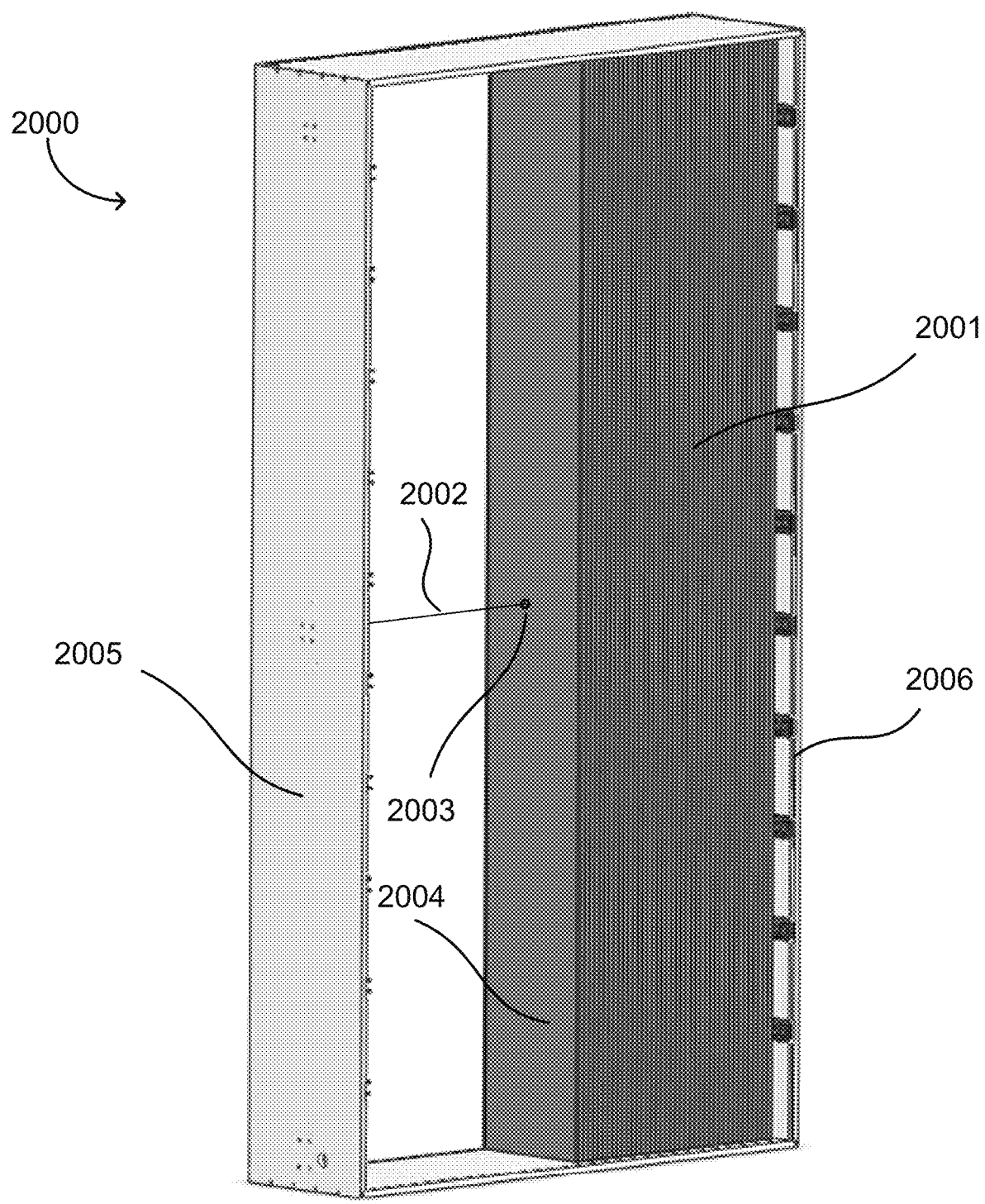
FIG. 20 depicts a method of supporting a thermal cell array unit using a centrally-located wire according to an embodiment.

In another example, FIG. 20 depicts a method of supporting a thermal cell array unit using a centrally-located wire. In this example depicted in FIG. 20, thermal cell array unit 2001 is contained within enclosed panel 2000. Support wire 2002 is suspended between frame elements 2005 and 2006. Support wire 2002 passes through hole 2003, where hole 2003 forms a passage for support wire 2002 through both front plate 2004 and thermal cell array unit 2001. Support wire 2002 is suspended between frame elements 2005 and 2006 with appropriate tension such that support wire 2002 adequately positions and supports thermal cell array unit 2001 and further ensures smooth, predictable, and repeatable motion of thermal cell array unit 2001.

Figures 21A, 21B, 21C:
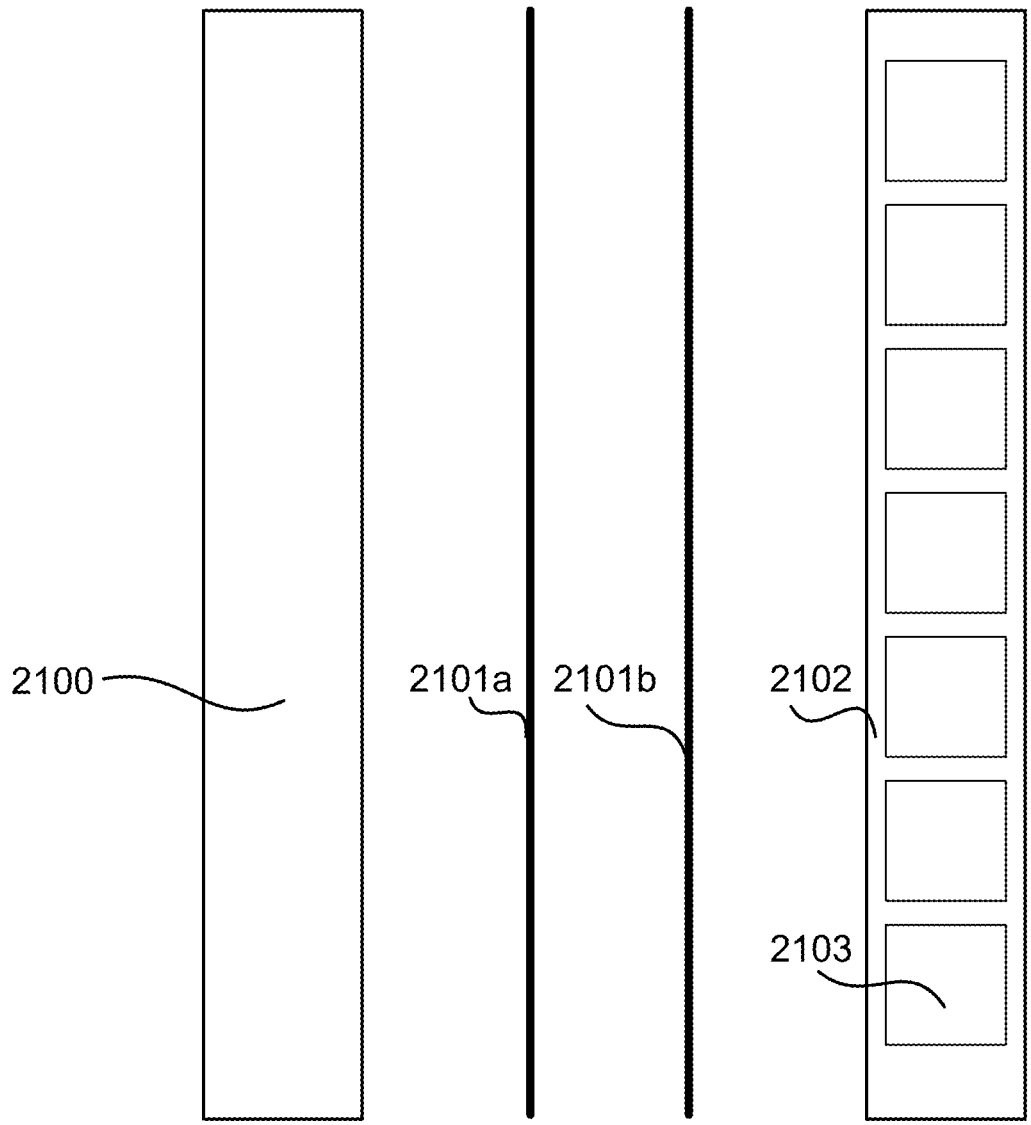
FIGS. 21A through 21C depict several front plate designs according to various embodiments.

In some applications, it may be preferred for the front plate attached to the thermal cell array to have a particular shape or configuration, depending on desired operational or orientational characteristics. FIGS. 21A-C depict several example front plate designs. FIG. 21A depicts a front elevation view of front plate 2100. Front plate 2100 is formed from a continuous, solid rectangular sheet material. The preferred thickness of front plate 2100 depends on the degree of flexibility, weight, and/or structural rigidity that is required for the particular application. FIG. 21B depicts a front elevation view of a front plate assembly consisting of two components. Front plate component 2101a attaches to one edge of the thermal cell array (not shown) and front plate component 2101b attaches to a second, opposite, parallel edge of the thermal cell array (not shown). Front plate components 2101a and 2101b are fabricated from rigid members or material. This embodiment may be preferred in situations where a high degree of flexibility or conformability of the thermal cell array unit front plate is required. FIG. 21C depicts a front elevation view of front plate 2102. Front plate 2102 is formed from a rectangular sheet material. Front plate 2102 contains cut-out regions 2103. Cut-out regions 2103 may be formed by removing material from a previously continuous, solid sheet as depicted in FIG. 21A. The preferred thickness of front plate 2102 and the preferred size, number, and spatial location of cut-out regions 2103 depend on the degree of flexibility, weight, and/or structural rigidity that is required for the particular application. While particular examples of front plate designs have been described here, it is to be understood that other front plate designs are possible and are intended to be included herein.

Alternatively, rather than utilizing a mechanical position controller to transition the array unit between the compressed and expanded states, an electrostatic position controller may be utilized. Example electrostatic position controller 2210 are described with reference to FIGS. 22 through 24.

FIGS. 22A and 22B show a cross-sectional view of a portion of a thermal cell array unit, such as the thermal cell array unit 100 described above, that incorporates an electrostatic position controller 2210. The portion shown in FIGS. 22A and 22B includes a cross-section of one longitudinally extending cavity 2200. The cavity 2200 is formed by two adjacent layers of thin, flexible film 2201 and 2203 that are bonded in selected regions 2205a and 2205b, similar to the films 120a, 120b that are bonded in bonding region 130 as described above. The cavity 2200 is shown in the expanded state in FIG. 22A and in the compressed state in FIG. 22B.

Films 2201 and 2203 may have a thickness of less than 40 microns and desirably the thickness may be less than 10 microns. The films 2201 and 2203 may be layers of thin, flexible film material formed from, for example, polyester film, Mylar, or any highly electrically insulative film. Films 2201 and 2203 are coated on one side by a thin electrode coating 2202 and 2204. Thin electrode coating 2202 and 2204 may be made of a metal or other low emissivity and electrically conductive material, such as, for example, aluminum. The thermal emissivity of the material desirably is less than 0.2 and more desirably is less than 0.05. Thin electrode coatings 2202 and 2204 are separated by at least one of low electrical conductivity films 2201 and 2203 such that the coatings do not contact each other when the cavity 2200 is in the compressed state, as shown in FIG. 22A. In the example shown in FIG. 22A, electrode coating 2202 is coated on the inner (right-most) surface of film 2201 and electrode coating 2204 is coated in the outer (again, right-most) surface of film 2203.

FIG. 22B shows the cavity 2200 in a compressed state. In the compressed state, the cavity 2200 is compressed along an axis perpendicular to the longitudinal axis of the bonding regions 2205a and 2205b (which is the horizontal direction in the view shown in FIGS. 22A and 22B) by applying an electrical potential difference between thin electrode coatings 2202 and 2204 to generate an attractive electrical force between the films 2201 and 2203. The magnitude of the applied electrical potential difference depends on a number of factors, including the thickness of films 2201 and 2203, and the conductivity of thin electrode coating 2202 and 2204. The magnitude of the applied voltage may be, for example, 1000 V, and possibly as high as 3000 V. While the voltage level is high, there is negligible current flow through the electrostatic system because the coatings 2202 and 2204 are separated by at least one of the layers 2201 and 2203. As well, the electrical components required to provide this voltage level with negligible current flow are inexpensive and readily available. The voltage may be applied by, connecting a respective electrode 2212a, 2212b to each of the coatings 2202 and 2204 at, for example, an edge of each of the layers 2201 and 2203. If films 2201 and 2203 are too thick, they will be too rigid to form the compressed state shown in FIG. 22B with the electrostatic pressure that can be achieved by application of a practical magnitude of voltage.

As well, if film 2201 is too thick, the separation distance between electrically conductive coatings 2202 and 2204 will be too great. If films 2201 and 2003 are too thin, they will not be sufficiently mechanically robust for long-term device performance. The desired performance can be achieved with a range of thicknesses of films 2201 and 2203, with the preferred thickness being approximately 10 microns.

The electrostatic position control or actuation system shown in FIGS. 22A and 22B is effective because, while material comprising films 2201 and 2203 is a good electrical insulator, the air within the cavity 2200 that separating films 2201 and 2203 is not a good electrical insulator. Typically, an air gap between two electrodes can withstand an electric field of approximately 106 V/m. Fields larger than this will result in electric breakdown across the air gap. In contrast, a typical good electrical insulator suitable for providing films 2201 and 2203 can withstand an electric field of at least 107 V/m. The electrostatic pressure associated with the electric field (i.e. the force per unit area) varies with the square of the magnitude of the electric field, and so this means that the maximum force per unit area of attraction associated with an air gap is 100 times weaker than the maximum force for an insulator.

The electrostatic position control or actuation system described above takes advantage of the so-called Paschen effect, whereby the breakdown of the electric field of air in gaps that have a thickness comparable to the mean free path of an ion in the air is up to ten times higher. In other words, a very thin air gap (for example, less than 0.5 microns thick) can withstand an electric field of 107 V/m. Referring to the example shown in FIGS. 22A and 22B, when an electrical potential is applied between electrode coatings 2202 and 2204, the electric field is highest within the narrow gap regions labeled as 2206 and 2207 where the films are close to the point of contact. In these very narrow regions 2206 and 2207, the conditions for the Paschen effect are met, and the force per unit area of attraction is very high. The films are attracted into contact in this region, and the narrow area of high field propagates along the film. In the example shown in FIG. 22A, the points of contact of films 2201 and 2203 move vertically from each point 2206 and 2207 towards the middle of the cavity 2200, as the device transitions from the expanded state shown in FIG. 22A to the compressed state shown in FIG. 22B.

Removing the electrical potential difference previously applied between thin electrode coatings 2202 and 2204 restores the expanded state. There are a number of mechanisms by which the expanded state shown in FIG. 22A is restored. For example, the expanded state may be restored by applying air or gas pressure to the previously compressed element, thereby inflating the element. The expanded state may be restored by forming the films 2201 and 2202 from a material having an inherent spring-like nature. This inherent spring-like nature may be created by exposing films 2201 and 2202 to heat treatment or chemical treatment in order to deform films 2201 and 2202 into the desired expanded shape depicted in FIG. 22A. The expanded state may further be restored by using an additional spring-like element, as will be described in reference to FIGS. 23A and 23B.

Figure 23B:
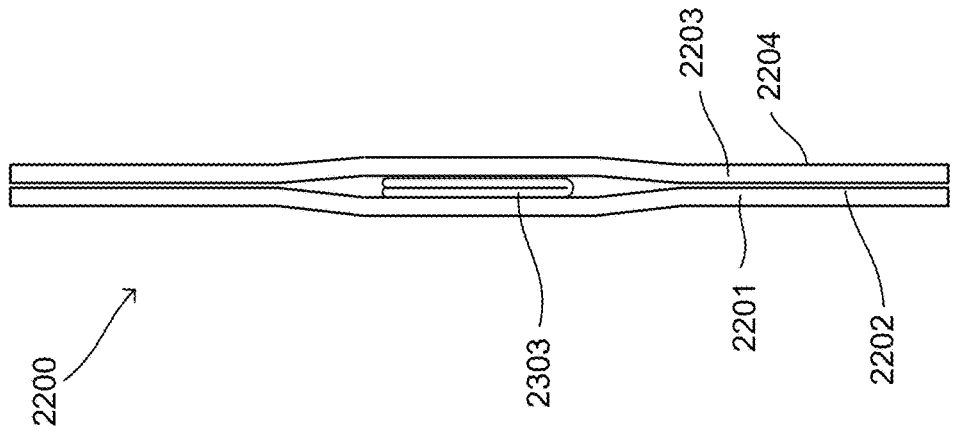
FIGS. 23A and 23B are top cross-sectional views of one cavity of a thermal cell array unit according to the embodiment shown in FIGS. 22A and 22B incorporating a separate spring-like element according to an embodiment.
Figure 23A:
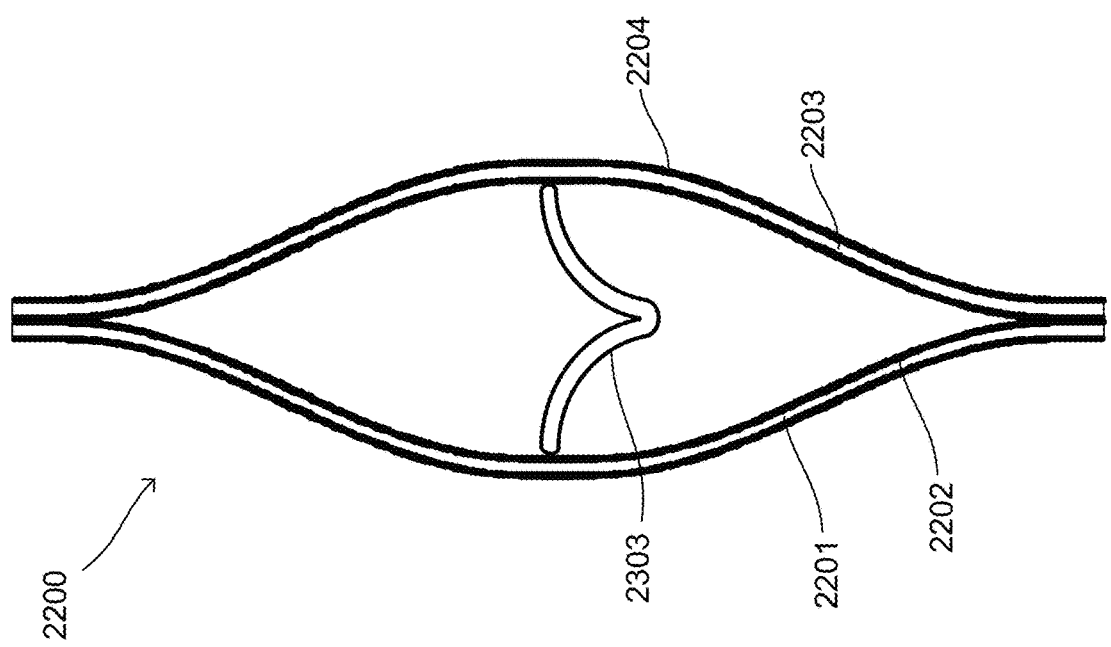

FIGS. 23A and 23B show the cavity 2200 of FIGS. 22A and 22B that includes a biasing element 2303. In the expanded state shown in FIG. 23A, the biasing element 2303 applies a force to the films 2201 and 2203 such that the expanded state is achieved. The biasing element 2303 could be, for example, a thin spring steel or other thin shim stock that exhibits a spring-like mechanical characteristic when moderately deformed. The electrostatic force caused by the coatings 2202 and 2204 when in transition from the expanded to the compressed states is less than the force that would permanently deform the biasing element 2303.

FIG. 23B shows the cavity 2200 in the compressed state, which is achieved by applying an electrical potential difference between thin electrode coatings on films 2201 and 2203. The electrostatic force is sufficient to temporarily deform biasing element 2303. The magnitude of the applied electrical potential difference depends on a number of factors, including the thickness of films 2201 and 2203, the conductivity of the thin electrode coatings 2202 and 2204, and the force required to compress the biasing element 2303. Removing the electrical potential difference previously applied between thin electrode coatings 2202 and 2204 removes the deformative compressive force on biasing element 2303. The biasing element 2303 expands to its undeformed state, thereby separating films 2201 and 2203 and restoring the expanded state, shown as in FIG. 23A.

FIGS. 24A and 24B depicts a top cross-sectional view of full thermal cell array unit 2400 that incorporates the electrostatic position control or actuation system described above. Similar to the array unit 100 described above, the array unit 2400 is formed by multiple adjacent layers of thin, flexible film 2401*a-k* that are bonded in selected regions 2430 such that when the array unit is expanded it forms a plurality of air-enclosing pockets 2410, which are substantially similar to cavity 2200. Each of films 2401*a-k* are coated on one side by a thin electrode coating as described above such that, for each adjacent pair of films, such as films 2401*a* and 2401*b*, the thin electrode coatings are separated by at least one of low electrical conductivity films 2401*a* and 2401*b*. Surface sheets 2440 and 2450 are bonded to the thermal cell array unit formed by the assembly of films 2401*a-k*.

FIG. 24B depicts a top cross-sectional view of the array unit 2400 in the compressed state. Array unit 2400 is compressed along an axis perpendicular to the longitudinal axis of the bonding regions 2430 by applying an appropriate electrical potential difference between adjacent thin electrode coatings as described above. Removing the electrical potential difference previously applied between the thin electrode coatings restores the expanded state.

The fully compressed state shown in FIG. 24B is facilitated by applying an appropriate electrical potential difference between adjacent pairs of thin electrode coatings, where an appropriate electrical potential difference is sufficient to compress the structure to the desired compression state. The magnitude of the applied electrical potential difference depends on a number of factors including, for example, the thickness of films 2401*a-k* and the conductivity of thin electrode coating. The thin electrode coatings on films 2401*a-k* may be maintained at different electrical potentials, such that individual cavities 2410 within array unit 2400 may be maintained in an expanded state while other cavities 2410 are maintained in a compressed state, as desired.

In some embodiments, the adjacent thin, flexible films forming thermal cell array unit may exhibit a high sticking force in the compressed states shown in FIGS. 22A, 23A, and 24A. This high sticking force may make it more difficult for the expanded state to be restored when the applied electrical potential difference is removed. In these cases, it may be desirable to reduce the overall area of surface contact between adjacent films. This reduction of overall area of surface contact may be achieved by a number of approaches. One such approach involves texturing the surface of one or both adjacent films such that the surface retains small features, typically in the size range of 1-100 nanometers. Examples of surface texturing approaches include: applying a coating of very small beads or other particulates, embossing very small surface features, or scratching or abrading the surface.

The appropriate method of causing the thermal cell array unit to expand and compress with a smooth, predictable, and repeatable motion may be different than as described in the preceding examples, depending on a number of factors, including but not limited to: the size and shape of the enclosed panel, the orientation of the enclosed panel within a building structure, the intended purpose of the panel, and the desired operational characteristics of the panel.

While the embodiments described above illustrate the thermal cell array units or assemblies and enclosed panels having particular shapes or operational or structural features, the skilled person will understand that the thermal cell array units or assemblies may have any number of suitable shapes or operational or structural features sufficient to perform the operations described above.

In addition, while not shown in the figures, it is to be understood that the transition of the foregoing thermal cell array units between compressed and expanded states can be achieved by any suitable mechanical, electro-mechanical, or other position transitioning device. For example, the thermal cell array units may be coupled to each other and actuated by a control rod to transition the thermal cell array units between compressed and expanded states. In another example, an electro-mechanical actuator could be employed to automate the transitioning of the thermal cell array unit between compressed and expanded states. In another example, the thermal cell array units could be positioned by means of a manual or physical control element.

It is noted that the various embodiments of the thermal cell array unit or system, as described above, and their combinations, can be used in a greenhouse, glasshouse, or other building structure. Further, the thermal cell array unit may also be expanded or compressed either by manual operation or by automatic control in response to the output of a sensor detecting a selected parameter, such as a sunlight or temperature measurement sensor.

The thermal cell array units and assemblies described above can be used in a greenhouse, glasshouse, solarium, or other building structure, to increase the thermal insulation to reduce heat loss from the building. The thermal cell array units and assemblies described above can further be used in walls and doors of refrigeration units or other cold-storage appliances where it is desirable to have a high degree of visual transparency in some instances and a high degree of thermal insulation in other instances. The thermal cell array units and assemblies can further be used in walls or roofs of building structures where variable thermal insulation may be desired or required. The thermal cell array units and assemblies described above can further be used in conjunction with thermal storage units, assemblies, or assemblies. Thermal cell array units and assemblies described above can further be used in solar heat capture structures.

Figure 25A:
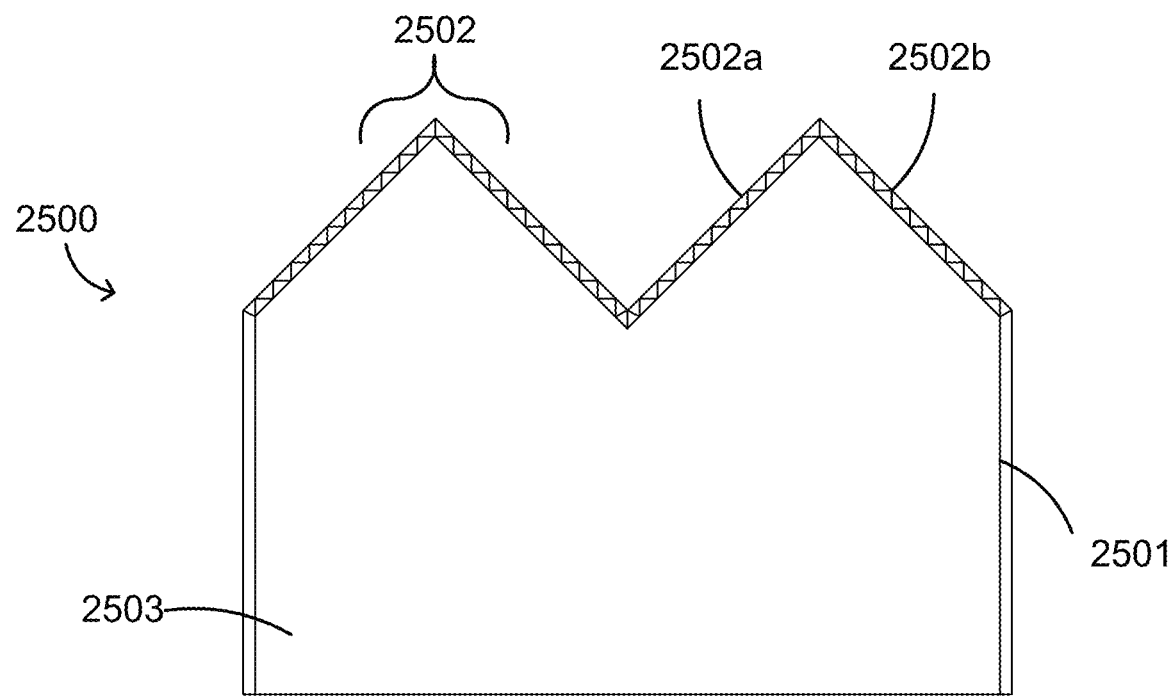
FIGS. 25A through 25C depict a building structure with an isosceles peaked roof according that incorporates a thermal cell array unit.
Figure 25B:
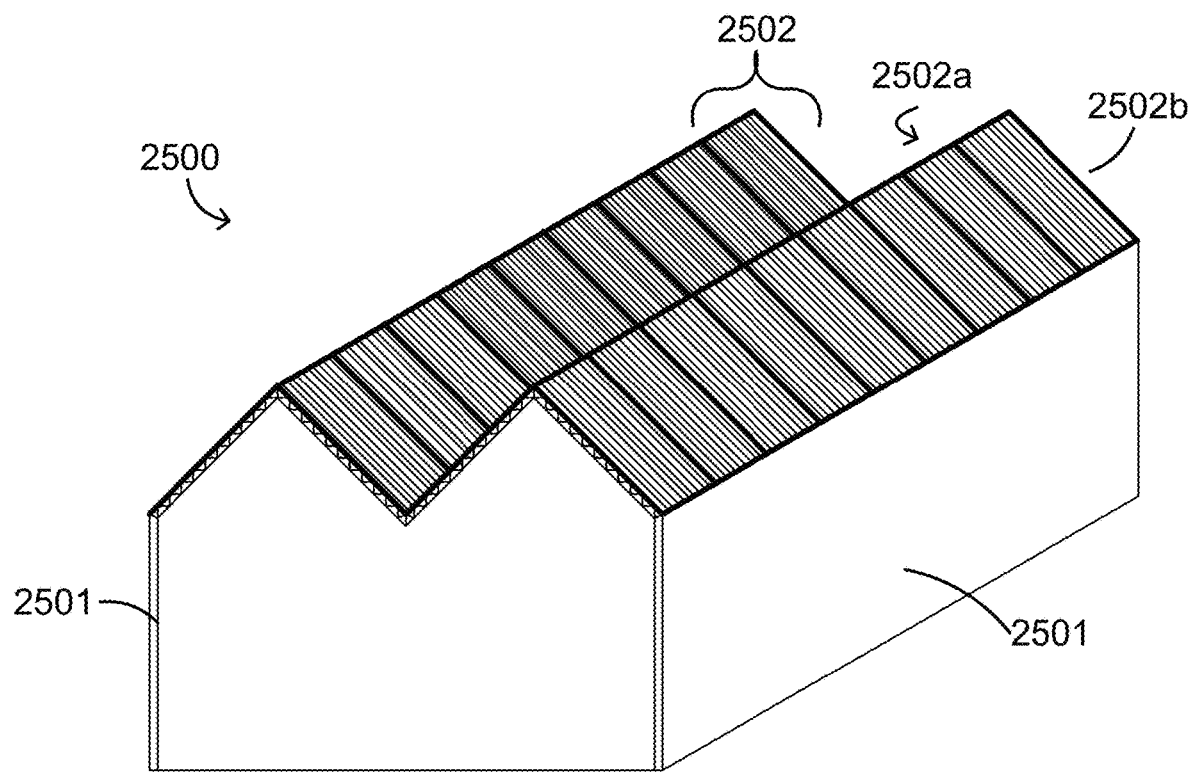
Figure 25C:
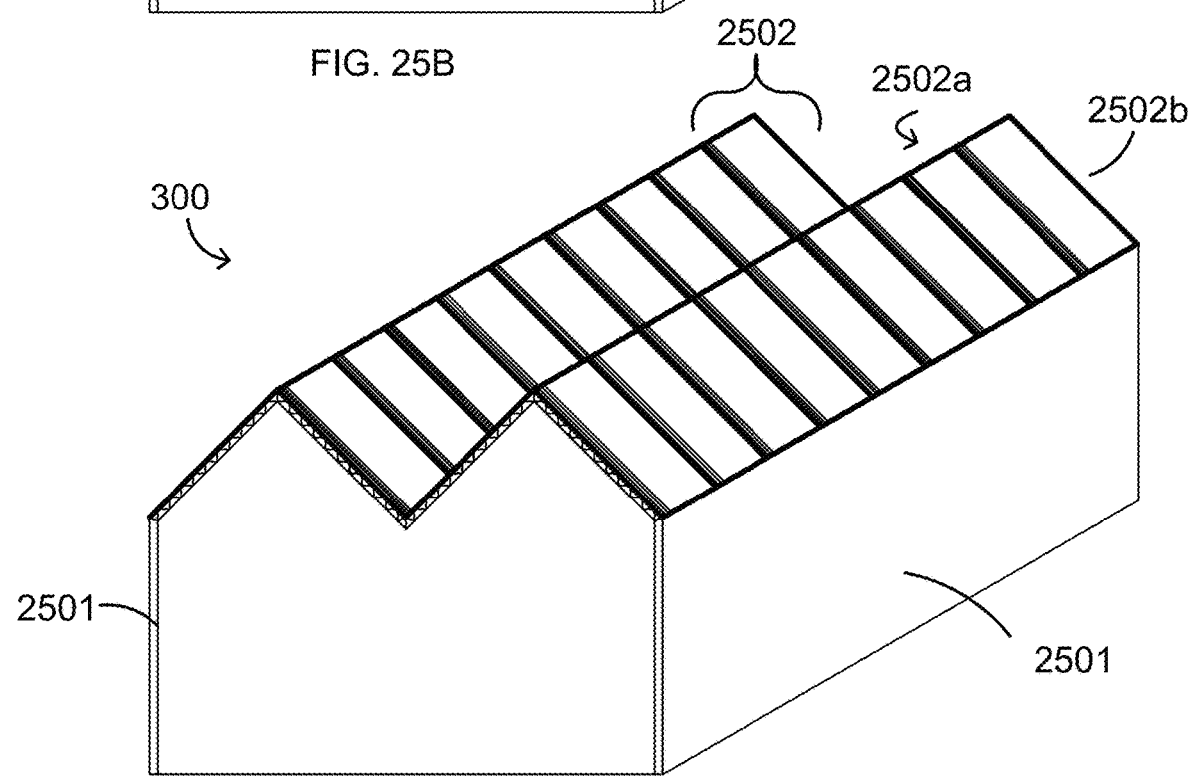

FIGS. 25A, 25B, and 25C illustrate a building structure, greenhouse 2500, according to an embodiment. As shown in the figures, the greenhouse 2500 is a structural building having upstanding walls 2501 and an isosceles peaked roof 2502, which enclose an inside greenhouse space 2503 therein. The walls 2501 may be transparent or opaque, and a door (not shown) can be provided on one of the walls 2501 for access to the inside space. The roof 2502 and walls 2501 can be made of different types of materials, such as glass or plastic, including but not limited to polyethylene film, multiwall sheets of polycarbonate material, ethylene tetrafluoroethylene sheet, or PMMA acrylic glass. The roof 2502 and walls 2501 can be self-supported or installed onto a supportive frame. The greenhouse 2500 heats up because incoming visible solar radiation (for which the glass or plastic is transparent) from the sun is absorbed by plants, soil, and other things inside the building. Air warmed by the heat from hot interior surfaces is retained in the building by the roof and walls. In this embodiment, the roof 2502 comprises two sections 2502a and 2502b which form an isosceles triangle shape in cross-section as shown in FIG. 25A. Sections 2502a and 2502b of the roof 2502 comprise a thermal cell array unit. Specifically, the size and dimensions of the above-described thermal cell array unit are tailored to fit into the building structure, such that the thermal cell array unit forms and functions as section 2502a and 2502b of the roof 2502.

While in this embodiment, only sections 2502a and 2502b of the roof 2502 is integrated with the thermal cell array unit, one or more thermal cell array units/assemblies can be formed as part of the walls 2501.

Figure 26:
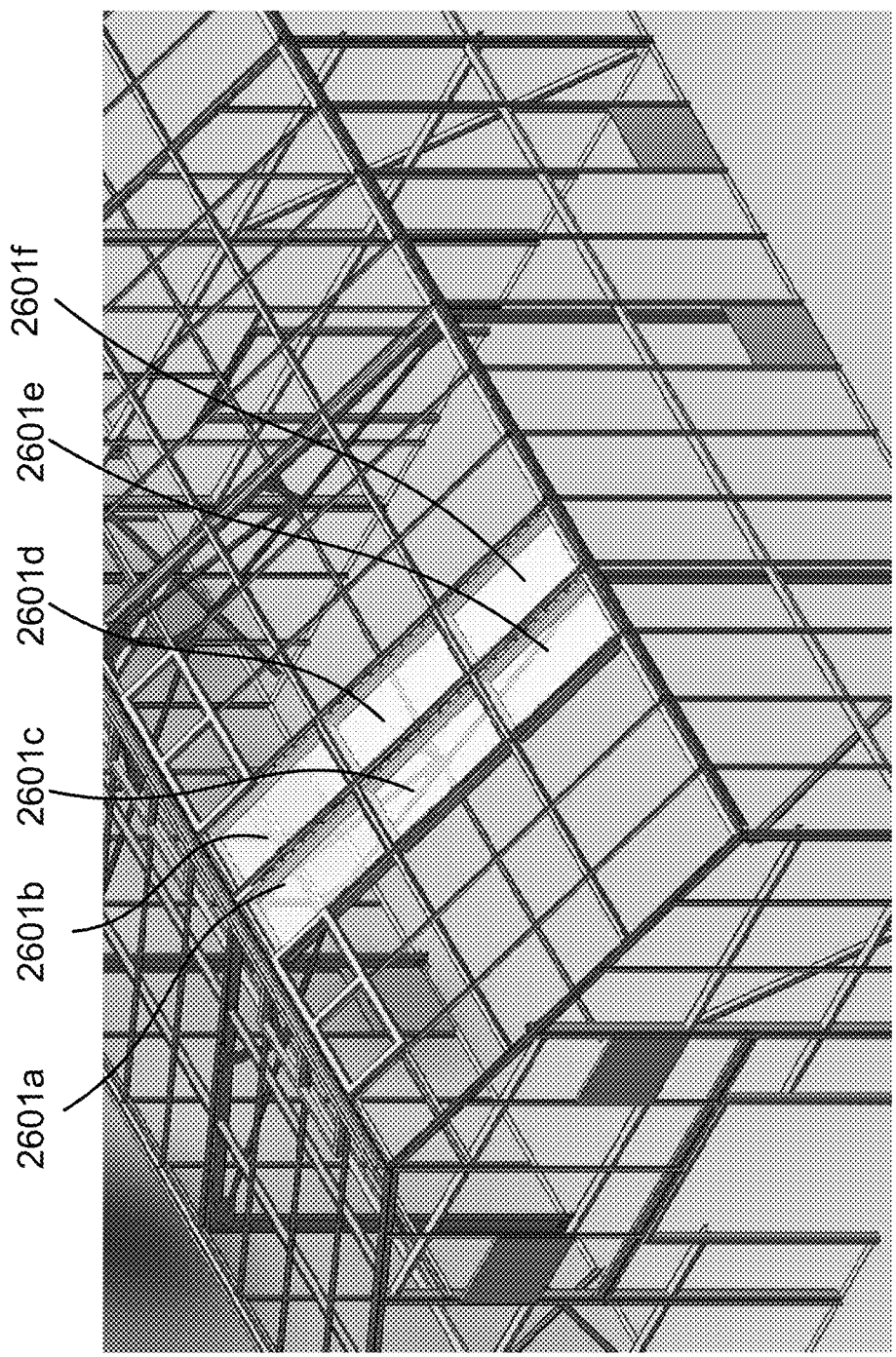
FIG. 26 depicts a building structure with an isosceles peaked roof according to the embodiment shown in FIGS. 25A through 25C.

FIG. 26 depicts a greenhouse structure such as the one described with reference to FIGS. 25A, 25B, and 25C. Enclosed panels 2601a, 2601b, 2601c, 2601d, 2601e, and 2601f are supported by structural roof elements (not shown). Enclosed panels 2601a, 2601b, 2601c, 2601d, 2601e, and 2601f are positioned inside the greenhouse, adjacent the interior surfaces of the transparent window elements (not shown) that form the planar surface of the greenhouse roof. In the embodiment depicted in FIG. 26, enclosed panels 2601a, 2601b, 2601c, 2601d, 2601e, and 2601f are protected by the adjacent transparent window elements that form the surface of the greenhouse roof and therefore are protected from wind, rain, and dirt. In some embodiments, it may be preferable for enclosed panels 2601a, 2601b, 2601c, 2601d, 2601e, and 2601f to form the exterior structure of the greenhouse, rather than being supported by the exterior structure of the greenhouse. In these embodiments where enclosed panels form the exterior structure of the greenhouse, the enclosed panels would not be protected from the elements by an exterior transparent window within the greenhouse structure. Rather, the exterior-facing transparent face of the enclosed planes would form the exterior transparent window of the greenhouse structure. Accordingly, the enclosed panels must have sufficient structural rigidity as would be expected for a greenhouse structure.

Figure 27A:
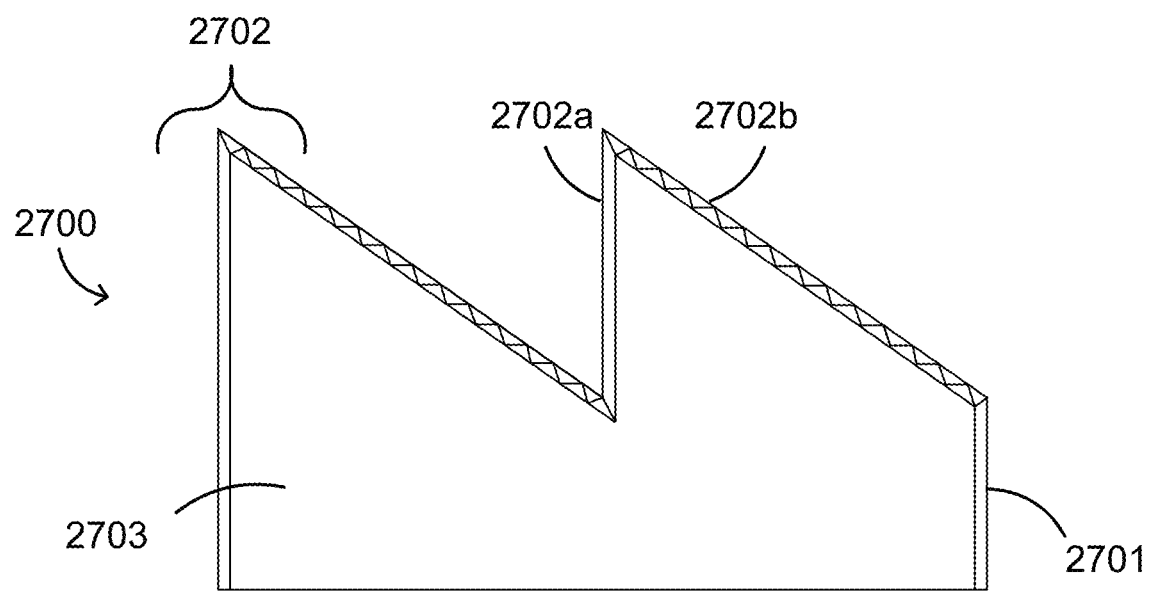
FIGS. 27A through 27C depict a building structure with a sawtooth peaked roof that incorporates a thermal cell array unit.
Figure 27B:
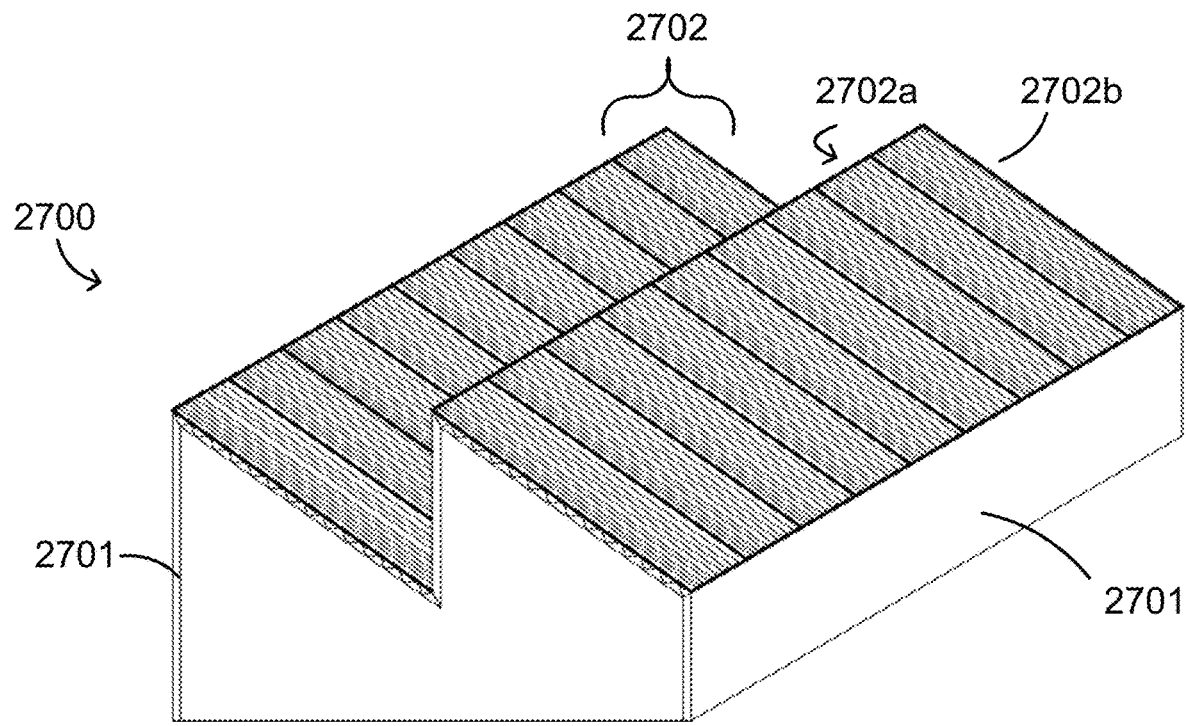
Figure 27C:
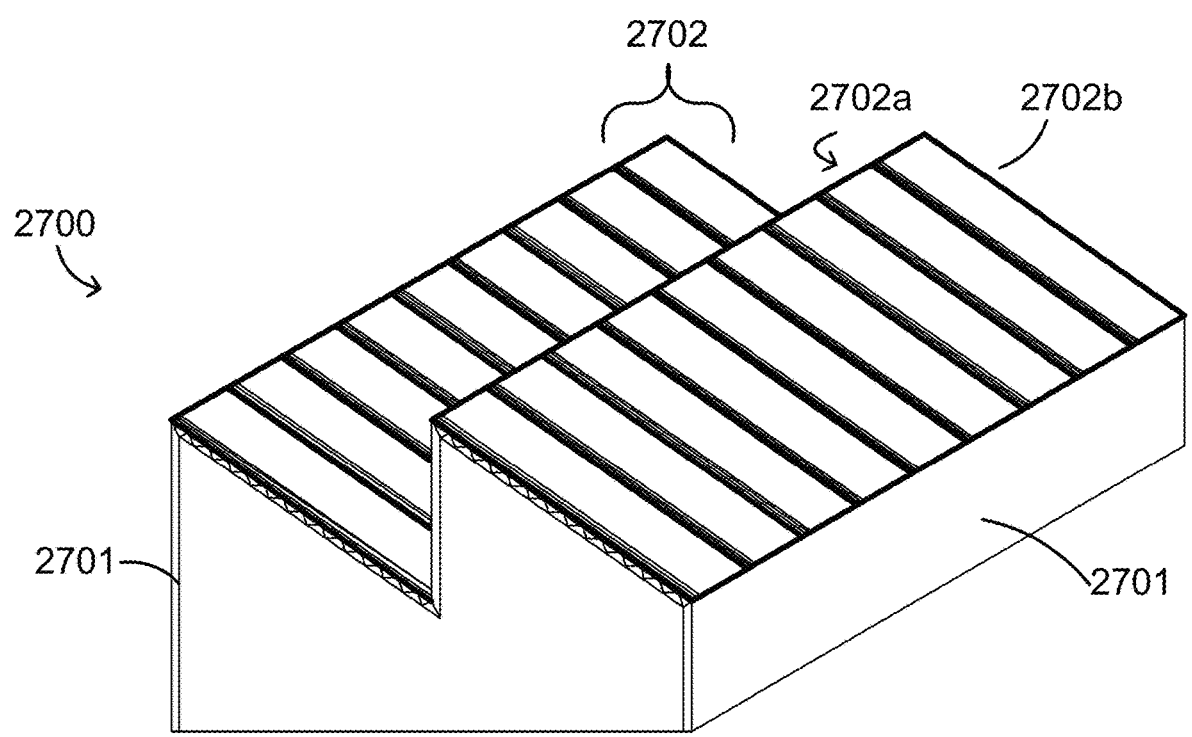

FIGS. 27A, 27B, and 27C illustrate a building structure, greenhouse 2700, according to an embodiment. As shown in the figures, the greenhouse 2700 is a structural building having upstanding walls 2701 and a sawtooth peaked roof 2702, which enclose an inside greenhouse space 2703 therein. The walls 2701 may be transparent or opaque, and a door (not shown) can be provided on one of the walls 2701 for access to the inside space. The roof 2702 and walls 2701 can be made of different types of materials, such as glass or plastic, including but not limited to polyethylene film, multiwall sheets of polycarbonate material, ethylene tetrafluoroethylene sheet, or PMMA acrylic glass. The roof 2702 and walls 2701 can be self-supported or installed onto a supportive frame. The greenhouse 2700 heats up because incoming visible solar radiation (for which the glass or plastic is transparent) from the sun is absorbed by plants, soil, and other things inside the building. Air warmed by the heat from hot interior surfaces is retained in the building by the roof and walls. In this embodiment, the roof 2702 comprises two sections 2702a and 2702b which form a sawtooth shape in cross-section as shown in FIG. 27A. The section 2702b of the roof 2702 comprises a thermal cell array unit. Specifically, the size and dimensions of the above-described thermal cell array unit are tailored to fit into the building structure, such that the thermal cell array unit forms and functions as section 2702b of the roof 2702.

While in this embodiment, only section 2702b of the roof 2702 is integrated with the thermal cell array unit, one or more thermal cell array units/assemblies can be formed as the entire roof 2702. Further, one or more thermal cell array units/assemblies may also be formed as part of the walls 2701.

Figure 28A:
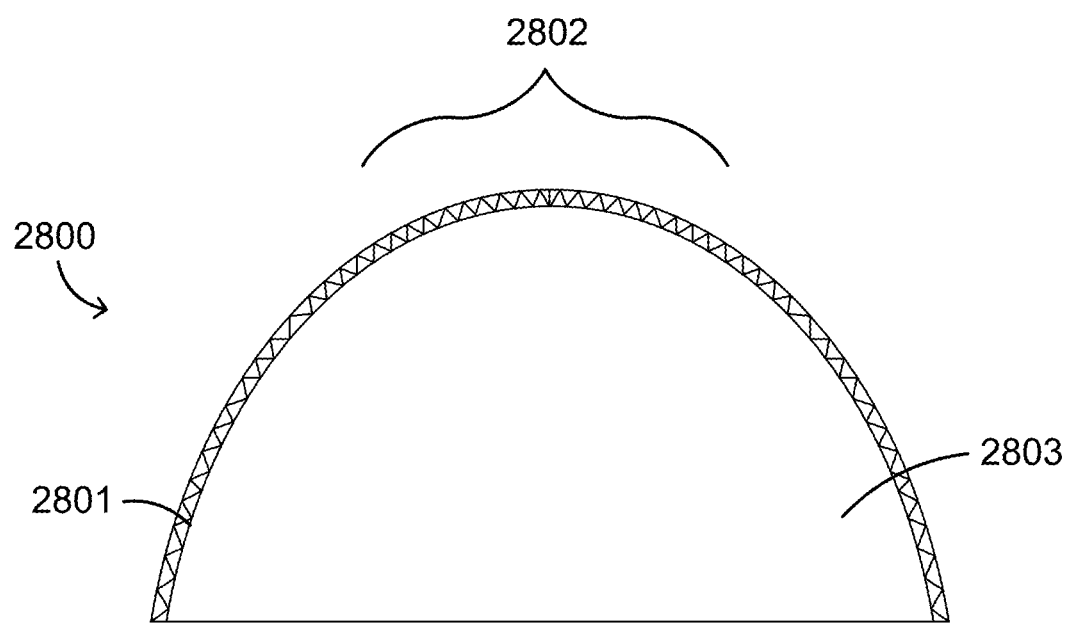
FIGS. 28A through 28C depict a building structure with a curved roof that incorporates a thermal cell array unit.
Figure 28B:
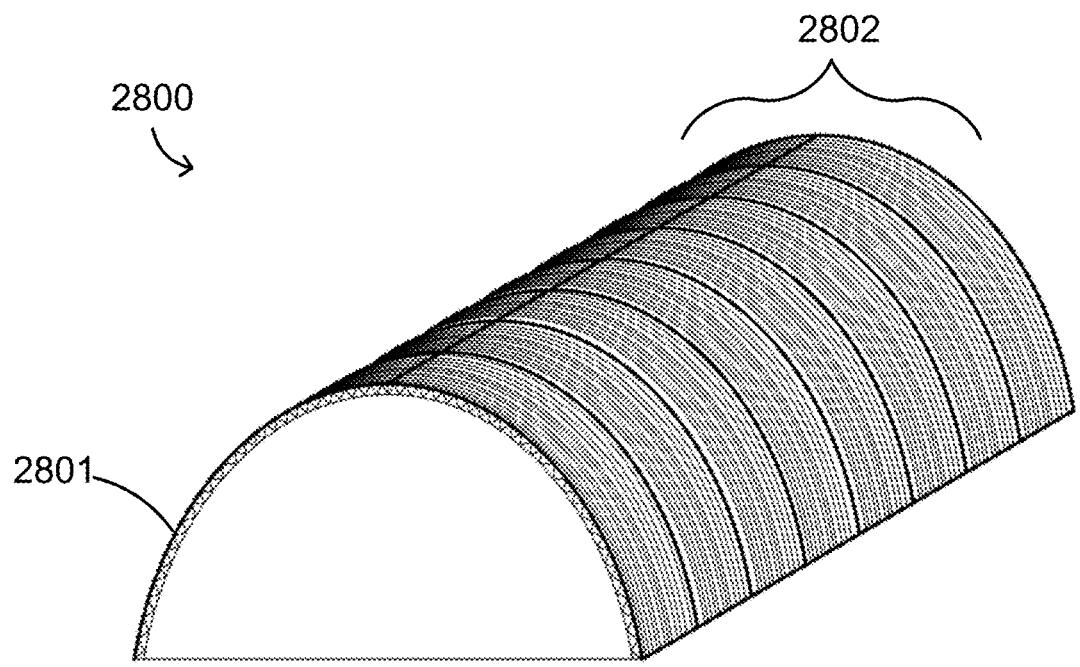
Figure 28C:
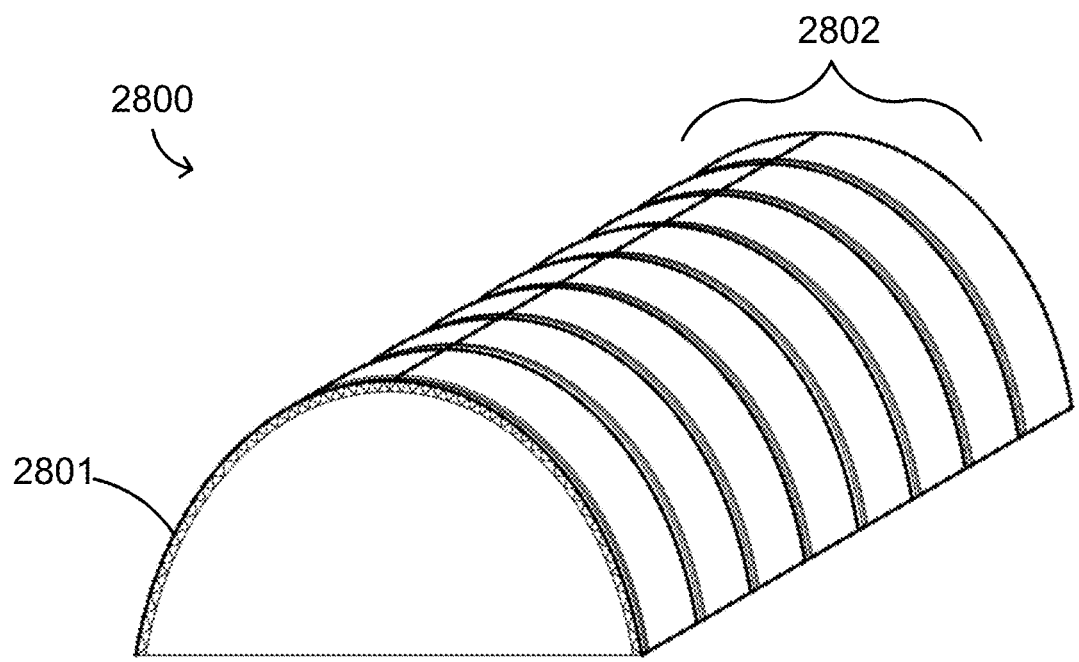

FIGS. 28A, 28B, and 28C illustrate a building structure, greenhouse 2800, according to an embodiment. As shown in the figures, the greenhouse 2800 is a structural building having upstanding walls 2801 and a curved roof 2802, which enclose an inside greenhouse space 2803 therein. The walls 2801 may be transparent or opaque, and a door (not shown) can be provided on one of the walls 2801 for access to the inside space. The roof 2802 and walls 2801 can be made of different types of materials, such as glass or plastic, including but not limited to polyethylene film, multiwall sheets of polycarbonate material, ethylene tetrafluoroethylene sheet, or PMMA acrylic glass. The roof 2802 and walls 2801 can be self-supported or installed onto a supportive frame. The greenhouse 2800 heats up because incoming visible solar radiation (for which the glass or plastic is transparent) from the sun is absorbed by plants, soil, and other things inside the building. Air warmed by the heat from hot interior surfaces is retained in the building by the roof and walls. In this embodiment, the roof 2802 forms a semi-circular shape in cross-section as shown in FIG. 28A. The roof 2802 comprises a thermal cell array unit. Specifically, the size and dimensions of the above-described thermal cell array unit are tailored to fit into the building structure, such that the thermal cell array unit forms and functions as roof 2802.

While in this embodiment, the roof 2802 forms both the roof 2802 and the walls 2801 of the structure. The roof 2802 and walls 2801 are integrated with the thermal cell array unit, and one or more thermal cell array units/assemblies can be formed as the entire roof 2802. In other embodiments, the thermal cell array unit may not be integrated into walls 2801.

According to some other embodiments, one or more above-described thermal cell array units/assemblies can be positioned below a transparent roof structure or adjacent one or more transparent walls, such that the thermal cell array units/assemblies can be opened to allow the transmission of sunlight into the structure and closed to prevent the transmission of sunlight into the structure and also to increase the thermal insulation property of the roof or walls. The thermal cell array units can be attached to the support structure of the greenhouse, glasshouse, or other building structure. For example, when positioned below the roof, the thermal cell array unit/system can be suspended horizontally near the roof. However, it is noted that the orientation of the thermal cell array unit/system can be adjusted depending on various factors, such as the structure and layout of the building, or maximum receipt of sunshine. Alternatively, the thermal cell array units/assemblies can also be positioned near the roof and/or walls from outside of the building.

As described earlier with reference to FIGS. 10A through 10C, the means of position controller causes the first of the two surface sheets to move in a direction that is normal to the sheet while maintaining the second of the two surface sheets primarily parallel to the first sheet. It may also be desirable for the position controller coupled to the surface sheets of the thermal cell array unit to be arranged such that when the control force is applied, one or both of the first and second surface sheets move in a pivoting motion. Specifically, one or both of the surface sheets pivot whereby a first end of the one of the first and second surface sheet is substantially fixed relative to a corresponding first end of the other of the first and second surface sheets, and a second end of the one of the first and second surface sheets, opposite the first end, moves relative to the second end of the other of the first and second surface sheets.

Figure 29A:
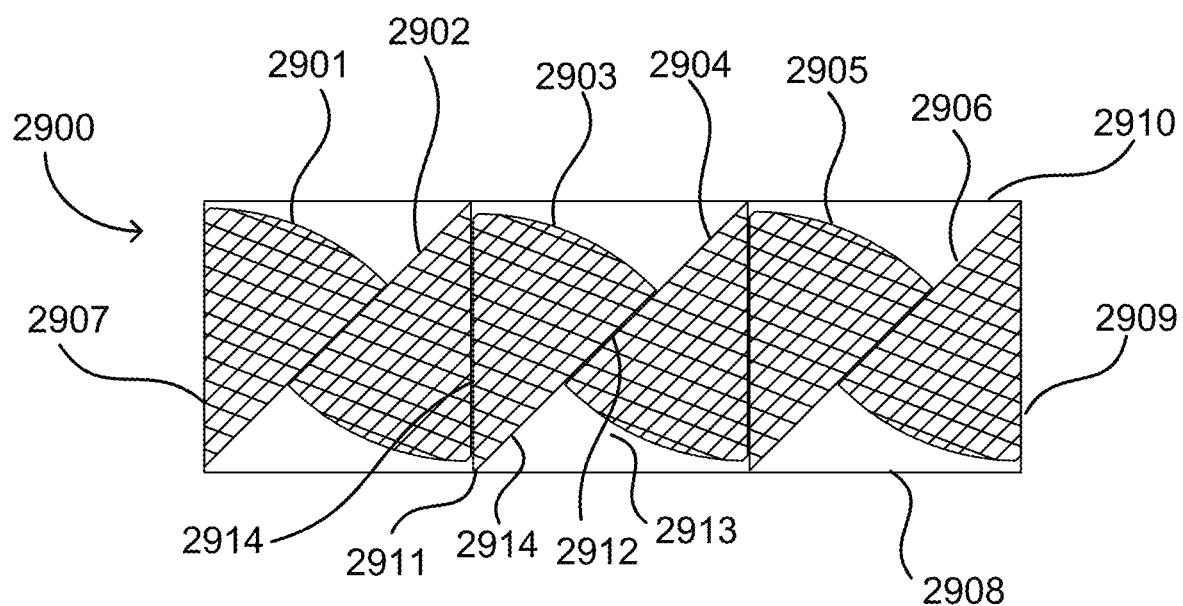
FIGS. 29A and 29B are top-down cross-sectional views depicting configurations of thermal cell array units within an enclosed panel whereby the expansion and compression is achieved through a pivoting motion.
Figure 29B:
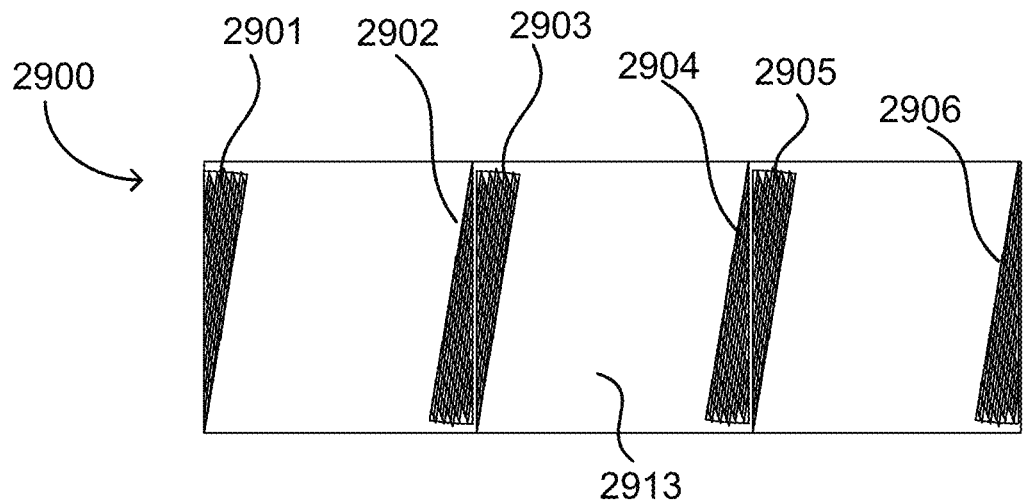

One example of thermal cell array units arranged to move in a pivoting motion is depicted in FIGS. 29A and 29B. FIG. 29A shows a top-down cross-sectional view of multiple thermal cell array units in their expanded state within an enclosed panel. In the example shown in FIG. 29A, enclosed panel 2900 is formed by side frame elements 2907 and 2909 and front and back panels 2908 and 2910. Enclosed panel 2900 contains six thermal cell array units 2901, 2902, 2903, 2904, 2905 and 2906. In the example enclosed panel 2900, thermal cell array units 2901-2906 are expanded to substantially fill the volume within enclosed panel 2900. As an example, surface sheet 2914 of thermal cell array unit 2903 is maintained in a vertical orientation. Surface sheet 2913 undergoes a pivoting motion whereby one edge of surface sheet 2913 is held close to the corresponding edge of the surface sheet 2914 forming vertex 2911, and the other edge of surface sheet 2913 is moved away from surface sheet 2914. This pivoting expansion motion for thermal cell array units 2901-2906 results in the volume 2913 of the enclosed panel being substantially occupied by the expanded thermal cell array units 2901-2906.

FIG. 29B shows the compressed state for thermal cell array units 2901-2906 whereby the volume 2913 of the enclosed panel is substantially unoccupied by the compressed thermal cell array units 2901-2906. An advantage of the pivoting motion embodiment is that it restricts the motion of the surface sheet to one degree of freedom which may simplify the operation of the positioning means. As well, a pivoting motion can generally be achieved using low friction hinges which could result in less force required to expand and compress the thermal cell array unit.

As described earlier with regard to FIGS. 1A and 1B, a thermal cell array may comprise a plurality of similarly sized flexible sheets 120a-k of thin film arranged in a stacked arrangement with pairs of sheets bonded to form continuous array of thermal cells 110. In an alternate embodiment, a thermal cell array may comprise individual thermal cells as depicted in the top cross-sectional views in FIGS. 30A and 30B.

Figures 30A, 30B:
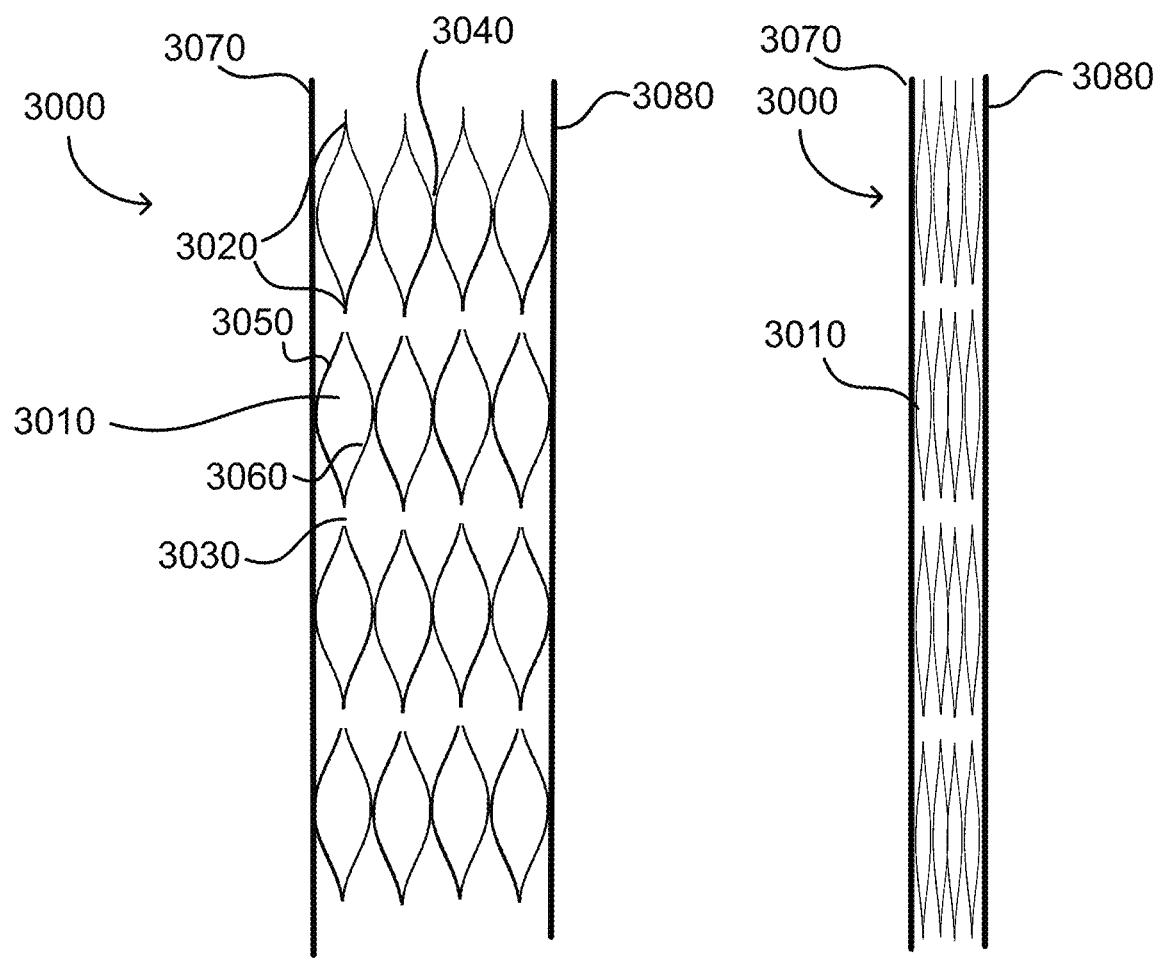
FIGS. 30A and 30B are top cross-sectional views of a thermal cell array unit with individual thermal cell units, configured in an expanded state and a compressed state, respectively.

In FIG. 30A, thermal cell array unit 3000 comprises a plurality of individual thermal cells 3010, each consisting of two flexible films elements 3050 and 3060 having two edge-bond zones 3020 that comprise less than 20% and preferably less than 5% of the film area. Edge-bond zones 3020 run parallel to the longitudinal direction along each of the thermal cells 3010. Thermal cell array unit 3000 is formed by bonding stacks of thermal cells 3010 along a central bond zone 3040. Central bond zone 3040 comprises less than 20% and preferably less than 5% of the surface area of thermal cell 3010 and runs parallel to the longitudinal direction along the center of thermal cells 3010. A plurality of stacks of thermal cells 3010 are placed side by side so as to occupy most of the available area between surface sheets 3070 and 3080. Stacks of thermal cells 3010 are bonded to surface sheets 3070 and 3080 along the central bond zone 3040. Prior to bonding sufficiently large gap 3030 is maintained between thermal cells 3010 to ensure that the adjacent thermal cells 3010 do not make contact with one another when surface sheets 3070 and 3080 are brought close to one another in the compressed state. FIG. 30A shows thermal cell array unit 3000 in the expanded state.

FIG. 30B shows thermal cell array unit 3000 in the compressed state. The individual thermal cells enable thermal cell array unit 3000 to be expanded and compressed without requiring any regions of the sheets forming the thermal cell array unit to stretch or otherwise deform. In some applications, stretching or otherwise irreversibly deforming the sheets may reduce the long-term performance capability of the thermal cell array unit and in these cases it would be advantageous to employ individual thermal cells as described with reference to FIGS. 30A and 30B.

Figures 31A, 31B:
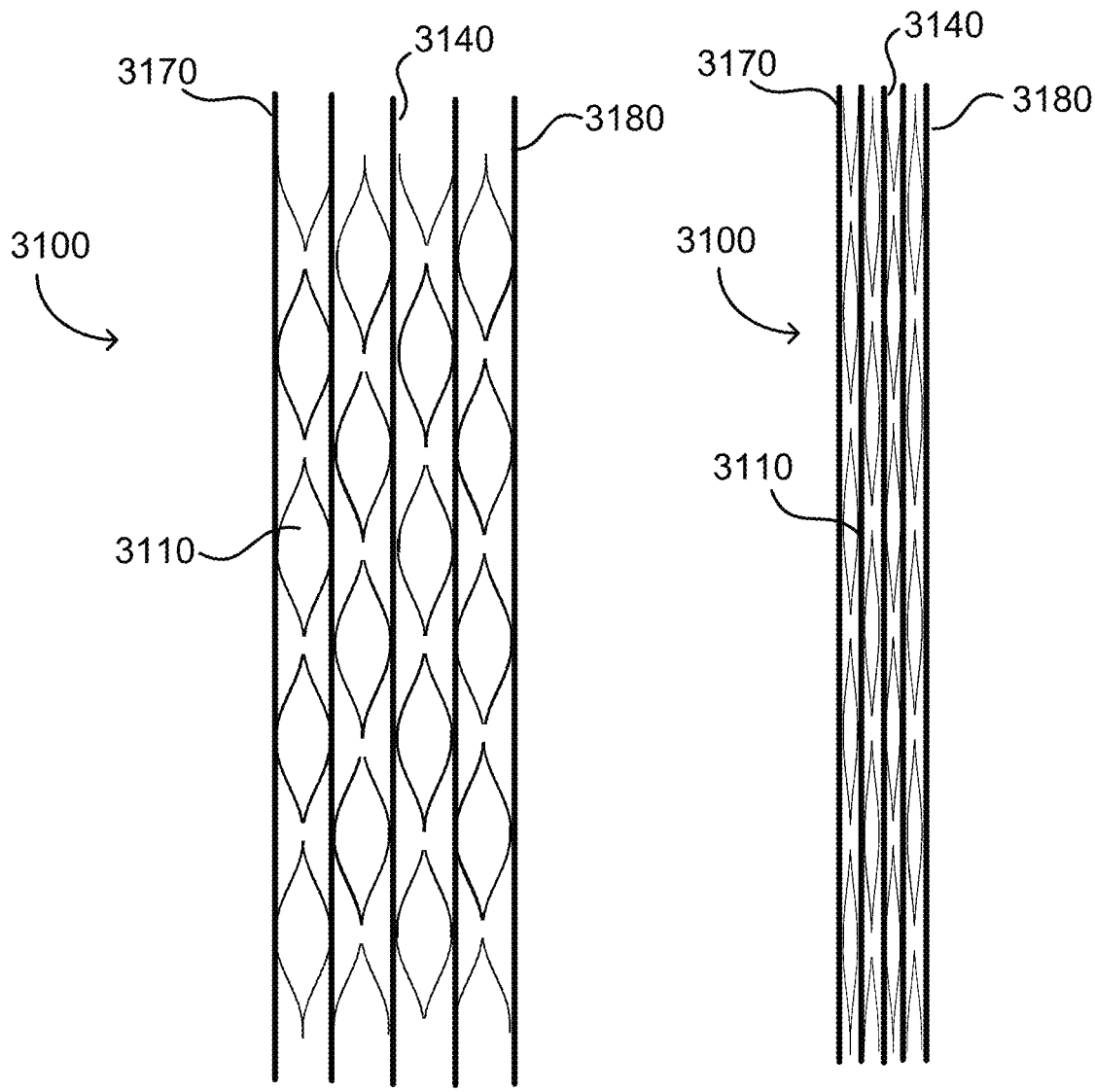
FIGS. 31A and 31B are top cross-sectional views of a thermal cell array unit with individual thermal cell units separated by sheets, configured in an expanded state and a compressed state, respectively.

In the example shown in FIGS. 30A and 30B, individual thermal cells are bonded to one another. In an alternate example shown in FIGS. 31A and 31B, thermal cell array unit 3100 is formed by individual thermal cells 3110 that are bonded to and separated by thin, flat sheets 3140. Sheets 3140 may provide lateral stability and prevent undesirable lateral motion of stacks of thermal cells 3110 during the controlled movement of surface sheets 3170 and 3180 to expand and compress thermal cell array unit 3100. FIG. 31A shows thermal cell array unit 3100 in the expanded state. FIG. 31B shows thermal cell array unit 3100 in the compressed state.

While particular embodiments have been described in the foregoing, it is to be understood that other embodiments are possible and are intended to be included herein. It will be clear to any person skilled in the art that modifications of and adjustments to the foregoing embodiments, not shown, are possible. Further, it is to be understood that the foregoing embodiments may be applied in a variety of applications, such as, for example, greenhouses, solar heat capture structures, commercial or residential skylights and windows, walls and doors of refrigeration units or other cold-storage appliances, or for other suitable structures and applications.

What is claimed is:

1. A variable thermal insulation assembly comprising:
   a frame comprising edge elements, the frame circumscribing a thermal actuation region having a gas;
   one or more thermal cell array units positioned within the thermal actuation region, each thermal cell array unit comprising:
      a thermal cell array comprising a plurality of flexible sheets;
      wherein said flexible sheets located adjacent to each other are bonded together along at least one pair of bonding regions, the at least one pair bonding regions extending substantially parallel to each other, to form pairs of flexible sheets such that each pair of flexible sheets defines at least one substantially longitudinally symmetrical cavity between the at least one pair of bonding regions, the at least one longitudinally symmetrical cavity being one of a plurality of thermal cells;
      wherein each of the plurality of thermal cells is bonded to another thermal cell in order to form the thermal cell array unit; and
      wherein the plurality of flexible sheets of each of the thermal cell arrays are formed of an electrically insulative material that is coated on one side with an electrically conductive material such that, for each pair of flexible sheets, the one side of one flexible sheet having the electrically conductive material coating is bonded to another side of the other flexible sheet without the electrically conductive material coating such that the electrical conductive material coatings of the flexible sheets of each pair of flexible sheets are separated by a layer of the electrically insulative material; and a controller electrically coupled to the plurality of flexible sheets and configured to apply an electric potential difference between electrically conductive material of each pair of flexible sheets such that the electrically conductive coatings of the pair of flexible sheets attract each other to cause the thermal cell array to transition from an expanded state to a compressed state.

2. The variable thermal insulation assembly of claim 1, further comprising a plurality of biasing elements located within the plurality of longitudinally extending cavities to bias the adjacent pairs of sheets away from each other to cause the thermal cell array to transition from the compressed state to the expanded state in the absence of the electrical potential difference applied by the controller.

3. The variable thermal insulation assembly of claim 2, wherein the biasing elements are formed of a thin steel spring or thin shim stock.

4. The variable thermal insulation assembly of claim 1, wherein at least some of the plurality of flexible sheets are coated on at least a first side by a layer of material having a thermal emissivity of less than 0.2.

5. The variable thermal insulation assembly of claim 4, wherein the material is aluminum.

6. The variable thermal insulation assembly of claim 1, wherein each of the plurality of sheets comprising the thermal array has a curved shape, and the plurality longitudinally extending regions follow the curved shaped such that the formed longitudinally extending cavities have the curved shape.

7. The variable thermal insulation assembly of claim 1 wherein the frame further comprises a front panel and a back panel coupled to the edge elements to form an enclosed panel that encloses the thermal cell array.

8. The variable thermal insulation assembly of claim 7, wherein the front panel and back panel are light-transmitting window elements fabricated from one of glass, mylar, acrylic, polycarbonate, polyethylene, or ethylene tetrafluoroethylene.

9. The variable thermal insulation assembly of claim 8 wherein the light-transmitting window elements are diffusely light-transmitting elements.

10. The variable thermal insulation assembly of claim 7, wherein the gas is an inert gas.

11. The variable thermal insulation assembly of claim 10, wherein the inert gas is argon gas.

12. The variable thermal insulation assembly of claim 1, wherein an inner surface of at least one edge element has a reflectivity of at least 80%.

13. The variable thermal insulation assembly of claim 12, wherein the inner surface of the at least one edge element has a convex profile.

14. The variable thermal insulation assembly of claim 1, wherein the edge elements comprise a first end element at a first end, a second end element at a second end, and a pair of side elements that connect the first and second end elements, wherein at least one of the side elements includes a seal element for inhibiting airflow through an opening of the plurality of longitudinally extending cavities adjacent to the side element when the thermal cell array is in the expanded state.

15. The variable thermal insulation assembly of claim 14, wherein the seal element is a first inflatable bladder.

16. The variable thermal insulation assembly of claim 1, wherein the plurality of flexible sheets have a curved shape between the bonding regions and are formed of a material that is shaped to transition from the compressed state to the expanded state in the absence of the electrical potential difference applied by the controller by the flexible sheets returning to their curved shape.

17. The variable thermal insulation assembly of claim 1, further comprising a gas source in fluid communication with the longitudinal cavities of the thermal cell array and configured to supply the gas to the longitudinal cavities to expand the thermal cell array and transition the thermal cell array from the compressed state to the expanded state.

18. The variable thermal insulation assembly of claim 1, wherein the controller is configured to apply an electrical potential difference of at least 1000V between electrically conductive material of each adjacent pairs of sheets.

19. The variable thermal insulation assembly of claim 1, wherein one or both of the adjacent surfaces of each adjacent pair of flexible sheets includes one or more of a coating of beads or other particles on the one or both surfaces, embossed features on the one or both surfaces, or scratch on the one or more surfaces.

* * * * *